US009124433B2

(12) United States Patent
Marien et al.

(10) Patent No.: US 9,124,433 B2
(45) Date of Patent: Sep. 1, 2015

(54) REMOTE AUTHENTICATION AND TRANSACTION SIGNATURES

(71) Applicant: VASCO DATA SECURITY, INC., Oakbrook Terrace, IL (US)

(72) Inventors: Dirk Marien, Ranst (BE); Frank Coulier, Grimbergen (BE); Frank Hoornaert, Bertem (BE); Frederik Mennes, Brecht (BE)

(73) Assignee: VASCO DATA SECURITY, INC., Oakbrook Terrace, IL (US)

( * ) Notice: Subject to any disclaimer, the term of this patent is extended or adjusted under 35 U.S.C. 154(b) by 73 days.

(21) Appl. No.: 14/142,091

(22) Filed: Dec. 27, 2013

(65) Prior Publication Data

US 2014/0189359 A1 Jul. 3, 2014

Related U.S. Application Data

(60) Provisional application No. 61/746,892, filed on Dec. 28, 2012.

(51) Int. Cl.
*H04L 29/06* (2006.01)
*H04L 9/32* (2006.01)
(52) U.S. Cl.
CPC ............ *H04L 9/3234* (2013.01); *H04L 9/3228* (2013.01)
(58) Field of Classification Search
CPC ........ H04L 9/3234; H04L 9/3228; H04L 9/32
See application file for complete search history.

(56) References Cited

U.S. PATENT DOCUMENTS

| 8,316,237 | B1 * | 11/2012 | Felsher et al. ............... 713/171 |
| 2004/0044739 | A1 * | 3/2004 | Ziegler .......................... 709/213 |
| 2005/0010758 | A1 * | 1/2005 | Landrock et al. ............. 713/156 |
| 2005/0188202 | A1 | 8/2005 | Popp |
| 2005/0216730 | A1 * | 9/2005 | Morino et al. ................ 713/153 |
| 2007/0186105 | A1 | 8/2007 | Bailey et al. |
| 2008/0301461 | A1 * | 12/2008 | Coulier et al. ................ 713/184 |

(Continued)

FOREIGN PATENT DOCUMENTS

EP 1 775 673 4/2007

OTHER PUBLICATIONS

International Search Report and Written Opinion for PCT/US2013/077961 mailed Apr. 17, 2014.

*Primary Examiner* — Chau Le
*Assistant Examiner* — Muhammad Chaudhry
(74) *Attorney, Agent, or Firm* — RatnerPrestia

(57) ABSTRACT

Authentication devices and methods for generating dynamic credentials are disclosed. The authentication devices include a communication interface for communicating with a security device such as a smart card. A dynamic credential such as a one-time password (OTP) or a message authentication code (MAC) may be generated by receiving from a server an encrypted initialization seed encrypted with an asymmetric encryption algorithm using a public key of a public/private key pair, submitting the encrypted initialization seed to a security device, decrypting at the security device the encrypted initialization seed with a private key of the public/private key pair, returning the decrypted initialization seed to the authentication device, deriving at the authentication device a secret credential generation key from the decrypted initialization seed, and generating the dynamic credential by combining a dynamic variable with the secret credential generation key using a symmetric cryptographic dynamic credential generation algorithm.

58 Claims, 21 Drawing Sheets

(56) References Cited

U.S. PATENT DOCUMENTS

| | | |
|---|---|---|
| 2009/0064294 A1 | 3/2009 | Cook et al. |
| 2009/0235339 A1* | 9/2009 | Mennes et al. ............... 726/5 |
| 2011/0258452 A1* | 10/2011 | Coulier et al. ............. 713/171 |
| 2012/0131354 A1* | 5/2012 | French ....................... 713/189 |

* cited by examiner

REMOTE AUTHENTICATION AND TRANSACTION SIGNATURES

CROSS-REFERENCE TO RELATED APPLICATIONS

This application claims priority to U.S. Provisional Application Ser. No. 61/746,892 entitled Remote Authentication and Transaction Signatures, filed on Dec. 28, 2012, the contents of which are incorporated fully herein by reference.

BACKGROUND

As remote access of computer systems and applications grows in popularity the number and variety of transactions which are accessed remotely over public networks such as the Internet has increased dramatically. This popularity has underlined a need for security in particular;

a. How to insure that people who are remotely accessing an application are who they claim they are and how to insure the transactions being conducted remotely are initiated by legitimate individuals. This subject is referred to as authentication.
b. How to insure that transaction data has not been altered before being received at an application server. This is referred to as data integrity.
c. How to guarantee that an individual, once having engaged in a transaction, is not in a position to repudiate it. This is referred to as non-repudiation.

In the past, application providers have relied on static passwords to provide the security for remote applications. In the last couple of years it has become evident that static passwords are not sufficient and that more advanced security technology is required.

PKI Smart Cards

One way of solving the security problems associated with remote access to computer systems and applications over public networks is provided by a Public Key Infrastructure. In a Public Key Infrastructure one associates a public-private key pair with each user. The key pair is associated with a certificate (issued by a trusted Certificate Authority) that binds that public-private key pair to a specific user. By means of asymmetric cryptography this public-private key pair can be used to:

a. authenticate the user,
b. sign transactions, documents, e-mails (so as to prevent repudiation), and
c. set up encrypted communication channels.

To guarantee an adequate level of security it is mandatory that each user's private key remains secret and can only be accessed (e.g. to create a signature) by the legitimate user associated with that key. It is common to rely on a smart card to store the public-private key pair and the certificate and to carry out the cryptographic calculations involving the private key. The use of the private key by the card is then often PIN-protected.

PKI-enabled smart cards are, and have been issued by:

a. Corporations to their employees or customers to secure the log-in to their computer networks or the remote access to their applications,
b. Banks to their customers to secure e.g. Internet banking applications, and
c. Governments to their citizens as electronic ID cards to create legally binding electronic signatures.

Apart from the advantages, there are also some disadvantages associated with PKI and the smart cards carrying the PKI keys and certificates:

a. Building a Public Key Infrastructure is generally quite complicated and therefore expensive when compared to competing security technologies.
b. PKI is inherently limited to environments and applications where there is a digital connection between clients and servers. In other words it is unsuitable for telephone banking or other delivery channels where it is not possible to provide a digital connection between the container of the PKI certificate and private key on the one hand and an application server on the other hand.
c. PKI smart cards do not have a power supply or a user interface. PKI smart cards therefore rely on the presence of an interfacing device that provides electrical power to the card, that is capable of digitally exchanging data with the card, and that is capable of interfacing with the user (e.g. capturing the card's PIN and presenting the data that should be signed). In most cases a PC with a connected transparent smart card reader is used. This reduces the mobility of the user (many PCs are not equipped with smart card readers). It also presents a security problem: all user interaction (such as approving a signature or capturing the card's PIN) is done on the inherently insecure PC.

Strong Authentication Tokens

An alternative technology for authentication and transaction signature capabilities is offered by what are called 'strong authentication token devices'. A typical example of strong authentication token is any one of the Digipass tokens offered by Vasco Data Security Inc., see the website Vasco.com.

A strong authentication token is a small autonomous battery-powered device with its own display and keyboard. In some cases the keyboard is reduced to a single button or even completely omitted. The main purpose of a strong authentication token is to generate so-called 'One-Time Passwords' (OTPs). In some cases strong authentication tokens are also capable of generating electronic signatures or Message Authentication Codes (MACs) on data that has been entered on the token's keyboard. If the token has a keyboard, the usage of the token is often protected by a PIN.

To be able to generate OTPs or MACs, strong authentication tokens are capable of doing cryptographic calculations based on symmetric cryptographic algorithms parameterized with a secret value or key. Typical examples of such symmetric cryptographic algorithms parameterized with a secret value or key are symmetric encryption/decryption algorithms (such as 3DES or AES) and/or keyed one-way hash functions (such as MD5 or SHA-1 in OATH compliant tokens). In the remainder of the text the output of such algorithms will sometimes be referred to as 'symmetric cryptogram'. The terminology 'symmetric cryptogram' shall thus be understood as not only the output of a symmetric encryption algorithm but also of symmetric decryption algorithms or keyed hash functions. Strong authentication tokens are personalized with one or more secret keys that are supposed to be different for each individual token. To generate a one-time password or signature, the token typically performs the following steps (refer to FIG. 1):

a. Step 10: The token takes one or more input values (these could include a challenge generated by a server and typed-in on the keyboard by the user, and/or the value of the token's internal real-time clock, and/or the value of an internal counter managed by the token, and/or transaction data typed-in on the token's keyboard by the user).
b. Step 11: The token puts the one or more input values into a specified format.
c. Step 12: The token then cryptographically combines the one or more input values with a personalized secret key 15 stored securely in the token. In a typical strong authentication token the token submits the one or more input values to a symmetric encryption/decryption algorithm and/or one-way hash function parameterized by a personalized secret key 15 stored securely in the token. The result is a cryptogram or a hash value.

d. Step 13: The token transforms the cryptogram or hash value that is the outcome of this encryption/decryption or one-way hash (or more generally, some other cryptographic combination) into the actual OTP or MAC. i.e., the cryptogram or hash is typically truncated, converted in a human readable format (e.g. through decimalization) and visualized on the display. The user may submit this value to the application server.

In the remainder of the text one-time passwords or electronic signatures generated by strong authentication tokens as described above may be referred to as dynamic authentication credentials or just dynamic credentials. In the remainder of the text the input values referred to in step 10 may be referred to as dynamic variables. Dynamic variables the value of which comes from a source that is external to the strong authentication token may be referred to as external dynamic variables. Examples of external dynamic variables may include a challenge or transaction data that e.g. may be provided to the token by a user entering them on the token's keyboard. Dynamic variables the value of which comes from a source that is internal to the strong authentication token may be referred to as internal dynamic variables. Examples of internal dynamic variables may include a time-value that is provided by a token's real-time clock or a counter that is stored in a token's memory and updated by the token's processor. The algorithms published by the "OATH—initiative for open authentication" are an example of standardized algorithms for generating dynamic credentials.

In most cases a strong authentication token is a physical device, however in some cases the functionality of these strong authentication tokens to generate OTPs or MAC signatures is emulated by software running on a PC, a workstation, a mobile phone, a personal organizer, a PDA, etc. The latter are referred to as "soft tokens".

Once the OTP or MAC has been produced it is conveyed to an entity where the value can be verified as authenticating the user or the message, see FIG. 2. Typically the entity is an application server. The application server stores data for each token, including which secret key(s) the token has been personalized with, and the identity of the user associated with the token. To validate a one-time password or signature, the server retrieves the secret key (115) which is a copy of the key personalized in the token, takes the same inputs that were used by the token and in essence performs the same algorithm 112 as the token. The server then compares 120 the result it obtained with the value it received. (In practice, the validation of an OTP or MAC is often somewhat more convoluted if the strong authentication algorithm is time-based or counter-based, due to synchronization issues.) Since a one-time password or signature generated by a strong authentication token is a function of the token's individual secret key and the always different values of the input(s) to the token algorithm, validating the correctness of the one-time password or signature gives the application server a very high degree of confidence that the person submitting the one-time password or signature possesses the correct token and knows its PIN (if the token is PIN protected), which in turn gives a high degree of confidence that that person is indeed the legitimate user associated with that token device.

Because the OTP verification server and the OTP token in essence perform the same algorithm with the same key, the OTP generation algorithm can be a one-way or non-reversible function. That means that the actual OTP can be shorter than the cryptogram or hash value from which it is derived. This allows for OTP or MAC lengths that are sufficiently short so that it is not too inconvenient for users to manually copy the OTP or MAC values from the token display onto a PC. As a consequence strong authentication tokens don't require a digital connection between the token and the verification server.

The major advantages of strong authentication tokens when compared to PKI cards are:

a. They are fully autonomous (tokens have their own power supply and their own user interface);
b. They are independent of the delivery channel or communication medium (tokens don't require any digital or electronic connection with any other device; all input and output of data is done by the user via the token's display and keyboard); and
c. They offer a very high level of security (all user interaction such as capturing the PIN or providing transaction data to be signed is done via the token's own secure user interface).

In some cases where smart cards have been issued, one wants to get around the disadvantages and limitations associated with smart cards and achieve the same advantages that strong authentication tokens offer i.e. full autonomy, independence of the delivery channel, and a secure user interface.

One alternative is to combine the smart card with an unconnected, battery-powered smart card reader that has its own display and keyboard. The idea is that the combination of the smart card and the unconnected smart card reader emulates a strong authentication token. The functionality normally provided by a strong authentication token is then split over the smart card and the unconnected reader. The unconnected reader takes care of all user interface, and all or a part of the other token functionality is delegated to the card.

Typically, all personalized secrets and security sensitive data are stored and managed by the card (e.g. the PIN is stored and verified by the card, the secret keys are stored on the card and all cryptographic operations involving those keys are done by the card, counters used as input for the token algorithm are stored and managed by the card). Part of the token functionality that is less sensitive (e.g. truncating and converting the generated hashes or cryptograms) often happens in the reader. An example of this combination is discussed below.

This principle is often used by banks that combine the bank cards they issue (for usage at Automatic Teller Machines or Point Of Sale terminals) with unconnected readers to secure their remote banking applications (such as internet banking or telephone banking). A good example of this is the Mastercard Chip Authentication Programme (CAP), which specifies how EMV smart cards can be used in combination with unconnected smart card readers to generate one-time passwords and electronic transaction data signatures.

This technology relies on the smart cards being capable of doing symmetric cryptographic operations and having been personalized with a secret key to be used for symmetric cryptographic operations. However, PKI-enabled smart cards are designed to store asymmetric keys and do asymmetric cryptographic operations. Many PKI-enabled smart cards don't support symmetric cryptographic operations or (if they do) have never been personalized with an individual symmetric secret key.

Traditional PKI Signatures

The usual way to create an electronic signature with a PKI smart card, is that the input data (usually, the input data consist of a hash of the actual transaction data one wants to sign) are encrypted by the card's private key.

The usual way to validate such a signature, is that the validating entity decrypts the received signature with the public key. If the decryption of the signature results in the same value as the input data that were supposed to have been encrypted by the private key, the signature is validated successfully. Note that thanks to this asymmetric characteristic the validating entity never needs to have access to the card's private key. This allows the private key to be kept secret from any party other than the signing party, even from any verifying party, thus providing for true non-repudiation.

This can only be done successfully if the signature itself is in its entirety available to the validating entity. The decryption of an incomplete signature would only result in meaningless data that can not be compared with the input data that were supposed to have been signed.

This condition can not be fulfilled in practice when small hand-held unconnected smart card readers are being used: given that a typical PKI signature size is in the order of 100 bytes, the display of these readers is far too small to display a full signature and it is in any case totally unrealistic to expect a user to manually transfer a 100-byte value from the reader's display to a PC without making a single mistake. The 100-byte typical PKI signature should be compared to a typical 6 to 8-digit or 3 to 4-byte OTP or MAC of a traditional strong authentication token. This is certainly a reason why asymmetric cryptography and private keys have not been used to generate OTPs and MACs by e.g. strong authentication tokens.

The inventors have determined that methods and apparatus are needed that:
a) allows the usage of a device storing PKI private keys (such as PKI-enabled smart cards or USB sticks) to authenticate users and to sign transactions,
b) without the need for any user application to have some kind of a direct or indirect digital connection with the device containing the private key, in particular a digital connection that would allow the user application to submit data to the card for signing by the card's private key and that would allow retrieval of the entire resulting signature from the card should not be necessary,
c) without the need for the PKI-enabled device containing the private key (e.g. a PKI smart card or USB stick) to:
1) either support symmetric cryptographic operations, or
2) to have been personalized with some secret or confidential data element that can be read by a suitable reader.

SUMMARY OF THE INVENTION

This application provides a description of a method and apparatus which meets the foregoing desire. In particular this application describes a number of embodiments which use the private key of a public-private key pair (a key which is meant to be used for asymmetric cryptography such as for example the RSA algorithm) to authenticate a user (via generation of a OTP) or to sign data (via generation of a MAC).

The embodiments described here differ from the traditional use of private keys to authenticate users and sign data (as described above) in that:
a) the same cryptographic key is used to generate and verify the OTPs and MACs; and
b) the length in bits of the OTP and MAC values can safely be considerably less than the length in bits of the cryptograms generated by the private keys.

All embodiments have in common that:
a) They all calculate a dynamic value using one or more variable inputs by means of a cryptographic algorithm that uses a secret that is also known or accessible to a verifying server.
b) These variable inputs can be, for example, any of:
1) Time value, or
2) Counter value, or
3) Challenge value, or
4) Transaction Data, or
5) Any combination of the above.
c) The dynamic value is then transformed into an OTP or MAC.
d) At some point in the course of developing the OTP or MAC an asymmetric cryptographic operation with a private key (i.e. an encryption/decryption or a signature) is carried out.
e) The transformation of the dynamic value into an OTP or MAC is such that the length or size of the OTP or MAC is smaller than the size of the cryptogram that was generated by the asymmetric cryptographic operation with the private key.

The precise role of the asymmetric cryptographic operation with the private key in the overall process of generating the OTP or MAC can be different from one embodiment to another.

In some embodiments the asymmetric cryptographic operation with the private key is performed each time an OTP or MAC has to be generated. In other embodiments more than one OTP or MAC can be generated in connection with a single asymmetric cryptographic operation with the private key. In the latter case, criteria that can determine whether or not a new asymmetric cryptographic operation with the private key is required when a new OTP or MAC needs to be generated can include:
a) The time that has passed since the last asymmetric cryptographic operation.
b) The number of OTPs and/or MACs that have already been generated.
c) Whether or not a communication session between a device containing the private key and a device capturing the inputs and making available the OTPs has been uninterrupted (e.g. whether a PKI smart card has not been removed from a smart card reader).
d) The type of OTP or MAC. For example the generation of a MAC might always require a new asymmetric cryptographic operation but the generation of an OTP would not.

In a typical embodiment only one private key is used and only one asymmetric cryptographic operation is performed with that private key. However, some embodiments may perform a number of cryptographic operations with either a single private key or with a number of private keys. Examples:
a) If the OTP is a function of the encryption result of the variable inputs by a private key, then a variant could be that the OTP is a function of more than one cryptogram, or that the variable inputs are encrypted by more than one private key to generate the OTP.
b) If the generation of an OTP only takes place after the presence of a specific smart card is verified by checking the result of an encryption of a challenge by the card's private key, then a variant could be that more than one challenge is submitted to the card to be encrypted by the card's private key.
c) In many cases a PKI card contains a so-called utility private key and a signature private key. In that case the utility key might be used if an OTP is generated and the signature key might be used if a MAC is generated.

In a preferred embodiment both OTPs to authenticate a user and MACs to sign data can be generated. However alternative embodiments can be limited to only being capable of generating OTPs or only being capable of generating MAC signatures.

In a typical embodiment the asymmetric cryptographic algorithm used with the private key will be the RSA algorithm. However, other embodiments can use other asymmetric algorithms provided they are capable of either encryption or decryption or signing functionality by using the private key. Examples of such algorithms include: RSA, knapsack algorithms such as Merkle-Hellman or Chor-Rivest, Pohlig-Hellman, Diffie-Hellman, ElGamal, Schnorr, Rabin, Elliptic Curve cryptosystems, Finite Automaton public key cryptosytems, the Digital Signature Algorithm (DSA, DSS).

In a typical embodiment the component that contains the private key and the component that generates the OTP and MAC values are two different components, each being a part of two different devices. However, embodiments can easily be conceived in which these two components are parts of the same device or are even the same component.

In a typical embodiment the private key is stored on a smart card. In a preferred embodiment the cryptographic calculations involving the private key are performed by that smart card. In a typical embodiment the OTP and/or MAC values are generated by a device that is equipped with or connected to a component or device that can communicate with the smart card containing the private key.

In a preferred embodiment the card reading device is an unconnected smart card reader with its own power supply and running the appropriate software to communicate with a PKI smart card which has been inserted into the smart card reader to generate OTPs or MACs.

In another embodiment the card reading device is the combination of some computing device such as a PC, PDA, cell phone, etc., equipped with a smart card reader and running the appropriate software to generate OTPs or MACs.

In a typical embodiment the physical, electrical and protocol aspects of the communication between the smart card and the smart card reading device is the same or similar to those described in the ISO 7816 standard. Other embodiments could use another communication interface such as a contactless smart card interface as described in ISO 14443.

Alternative form factors are available for the private key containing device, as well as alternative form factors for the OTP or MAC generating device, and alternative means for the communication between the private key containing component or device on the one hand and the OTP and MAC generating component or device on the other hand. These alternatives are within the scope of the invention as described herein.

In one embodiment the OTPs or MACs values are visualized on a display of the card reading device. An OTP can e.g. consist of a series of symbols. In a typical embodiment these symbols are decimal digits. In other embodiments these symbols can for example include:
 a) hexadecimal digits, or
 b) base 64 digits, or
 c) characters from a writing system such as an alphabet, or
 d) pictograms.

In one embodiment the generated OTPs or MACs are communicated to the user by means of audible signals. For example the OTP can be a string of digits or characters or words that each have a characteristic associated tone or that are read by a text-to-speech converter.

In one embodiment the generated OTPs or MACs are directly communicated to an application by some electronic wired or wireless communication mechanism. This mechanism can include a USB connection or an infrared connection or a Near Field Communication connection or an RF connection or a Bluetooth connection.

Other output mechanisms for the OTPs or MACs can be provided. In some embodiments the private key-based function is PIN protected.

The following description describes the basic embodiments in more detail. In some embodiments the card's private key-based function is directly or indirectly used in the OTP or MAC generation. Either
 a. an asymmetric cryptographic operation involving the card's private key is an integral phase or part of the transformation of the variable inputs into an OTP or MAC (Using the asymmetric algorithm in a symmetric way), or
 b. the card's private key-based function is used more indirectly to provide a seed value that is used to derive a secret symmetric key that is used by the OTP or MAC generation algorithm. (Using an asymmetric cryptogram as a seed to derive a secret key).

In some of the embodiments the value of the OTPs and/or MACs is a function of the actual value of the card's private key. In yet other embodiments the card's private key-based function is used to unlock the OTP or MAC generation algorithm in the reader:
 a. Either the card is linked to an already personalized reader and recognized on the basis of stored challenge-response pair(s), or
 b. the card is authenticated by the reader through traditional PKI certificate based verification.

In the embodiments described in the immediately preceding paragraph the value of the generated OTPs and/or MACs is not a function of the actual value of the card's private key.

Thus in one aspect the invention provides a method to generate a security value comprising a One-Time Password (OTP) or a Message Authentication Code signature (MAC) comprising:
 obtaining an intermediate dynamic value created using one or more variable inputs and a cryptographic algorithm employing at least one secret;
 transforming said dynamic value into said security value, wherein an asymmetric cryptographic operation with a private key is carried out producing a cryptogram, in order to transform said dynamic value, and
 said transforming includes producing said security value of a size which is smaller than the size of a cryptogram that was generated by said asymmetric cryptographic operation.

In another aspect the invention provides a device generating a security value comprising a One-Time Password (OTP) or a Message Authentication Code signature (MAC) using the method described immediately above.

In another aspect the invention provides a method of validating a security value provided by a user in order to authenticate the user or data associated with the user, said security value comprising a One Time Password or a signature comprising a Message Authentication Code; said method comprising:
 creating a reference cryptogram using a reference cryptographic algorithm applied to one or more reference inputs using a server key related to a PKI private key of an authentic user, the reference cryptographic algorithm and the one or more reference inputs selected as identical to corresponding elements used in creating the security value by the authentic user;

thereafter either operating on said reference cryptogram alone by transforming said reference cryptogram into a reference security value including producing said reference security value of a size which is smaller than the size of the reference cryptogram and effecting a comparison of said reference security value and said security value, or operating on both said reference cryptogram and said security value to produce a modified reference cryptogram and a modified security value, said operation on said reference cryptogram identical, in part to an operation carried out to create said security value, and effecting a comparison of said modified reference cryptogram and said modified security value, and determining validity of said security value from results of said comparison.

In still another aspect the invention comprises a computer readable medium supporting a sequence of instructions which, when executed perform a method of generating a security value comprising a One-Time Password (OTP) or a Message Authentication Code signature (MAC), said method comprising:

obtaining an intermediate dynamic value created using one or more variable inputs and a cryptographic algorithm employing at least one secret;

transforming said dynamic value into said security value, wherein an asymmetric cryptographic operation with a private key is carried out producing a cryptogram, in order to transform said dynamic value, and said transforming includes producing said security value of a size which is smaller than the size of a cryptogram that was generated by said asymmetric cryptographic operation.

Finally in still another aspect the invention comprises an information bearing signal comprising a sequence of instructions which, when executed in a processor perform a method of generating a security value comprising a One-Time Password (OTP) or a Message Authentication Code signature (MAC), said method comprising:

obtaining an intermediate dynamic value created using one or more variable inputs and a cryptographic algorithm employing at least one secret; transforming said dynamic value into said security value, wherein an asymmetric cryptographic operation with a private key is carried out producing a cryptogram, in order to transform said dynamic value, and said transforming includes producing said security value of a size which is smaller than the size of a cryptogram that was generated by said asymmetric cryptographic operation.

BRIEF DESCRIPTION OF THE DRAWINGS

Several embodiments of the invention are now further described in the following portions of the specification when taken in conjunction with the attached drawings in which.

DETAILED DESCRIPTION

Figure 12:
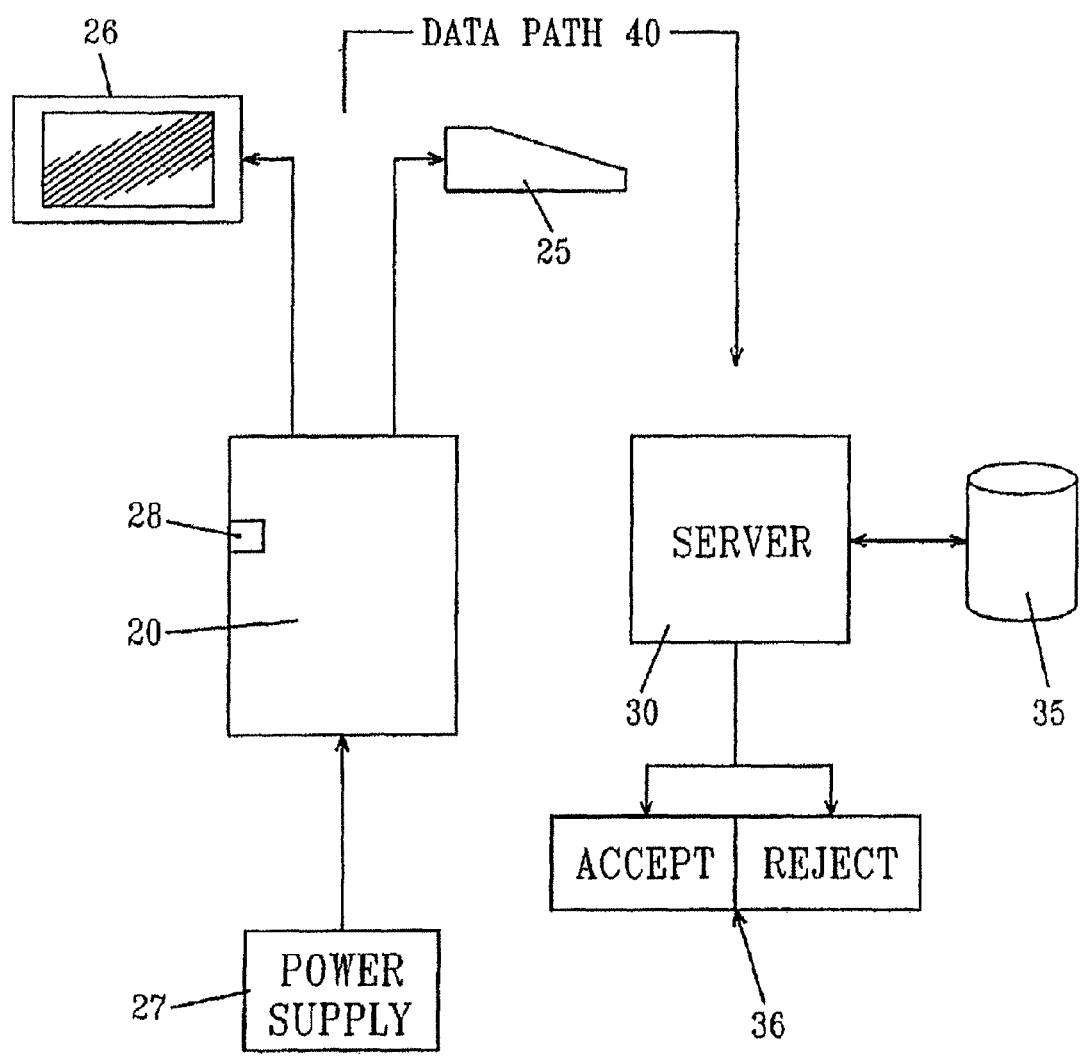
FIG. 12 illustrates the context in which embodiments of the invention operate.

Important components of embodiments of the invention are illustrated in FIG. 12 as including a smart card reader 20 (or simply reader) and an authentication server 30 (or simply server).

At a minimum the reader 20 includes an interface 28 to accept a smart card and a power supply 27. Some readers also include one or more user operable buttons or keys; this is represented in FIG. 12 by the keyboard 25. As used herein a user inserts a smart card into the smart card interface 28. As a consequence of some operation carried out by the reader 20, information is generated by the reader. That information may be a One-Time Password (OTP). If transaction data is input to the reader the information which is generated may include a signature such as a MAC. The output information may be presented on a display, such as the display 26. Alternatively the reader may be digitally connected to a network. In that event the information may be presented to another entity also connected to the network and the display 26 may be unnecessary. Typically the information which is generated by the reader 20 is used to authenticate a person or a message. A person may be authenticated by use of a smart card (proving possession of the card) and some other information (such as a PIN or other user data). The reader accepts the smart card and other information and creates an OTP. The OTP is communicated to server 30. Alternatively the message is signed by the reader 20, producing a MAC and the MAC is communicated to server 30.

Server 30 is typically implemented as a computer with processing capability and a data base 35. The information generated by the reader is communicated to the server 30 via the data path 40. Data path 40 may take various forms. Typically the user manually transfers information from the display 26 to a client device that is connected to the server 30. Alternatively data path 40 may comprise a digital path allowing information to be communicated from reader 20 to server 30. As another alternative the data path may carry audio information, such as a telephone circuit which carries the voice of a user enunciating information presented to the user on the display 26; where the information may be an OTP or MAC. Data path 40 may carry optical signals representing the information generated at reader 20. In general data path 40 is any path which can be used to communicate information from the reader 20 to the server 30. The server 30 accepts either the OTP or MAC and with the assistance of data in the data base 35 determines whether to accept or reject the information as validating the identity of the user (OTP) or the authenticity of the message (MAC). The particular procedures and data which are used by the server 30 are more particularly described below. One output of the server 30 selects either the accept or reject for status 36, reflecting either acceptance of the OTP as validating the authenticity of the user's claim of identity or the validation of the MAC as authenticating the associated message.

Using the Asymmetric Algorithm in a Symmetric Way

In this embodiment (see FIG. 3) a smart card 100 cooperates with a smart card reader 105. Smart card 100 stores a PKI private key 301 which is used in an asymmetric cryptographic operation. The card's private key-based function (i.e. an asymmetric cryptographic operation involving the card's private key such as signing or decrypting) is an integral phase or part of the process which produces the OTP or MAC.

Generation of the OTPs and/or MACs happens in the following way:

Step 99: Input values which will be used in later steps are captured.

Step 101: the input(s) for the OTP or MAC generation algorithm are transformed or formatted into an initial value.

Step 102: the initial value is signed or encrypted/decrypted by the card's private key 301.

Step 103: the resulting cryptogram is transformed into an OTP or MAC.

Figure 1:
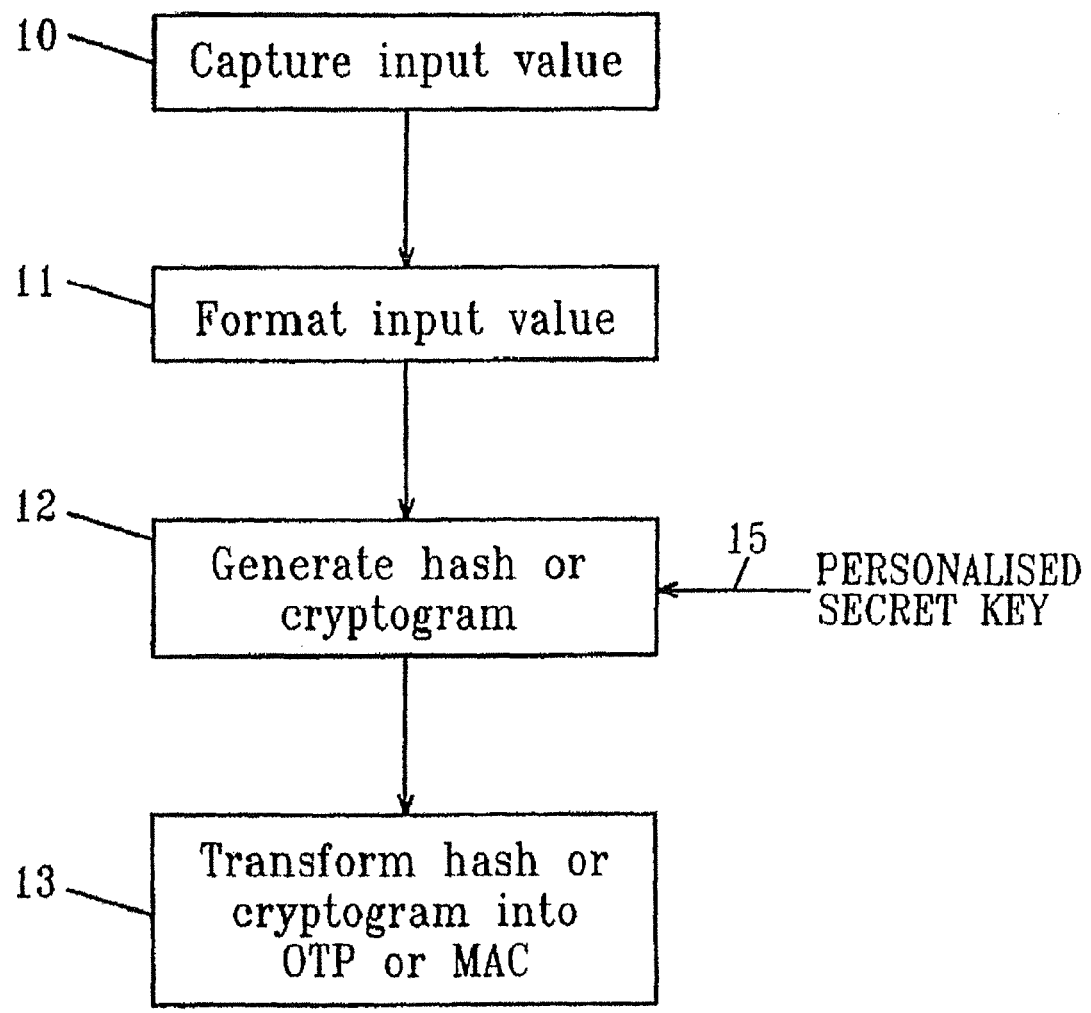
FIG. 1 is a flow diagram of the operation of a prior art strong authentication token in generating an OTP of MAC.
Figure 2:
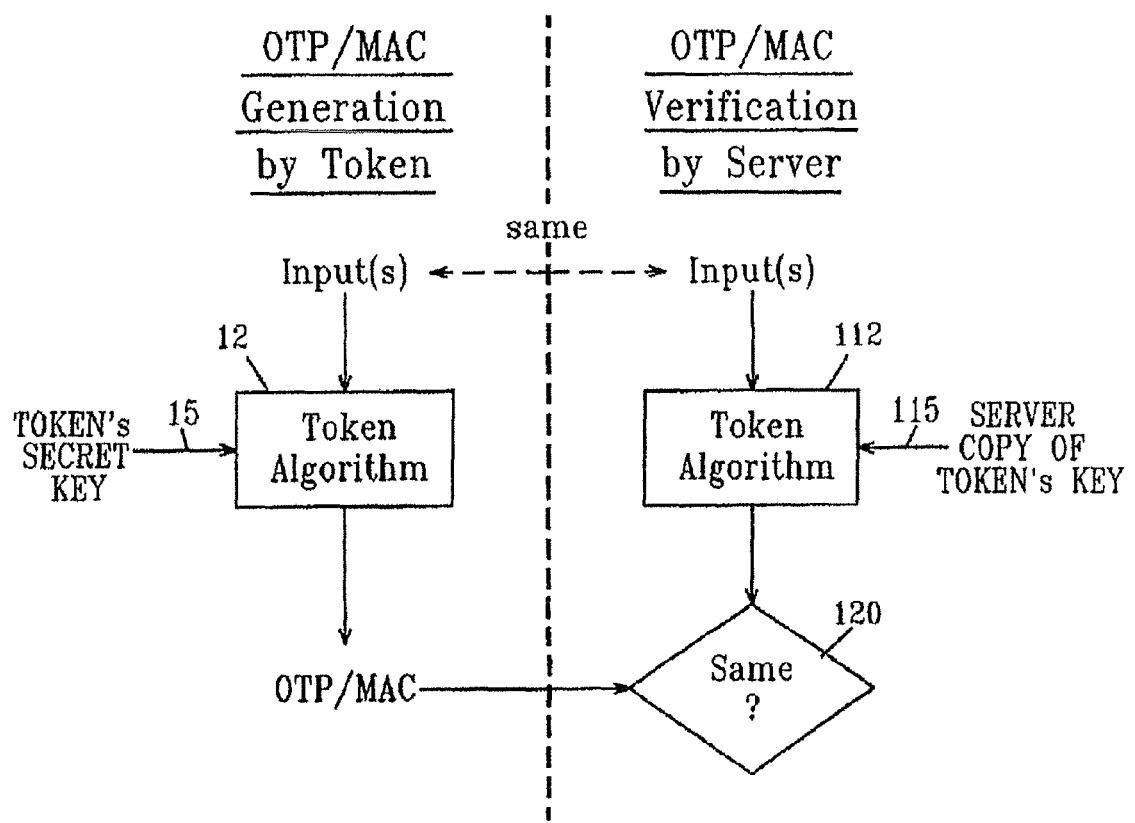
FIG. 2 is a flow diagram of the operation of a prior art server in authenticating an OTP or MAC generated by a strong authentication token and its relation to the OTP or MAC generation.
Figure 3:
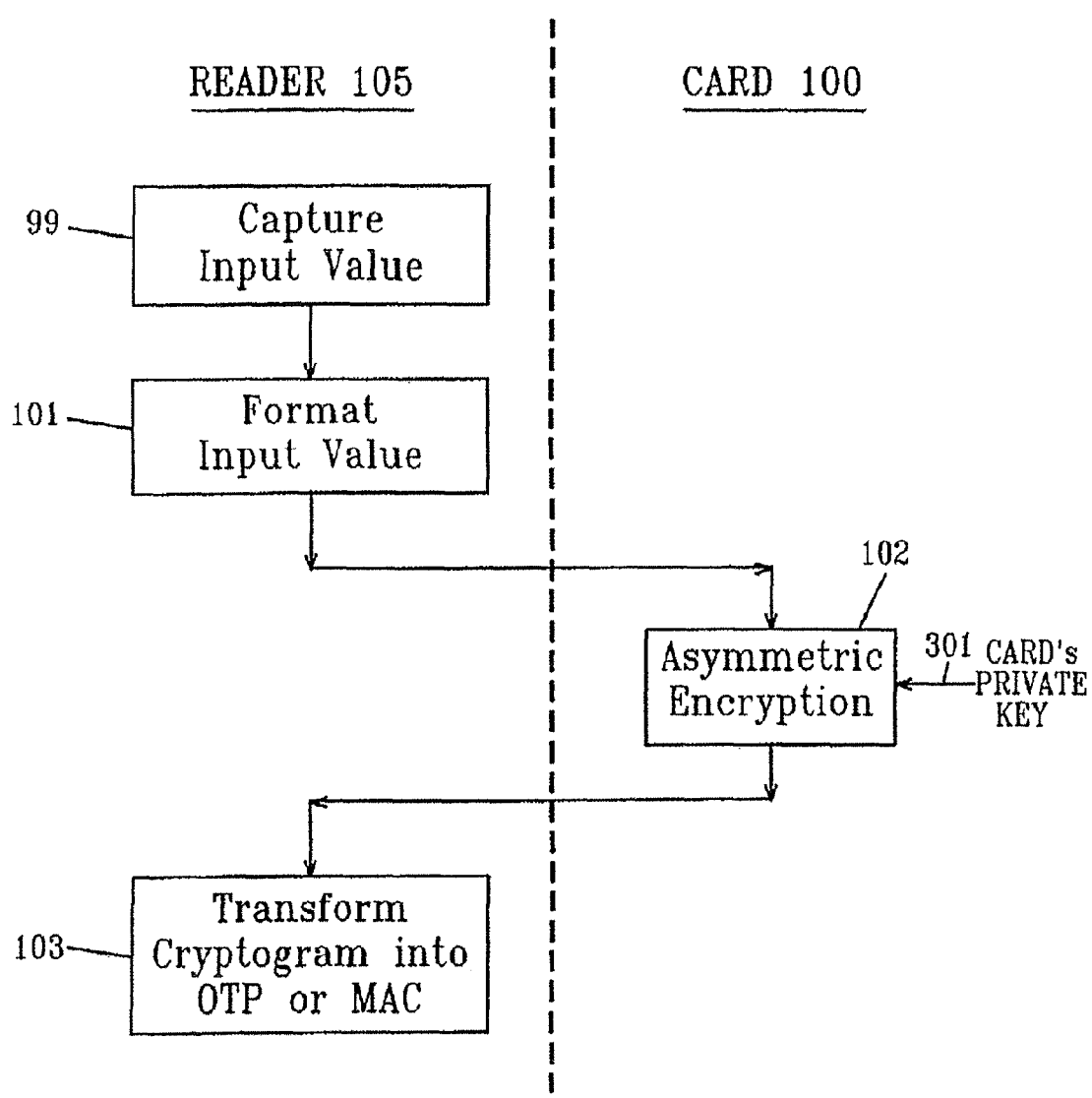
FIG. 3 is a flow diagram of an embodiment of the invention relying on an asymmetric cryptographic operation using a PKI private key to create a cryptogram from which an OTP or MAC is generated.

In the example of FIG. 3 the OTP or MAC is a function only of the result of the asymmetric cryptographic operation. However, in other embodiments the OTP or MAC may also be function of other data elements including values that are functions of the variable inputs but that are not functions of the private key 301.

In a typical embodiment the input(s) to the OTP or MAC generation algorithm are the same or similar as the inputs for the strong authentication algorithm(s) used in traditional strong authentication tokens. In other words these inputs may be selected, for example, as a:
time value, or
challenge (typically provided by a server), or
counter value, or
transaction data, or
any combination of the above.

In some embodiments additional input(s) or parameter(s) to the OTP/MAC generation algorithm can include, for example:
data identifying a device (e.g. a reader serial number). or
secrets stored in the device, or
user identification data, or
secret codes or secret values provided by the user.

Formatting these input(s) into the initial value, step 101 can include operations such as:
Concatenation, or
Hashing. or
encryption/decryption with a symmetric cryptographic algorithm (e.g. using a secret key stored in the device or provided by the user).

Transforming the resulting cryptogram into the final OTP or MAC value, step 103 can include, for example, the following operations:
hashing (possibly a keyed hashing using a secret key stored in the reader 105 or provided by the user), or
encryption/decryption with a symmetric cryptographic algorithm (e.g. using a secret key stored in the reader 105 or provided by the user), or truncation, or
selection of certain bits, nibbles or bytes, or
decimalization. The latter may be accomplished by:
  interpreting the string of bits to be decimalized as a large binary representation of a number, or
  dividing the string of bits to be decimalized in groups of bits and mapping each group of bits onto a decimal digit. A typical example is dividing the string of bits into nibbles and mapping each nibble onto a decimal digit according to the following rule. If the hexadecimal value of the nibble is 0x0 to 0x9, take the decimal digit with the same value; if the hexadecimal value of the nibble is 0xA to 0xF, subtract a constant (between 0x6 and 0xA) and then take the decimal digit with the same value as the result of the subtraction, or
many other decimalization algorithms known to those skilled in the art.

Figure 4:
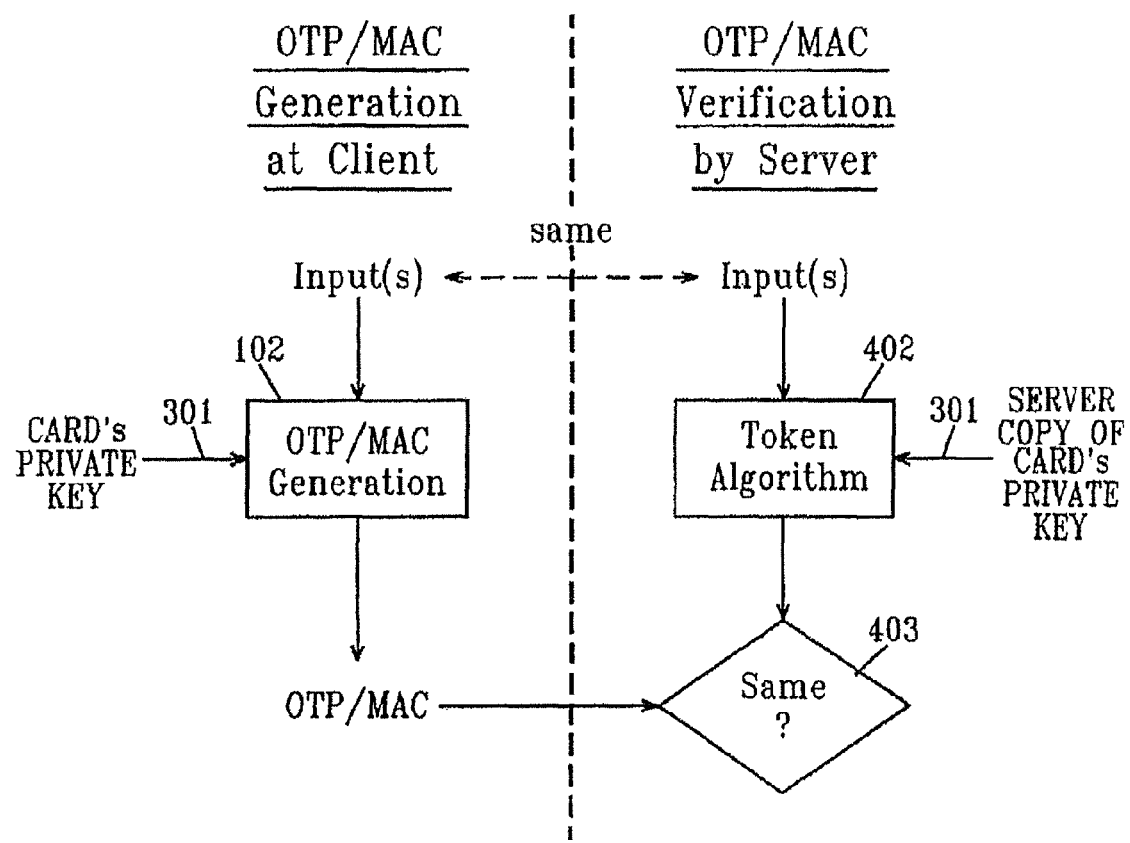
FIG. 4 is a flow diagram of an embodiment of the invention showing OTP/MAC generation at the client (as in FIG. 3, for example) and the related authentication at a server.

The validation phase is now described. In this embodiment the validating server has a copy of the private key 301 that was used to generate the OTP or MAC value and uses it to perform essentially the same algorithm as the algorithm to generate the OTP or MAC value. The validating server:
(refer to FIG. 4) somehow obtains or reconstructs or guesses the value(s) of the data elements that were used as input(s) to the OTP or MAC generation algorithm when the OTP or MAC was generated:
  in case of a time value, the validating server may have its own clock that is synchronized with the clock used for generating the OTP or MAC,
  in case of a challenge, the challenge may have been generated by the validating server itself or may have been passed to the validating server by the application together with the received OTP or MAC,
  in case of a counter, the validating server may maintain its own counter value synchronized with the counter value used for generating the OTP or MAC, in case of transaction data, these data may have been passed to the validating server by the application together with the received OTP or MAC;

the input(s) for the OTP or MAC generation algorithm are transformed into an initial value.

The initial value is thereafter signed or encrypted/decrypted (402) using the copy of the private key 301 held by the validation server. The validating server then compares (403) the resulting reference cryptogram with the OTP or MAC value that was received. If the resulting reference cryptogram matches the OTP or MAC value that was received, the signature is validated successfully. This comparison might be done in a number of ways:

the validation server might in some embodiments transform the reference cryptogram into a reference OTP or MAC value and compare the reference OTP or MAC value with the received OTP or MAC value (e.g. by checking whether they are identical), or the validation server might reconstruct, from the received OTP or MAC value a part of the original cryptogram generated by the private key, and compare this partial cryptogram with the corresponding part(s) of the reference cryptogram, or the validation server might transform the reference cryptogram into a first intermediate validation value, and transform the received OTP or MAC into a second intermediate validation value, and compare the first and second intermediate validation values.

Figure 14:
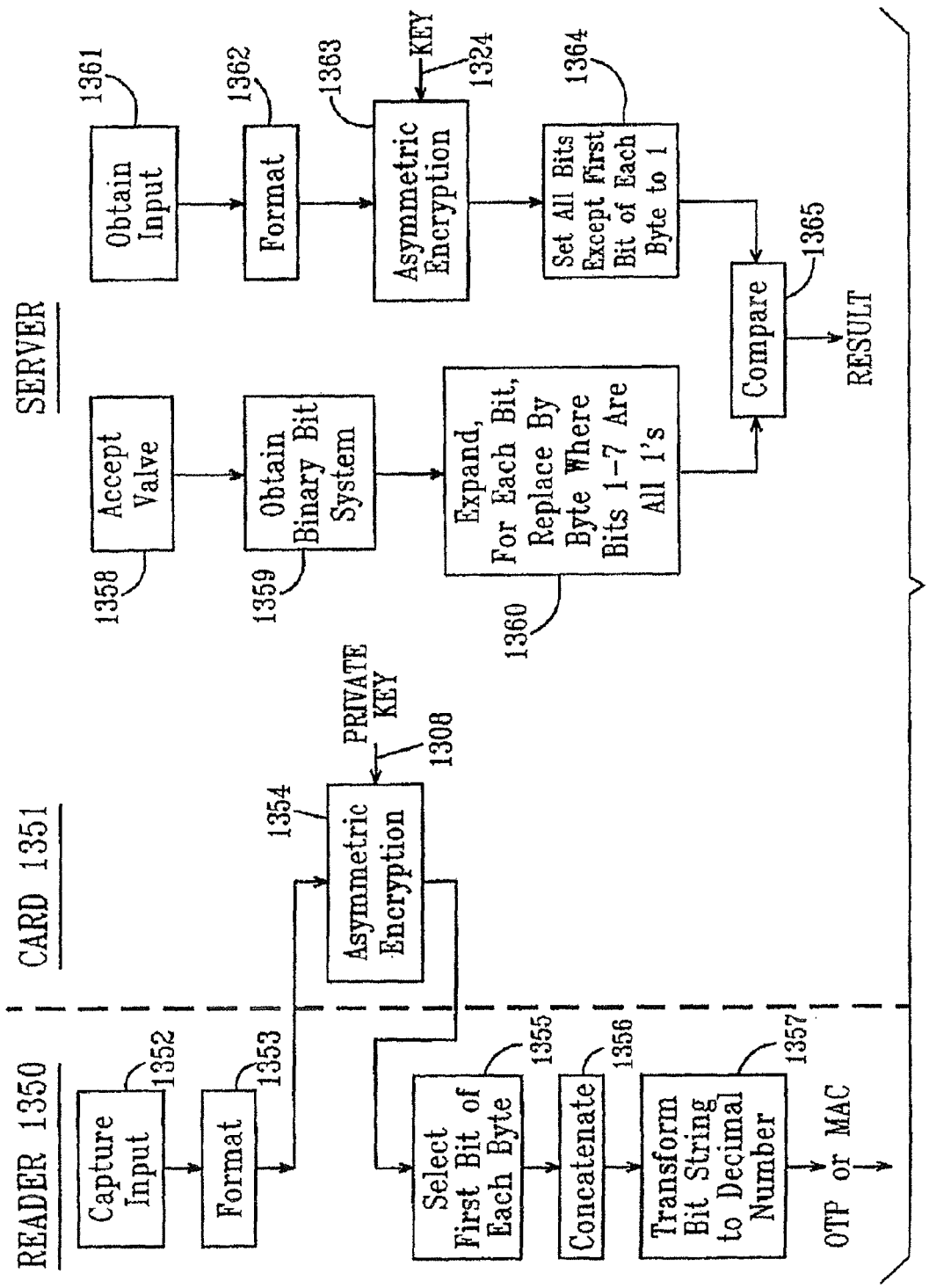
FIG. 14 is an illustration of another validation procedure.

This can be illustrated by the following example (see FIG. 14). In this example the OTP or MAC is produced based on a cryptogram which is the result of an asymmetric encryption using a private key 1308. The server produces a reference cryptogram which is also the result of an asymmetric encryption using a key 1324 which is a copy of the private key 1308. As shown in FIG. 14 the reader 1350 calculates the OTP or MAC from said original cryptogram by:
  selecting every first bit of every byte of said resulting cryptogram (1355), and
  concatenating said selected bits into a bit string (1356), and
  interpreting said bit string as the binary interpretation of a number and obtaining the OTP or MAC by taking the decimal representation of said number (1357)

the validation server validates this OTP or MAC as follows:
  the server modifies the reference cryptogram by setting all bits except every first bit of every byte to 1 (1364), and
  the server interprets the received OTP or MAC as the decimal representation of a number and obtains a bit string by taking the binary representation of that number (1359), and
  the server expands said bit string by replacing every bit of said bit string by a byte that consists of the bit being expanded appended with seven 1-bits (1360), and,
  the server compares said expanded bit string with said modified reference cryptogram (1365).

The parameters of this procedure (choosing one bit of every byte) is illustrative. Those skilled in the art will be able to select an appropriate parameter to suit their needs and context. In particular, a typical RSA cryptogram is about 100 bytes. Selecting one bit of each byte will produce 100 bits. At about 3 bits per decimal digit this will produce about 30 decimal digits for the OTP or MAC which is more practical than 300 decimal digits, but may still be considered awkward. In that event we can select one bit of every 40 bits for a total of 20 bits or about 6 decimal digits. The same procedure for generating the OTP or MAC from a cryptogram (transforming by selecting some but not all bits of the cryptogram) can also be used in the event a symmetric key is used in lieu of the asymmetric key. A typical symmetric cryptogram includes about 100 bits. In this case selecting one of every eight bits will leave us with about 12 bits or 4 decimal digits. This may be considered too small a number to be safe from attack. To avoid this problem we merely use one of every 4 bits (instead of 1 of every 8) to leave us with about 25 bits or about 8 decimal digits.

Figure 13:
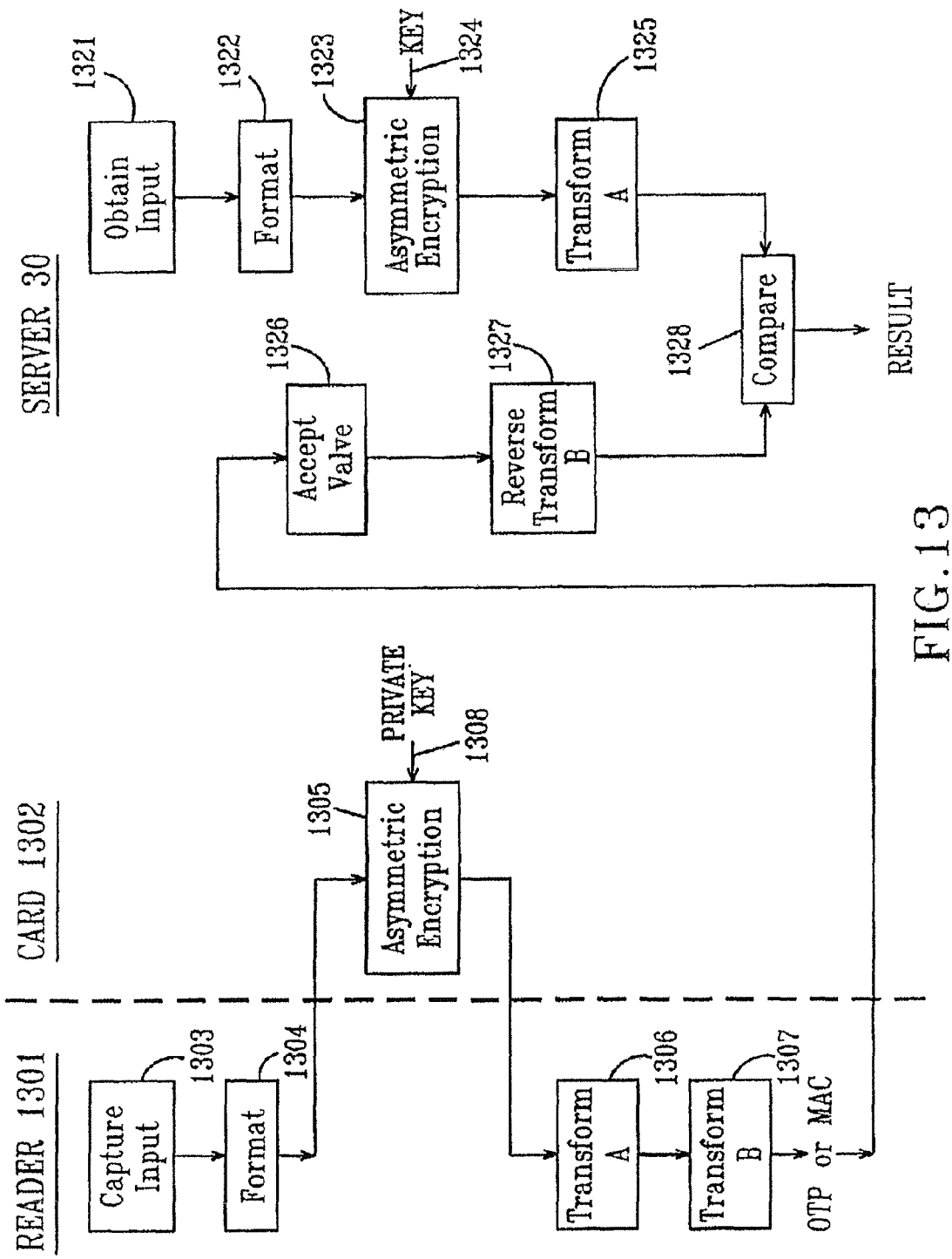
FIG. 13 is an illustration of a first validation procedure.

An alternative validation procedure is illustrated in FIG. 13. The procedures of FIG. 13 are the same as the procedures of FIG. 14 in producing the cryptogram on the client side (operation 1305) and the reference cryptogram on the server side (operation 1323). As shown in FIG. 13:

the cryptogram is transformed into the OTP or MAC by a sequence of two transformations, first a transform A (1306) and then a transform B (1307)

the validation server subjects the reference cryptogram to an operation 1325 to produce a modified reference cryptogram, operation 1325 is identical to the operation of transform A, the validation server also subjects the OTP or MAC to an operation (1327) which is the inverse of transform B to produce a modified OTP or MAC, validation depends on a comparison (1328) of the modified OTP or MAC with the modified reference cryptogram.

As was the case for the validation procedure of FIG. 14, the technique of FIG. 13 can be used regardless of whether the cryptogram is produced with a symmetric or asymmetric key.

In contrast to traditional PKI signature verification, the method of FIG. 3 doesn't require the full signature to be available to the server (as was demonstrated in connection with either FIG. 13 or 14). The solution can offer a very high level of security, even if no additional secret codes or keys (provided by the user or stored in the device) are being used other than the private key.

However, the technique of FIG. 3 can only be used if the validating server has a copy of the card's private key when it has to validate an OTP or MAC. The whole point of PKI is exactly that, in order to guarantee true non-repudiation, the private key is never accessible to anyone other than the user associated with that key. In many cases this is guaranteed by the card generating the private and public key pair on-board without any possibility of extracting the private key from the card. In other cases the key pair is generated externally and then injected into the card, but then procedures would normally ensure that the private key in the card personalization system is immediately destroyed after injection into the card and no copy of the private key is allowed to exist outside the card. In other words, this method will in many cases not be a suitable solution.

Figure 5:
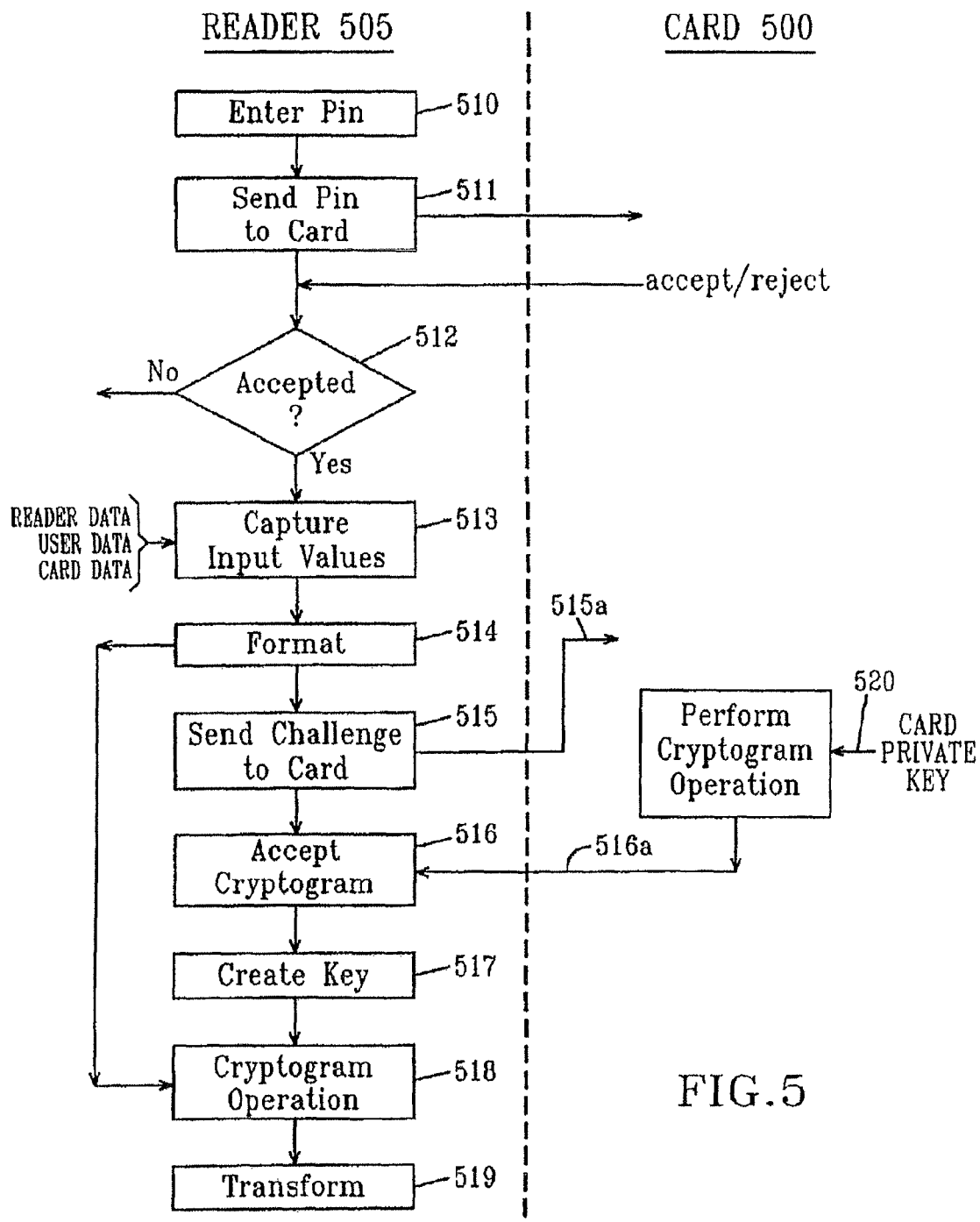
FIG. 5 is the flow diagram of another embodiment of the invention which uses an asymmetric cryptogram as a seed to derive a key which is used in creating a cryptogram representing an OTP or MAC.

Using an Asymmetric Cryptogram as a Seed to Derive a Secret Key (FIG. 5)

In the following embodiment, the requirement that the validation server has access to a copy of the private key at the time of validation is eliminated. In this embodiment an OTP/MAC is generated in the same way as a traditional strong authentication token. All the steps of this algorithm (capturing the inputs, formatting the inputs, encrypting or hashing the formatted inputs, transforming the resulting cryptogram of hash into an OTP/MAC) are performed by the reader 505. In this embodiment the invention differs from conventional practice in how the reader 505 obtains the symmetric secret strong authentication key. To obtain this secret symmetric authentication key, the reader 505 relies on an operation of the card 500 involving the card's private key 510. The main steps of a basic embodiment of this method are as follows:

1. If required (i.e. the card protects usage of the private key by a PIN) the reader asks the user to enter the PIN and submits that PIN to the card.
2. Assuming the card 500 accepts the PIN, the unconnected card reader submits a fixed value to the card to be signed by the private key. This fixed value is further referred to as the 'reader-to-card challenge'.
3. The card signs the given challenge with its private key and returns the resulting cryptogram to the reader. This resulting cryptogram is further referred to as the 'card-to-reader signature response'.
4. The reader uses the resulting cryptogram as a seed to derive a symmetric secret key. This key is further referred to as the 'derived strong authentication secret key'.

The reader dynamically personalizes the strong authentication algorithm (that is entirely carried out by the reader) with that derived strong authentication secret key. In other words the reader carries out the strong authentication token algorithm using the derived strong authentication secret key.

FIG. 5 illustrates a suitable embodiment showing the interaction of reader 505 and card 500. The process may require the user to enter a PIN 510 in order to unlock the card 500. This step is optional, but if performed, the PIN entered at 510 by the user is communicated 511 to the card 500 to be tested. The card either accepts or rejects the PIN. The response of the card 500 is tested, 512 and only if accepted does the process continue. Thereafter function 513 captures input values from some or all of the reader, the user or the card. Function 514 may format some or all of the input values. Some or all of these values, or others, may form a reader-to-card challenge 515*a* which is sent (function 515) to the card 500. The card 500 uses the challenge 515*a* by performing a cryptographic operation with the card's private key 510. The resulting cryptogram, the card to reader signature response 516*a*, is communicated back to the reader, function 516. The response 516*a* is then used as a seed to create a secret value or key 517*a* via function 517. Key 517*a* is termed a derived secret strong authentication key. The key 517*a* is then used in a cryptographic operation, at function 518 along with the formatted value provided by function 514. Finally the resulting cryptogram is transformed at function 519 to produce the OTP or MAC.

The 'reader-to-card challenge' 515*a* could be any of the following:

1. A fixed value that is the same for all readers of a certain batch.
2. A fixed value that is fixed for a given reader but that has a different value for each reader.
3. A fixed value that is constant for a given user but that can be different for different users and that is entered at least once in the reader by the user. In practice it is very likely that this value will be entered either every time the card is used, or only the first time that a given card is used with a certain reader and will then be remembered by the reader.
4. Static data stored on the card that can be read by the reader (e.g. the public key and certificate, or a card serial number).
5. A combination of any of the above.
6. A value derived from any of the above. The derivation optionally including the use of some reader secret.

The algorithm to derive the strong authentication secret key from the 'card-to-reader signature response' could make use of the following techniques (among others):

1. Extracting bits of some data elements
2. Concatenating some parts of some data elements
3. Symmetric encryption/decryption algorithms (e.g. DES, AES, . . . )
4. Hashing algorithms (e.g. SHA-1)

The algorithm to derive the strong authentication secret key 517*a* from the 'card-to-reader signature response' 516*a* could make use of the following extra data elements besides the 'card-to-reader signature response' 516*a*:

1. A fixed value that is the same for all readers of a certain batch.
2. A fixed value that is fixed for a given reader but that has a different value for each reader.
3. A fixed value that is constant for a given user but that can be different for different users and that is entered at least once in the reader by the user.
4. Static data stored on the card that can be read by the reader (e.g. data associated with the private key such as the public key and certificate, or a card serial number).
5. A combination of any of the above.

This description only mentions the use of a single private key of a smart card and a single operation with that key; if the card contains more than one private key the reader could submit the 'reader-to-card challenge' 515*a* to each of these card private keys and combine the resulting 'card-to-reader signature responses' 516*a* in the derivation of the 'derived strong authentication secret key' 517*a*.

Similarly the reader could also submit different 'reader-to-card challenge' values 515*a* to the card and combine the resulting 'card-to-reader signature responses' 516*a* in the derivation of the 'derived strong authentication secret key' 517*a*.

In yet another embodiment the reader does not rely on a single 'reader-to-card challenge' 515*a* and corresponding 'card-to-reader signature response' 516*a* and 'derived strong authentication secret key' 517*a*, but instead uses a set of 'reader-to-card challenges' 515*a* and corresponding 'card-to-reader signature responses' 516*a* and 'derived strong authentication secret keys' 517*a*. To obtain a 'derived strong authentication secret key' 577*a* the reader selects one of these 'reader-to-card 515*a* challenges' and submits it to the card. Which 'reader-to-card challenge' 515*a* is selected determines the corresponding 'card-to-reader signature response' 516*a* and 'derived strong authentication secret key' 517*a*. This selection therefore must happen in a way that is predictable to the validation server. The reader can e.g. cycle through the set of 'reader-to-card challenges' 515*a* in a fixed order or can select a 'reader-to-card challenges' 515*a* depending on the value of the input(s) to the strong authentication token algorithm. A simple example of the latter method is that the strong authentication token algorithm works in challenge-response mode and that one specific digit (e.g. the last digit) of the challenge indicates the index of the 'reader-to-card challenge' to be used.

Because the private key is different for each card, the derived secret key will for a given challenge be specific to a given card. In other words, the secret key that is used in the strong authentication algorithm in the reader is function of the card (or more precisely: of the private key 510 in that card). That means that in principle one needs to have access to the correct card to be able to generate a correct OTP.

In most cases the private key is PIN protected, so that in addition to having access to the correct card, one also needs to know the card's PIN to be able to generate a correct OTP.

If the fixed value which the reader submits to the card to be signed by the private key can be different for different readers, then one needs besides the other elements (e.g. access to the correct card and knowledge of the card's PIN) also the correct reader. Note: such usage of a value that is different for different readers, effectively 'binds' the reader to the card.

For the validation server to be able to validate the strong authentication OTPs and/or MACs generated in this way, it must know the value of the derived strong authentication secret key 517a. The server must therefore know the card's signature response 516a. The card signature response for a given card challenge is determined by the card's private key 510 and cannot be calculated without access to the private key 510. One consequence of this is that the server must have access to the card's private key 510 (directly or indirectly) at least once.

If the key pair is generated internally on the card this means that the server needs access to the card at least once, so that the server can submit to the card the card challenge(s) that will be applicable for this user and retrieve and store the card response(s) to that challenge(s) (indirect access to the private key). If the key pair is generated externally and then injected in the card, the server could use the private key directly to encrypt the challenge(s) before the private key outside the card is destroyed.

Only then is the server able to calculate the corresponding derived strong authentication key from the encrypted card challenge. The disadvantage of this is that, in practice, either the user will have to grant the server access to his/her card during a sort of registration phase, or (in case of external key generation) the server must be allowed to encrypt the challenge with the private key value before that private key value is destroyed.

Another consequence is that in practice for a certain user, the derived strong authentication secret key must remain unchanged. Since the derived strong authentication secret key is derived from the card's signature response to a certain card challenge, that card challenge and the corresponding 'card-to-reader signature response' must remain fixed for a given user. The disadvantage of this is that, if an attacker obtains the value of the 'card-to-reader signature response' of a certain user, then that attacker could potentially make fake cards that always return that recorded 'card-to-reader signature response' value when inserted in a reader.

Including reader specific or user specific data elements in the generation of the 'reader-to-card challenge' and/or the derivation of the 'derived strong authentication secret key' from the 'card-to-reader signature response' can make it harder for an attacker to obtain the value of the correct 'card-to-reader signature response' or to exploit that value with a reader to generate in a fraudulent way correct OTPs or MACs.

Another way to make it harder for an attacker to obtain the correct 'card-to-reader signature response' is to not rely on a single 'reader-to-card challenge' and corresponding 'card-to-reader signature response' and 'derived strong authentication secret key', but instead use a set of 'reader-to-card challenges' and corresponding 'card-to-reader signature responses' and 'derived strong authentication secret keys' as explained above.

In the following embodiment, the requirement for the server to have access at least once to the card to perform a private key operation is eliminated altogether.

In this embodiment, the value of the symmetric secret authentication key is not dependent (directly or indirectly) on the value of the card's private key. The symmetric secret authentication key is not derived from a seed that is generated by the card by means of an asymmetric cryptographic operation involving the card's private key. Instead the reader is personalized with the symmetric secret authentication key or with secret data from which the reader can dynamically derive the symmetric secret authentication key. With this symmetric secret authentication key the reader can generate OTPs or MACs just like a traditional strong authentication token. Usage of the reader is protected and reserved to the legitimate user by logically binding the user's card to the reader. Once the user's card has been bound to the reader, the reader will only generate an OTP or MAC if the user inserts the card that was bound to the reader. The card thus functions as an access key to unlock the personalized reader.

Figure 6:
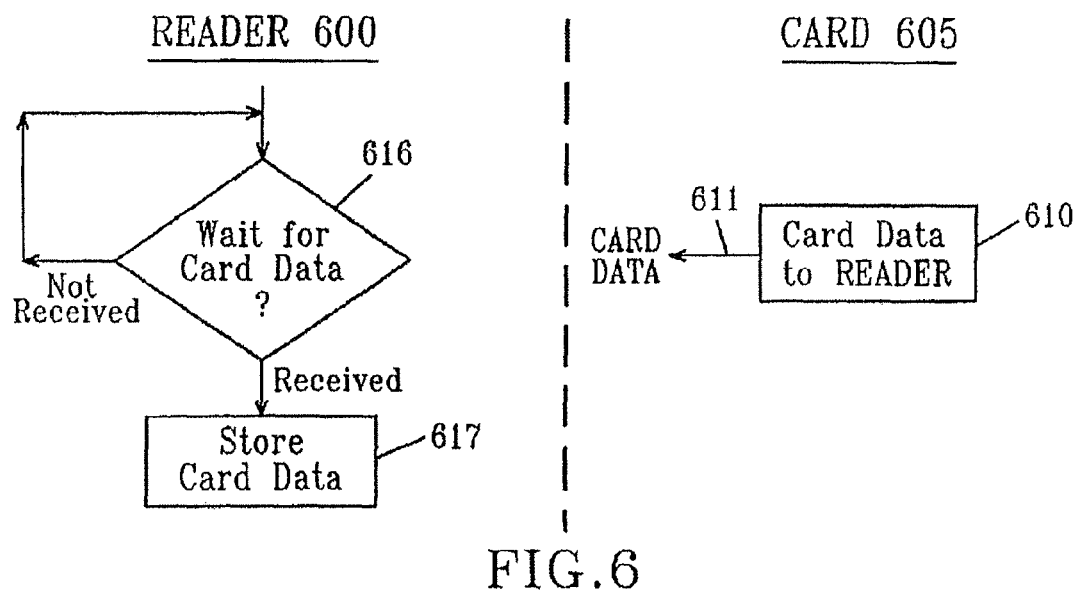
FIGS. 6 and 7 are flow diagrams of still another embodiment of the invention in which the smart card is used to authenticate the user to the reader, which in turn produces a cryptogram from which an OTP or MAC is derived, in this embodiment the user's smart card is bound to the reader in an initial operation (FIG. 6) and operation thereafter is represented in FIG. 7.

At first usage, the reader will request the user's card to be inserted. Upon insertion of the card, the reader binds itself logically to the inserted card in the following way. The reader determines and remembers some specific individual characteristics of that card. These characteristics can include:
- card serial number
- card's public key and/or certificate
- the card's response to a given challenge (where the response is defined as the encryption of the challenge by the card's private key. Note: this would typically require the user to submit the PIN to unlock the private key). This challenge and the corresponding card's response must be remembered by the reader. The challenge can be:
  - a fixed over-all challenge (same for all cards and all readers)
  - fixed challenge per reader
  - fixed challenge per card (e.g. randomly generated by the reader upon first presentation of the card and then remembered by the reader)
  - challenge provided by user
  - a combination of any of the above An example of this operation is illustrated in FIG. 6. The reader 600 awaits receipt of card data (function 616). The card provides some card data 611 to the reader (function 610). When the reader receives the card data 611, that data is stored (function 617).

Figure 7:
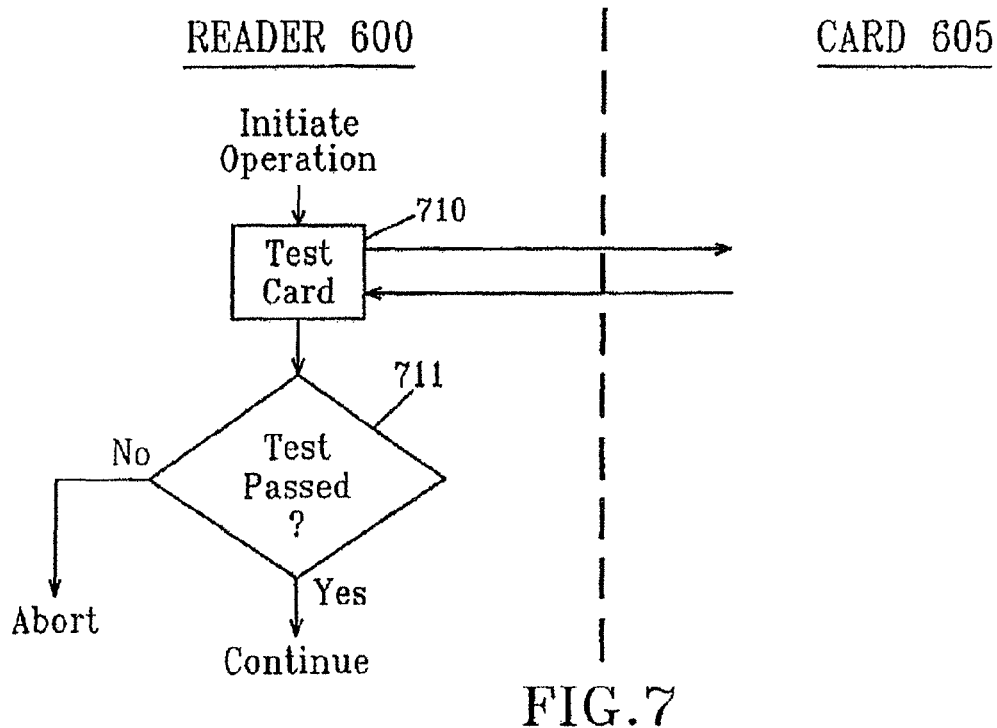

If the user wants to generate a dynamic password or signature (see FIG. 7), the reader asks for the card that was bound to that reader. The reader checks whether the presented card is indeed the expected card. I.e. it will retrieve the characteristics of the presented card (function 710) and compare them with the stored characteristics of the card bound to the reader (function 711). This step can include:
- reading the card's serial number
- reading the card's public key and/or certificate
- submitting a (stored) challenge to the card for encryption by the card's private key (which may require the user to provide the PIN to unlock the private key) and receiving the card's response.
- Upon successful validation of the presented card, the reader proceeds with performing the strong authentication algorithm as an ordinary strong authentication token.

To strengthen the security, many variations are possible. The reader can derive the symmetric secret authentication key from:
- a data element pre-personalized in the reader,
- and/or a data element provided to the reader by the user,
- and/or a data element that the reader reads from the card.

Preferably, these data elements are secret. Instead of using always the same challenge and corresponding card response that was used and obtained when the card was bound to the reader, the reader can use multiple pairs of challenges and corresponding responses. Variations on this principle include:
- When the card is bound to the reader, the reader generates and submits more than one challenge to the card and remembers the corresponding card responses. When the reader later on needs to validate the card, it can submit any subset of these challenges to the card and check whether the card's responses match the stored responses.

When the reader has successfully validated the inserted card, it can generate a new challenge and obtain a corresponding response from the card. This new challenge-response pair can then be remembered by the reader as an alternative or additional pair to the already previously known challenge-response pair(s).

These two variations can be combined.

Figure 8:
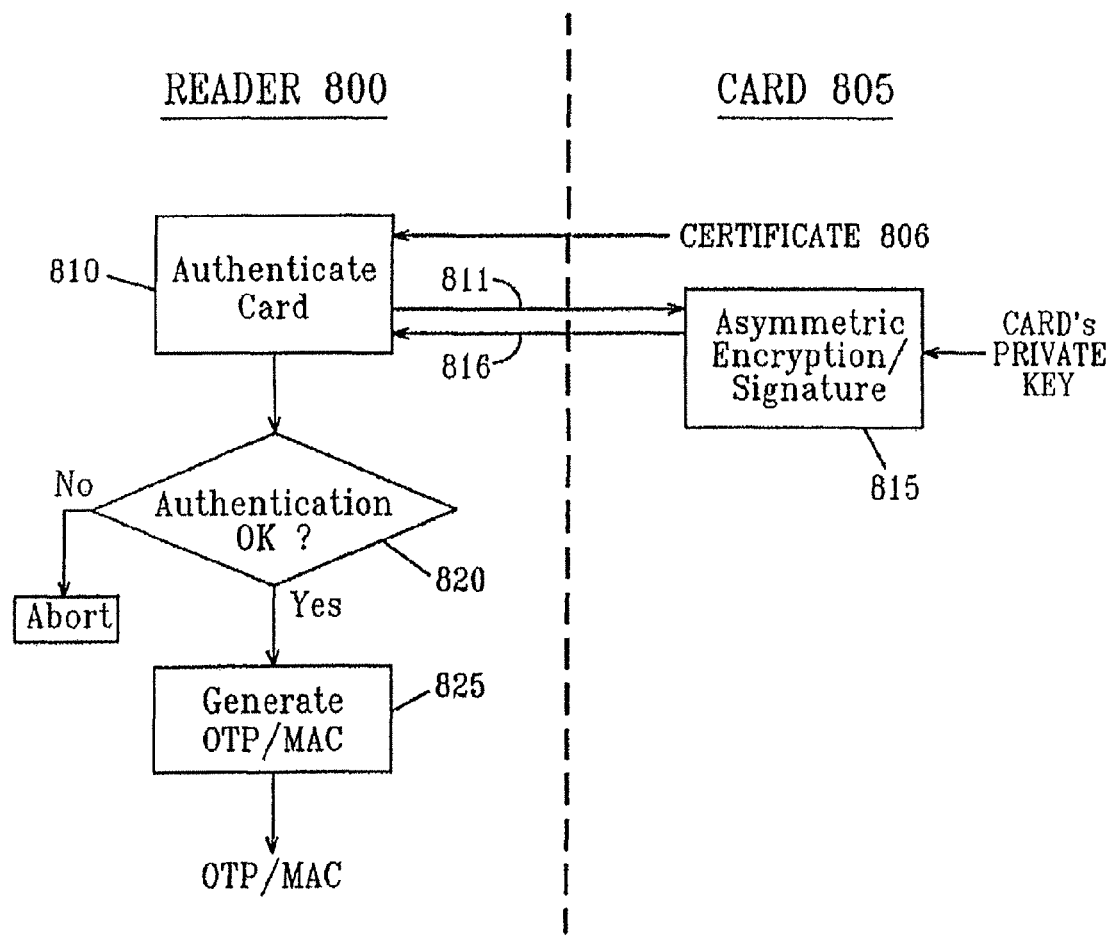
FIGS. 8 and 9 are flow diagrams of still another embodiment of the invention in which the smart card, including a PKI certificate, is used to authenticate the user to the reader, which in turn produces a cryptogram from which an OTP or MAC is derived, in this embodiment a random user may be authenticated.
Figure 9:
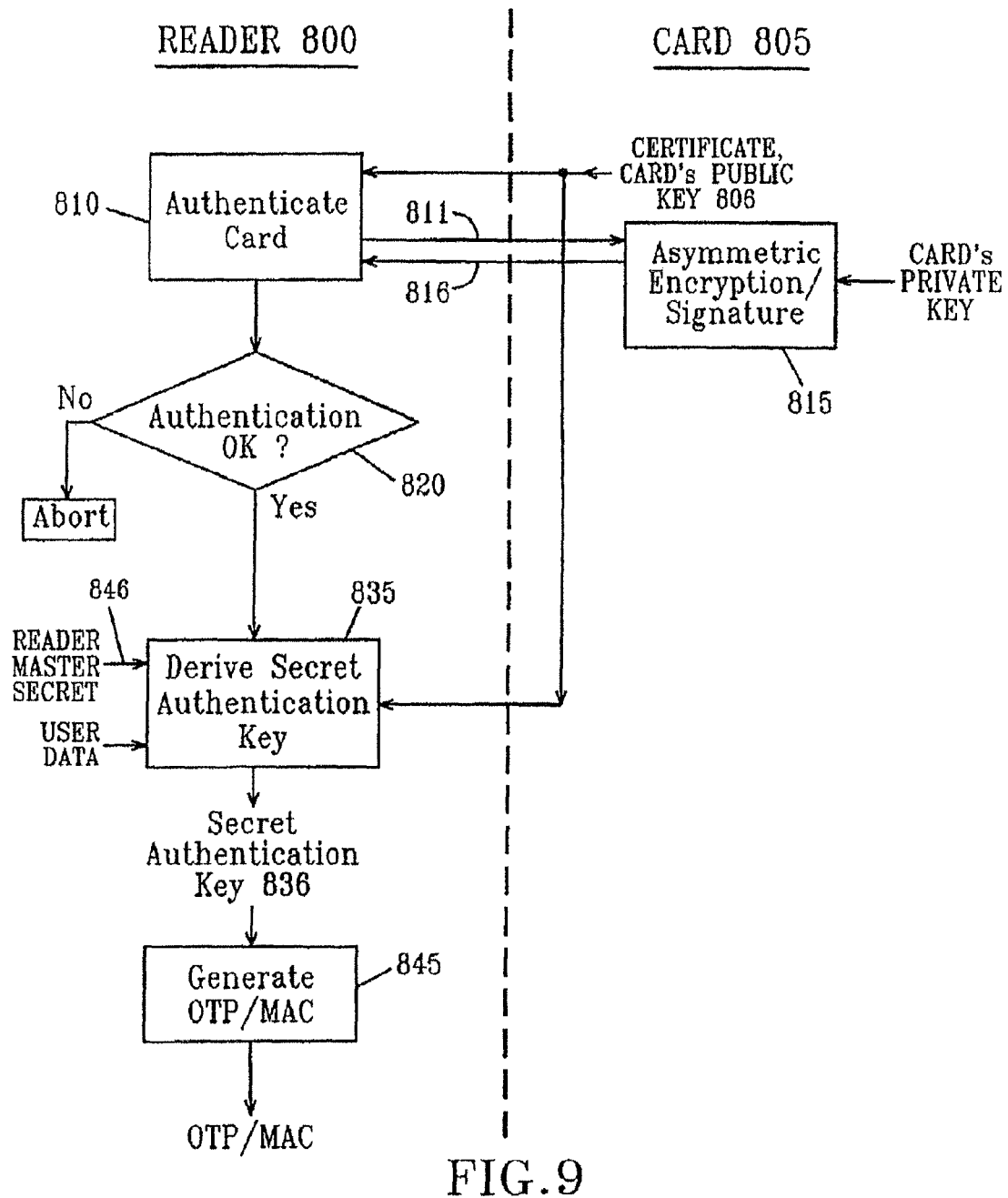

The principle of yet another embodiment (FIGS. 8 and 9) is as follows. On behalf of the server, the reader locally authenticates the user by means of a traditional certificate based authentication of the user's PKI card.

If the user was successfully authenticated by the reader, the reader generates an OTP or MAC (using a traditional strong authentication token algorithm) that can be validated by the validation server. The user can then submit this OTP or MAC to the server as proof that he has been successfully authenticated by the reader.

The reader locally authenticates the user by means of the user's inserted PKI card and using traditional PKI technology. In a typical embodiment this can be done as follows (refer to FIG. 8):

1. The reader 800 validates the card's certificate 806 (or certificate chain).
    a. Note: this assumes that the reader has access to the trusted public key of the (root) Certificate Authority. This can be done by storing the trusted public key of the (root) Certificate Authority in the reader.
    b. Note: the reader 800 does not have to do an explicit verification of the entire certificate (chain) starting from the (root) CA public key each time the card is inserted in the reader. Instead the reader 800 can do the entire verification when a card 805 is inserted for the first time into the reader. The reader can then store the verified certificate or the certificate's public key or a reference value derived from the verified certificate or public key (e.g. a hash of the certificate or public key). If the card 805 is then re-inserted at a later time, the reader 800 no longer has to do all the calculations associated with certificate validation, but can just compare the certificate on the card with the certificate or reference value stored in the reader.
2. The reader 800 does a challenge-response authentication of card's private key:
    a. Reader (810) generates a challenge 811, e.g. typically a random number or some other non-predictable value that is e.g. derived from a time value or counter value with a cryptographic algorithm using some secret stored in the reader.
    b. The user provides the PIN protecting the card's private key.
    c. The reader 800 submits the PIN to the card.
    d. The reader 800 submits a random challenge 811 to card to be encrypted by card's private key.
    e. The card signs (815) the reader challenge with its private key and returns response (=encrypted challenge 816).
    f. The reader 800 decrypts card's response with card's public key (from the certificate).
    g. The reader compares 820 decrypted card's response with originally generated challenge. If the decrypted card's response is the same as the originally generated challenge, then the card's private key is authenticated and hence the user is authenticated.

In essence the reader generates (825) an OTP/MAC in the same way as a traditional strong authentication algorithm. All the steps of this algorithm (capturing the inputs, formatting the inputs, encrypting or hashing the formatted inputs, transforming the resulting cryptogram of hash into an OTP/MAC) are done by the reader 800 in essentially the same way as a traditional strong authentication token. In one embodiment the reader is personalized with a symmetric secret strong authentication key. In that case the reader 800 is also typically configured to expect a specific card. The reader recognizes this card by means of some characteristic value of a data element of the card. Typically the card's certificate is used as such a data element. In other embodiments (see FIG. 9), in order to avoid having to personalize and configure the readers, the reader 800 derives (835) a card-specific value for the symmetric secret strong authentication key from the following data elements:

- public card data preferably related to the card's certificate or public key (e.g. card serial number, certificate serial number, public key, etc.)
- a master key 846 stored in the reader and known to the server. This master key can be:
    - an identical value for all readers
    - a specific/unique value for each individual reader. This requires some kind of assignment of the reader to the user, and registration of this assignment at the server.
- an (optional) extra derivation data element could be a (secret) data element that is provided to the reader by the user. The user must explicitly provide this data element:
    - either, each time the reader and card are used in this way or,
    - only when this card is used for the first time with this reader (after which the reader will remember the provided value of the data element for this card)

The reader 800 uses the derived card-specific symmetric authentication key 836 in a symmetric strong authentication algorithm (such as the Digipass algorithm or OATH) to generate (845) a dynamic password (challenge-response and/or time and/or event based) or generate (845) a MAC-type of electronic signature on some transaction data (optionally including time and/or event counter information).

A Server validates the generated dynamic password or signature as follows:

The server derives the same card-specific symmetric strong authentication key as the reader. This assumes that the server has a database (or an alternative way of retrieving the required information) that links the user to:
- the public card data,
- the data element provided by the user (if applicable)
- and the reader's master key
    - Note: instead of doing this derivation each time a validation must be done, the derivation can also be done once and the resulting derived key can be stored in a database for future use.

The server validates the dynamic password or signature in the same way as it would do for a traditional strong authentication token.

Figure 10:
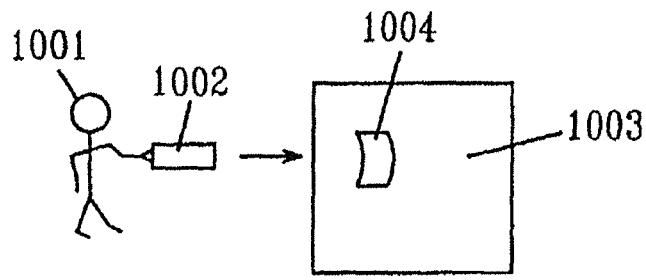
FIGS. 10 and 11 illustrate actions taken in an initial session to capture information allowing operation of various embodiments of the invention.
Figure 11:
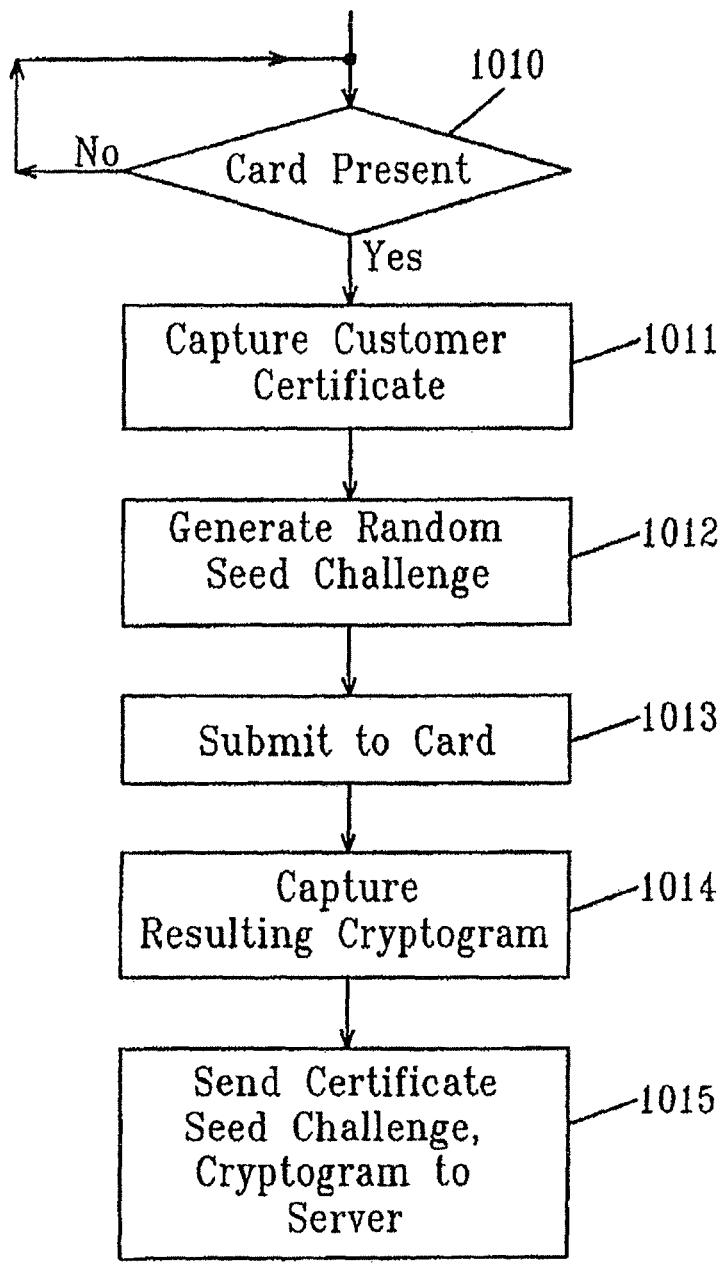

A typical embodiment operates as follows (FIGS. 10-11):
In an enlistment phase, a bank customer 1001 goes to a bank branch 1003. Using his national electronic identity card (e-id card 1002) with a Bank Branch Terminal (BBT), the customer electronically signs an e-banking contract 1004.

While the customer's e-id card is inserted in the BBT (1010), the BBT:
- captures the customer's certificate (1011),
- generates a random seed challenge (1012), submits the random seed challenge to the e-id card (1002) to be encrypted by the card's private key (1013), captures the card's cryptogram on that challenge (1014).

Finally, the BBT sends the customer's certificate, generated seed challenge, and the card's cryptogram on the seed challenge to a server (1015). The server stores this data in a database linked to the customer. The bank then delivers an unconnected smart card reader to the customer. This reader contains a secret master key. The bank also sends the customer a PIN mailer with the value of the seed challenge that was generated and used by the BBT. The authentication server is also informed of the value of the secret master key.

When the customer uses the reader for the first time:
The reader asks for the customer's e-id card to be inserted.
The reader also asks for the PIN mailer's seed challenge and stores it in memory.
The reader reads the card's certificate and stores it also in memory.
The reader generates a random reader challenge and submits it to the card to be encrypted by the card's private key. The reader stores both the reader challenge and the corresponding cryptogram generated by the card.

If the customer wants to generate an OTP (or MAC or response or . . . ) the reader goes through the following steps:
The reader asks for the customer's e-id card to be inserted.
The reader validates the card:
  The reader reads the card's certificate and compares it to the certificate that was stored.
  If that checks OK, the reader submits the stored reader challenge to the card for signature and compares the card's cryptogram with the stored cryptogram.
If the reader has successfully validated the card, the reader generates the secret authentication key:
  The reader submits the stored PIN mailer seed challenge to the card to be encrypted by the card.
  The reader now derives a secret authentication key from:
    the secret master key in the reader,
    the PIN mailer seed challenge,
    the card's cryptogram on that PIN mailer seed challenge,
    the card's certificate.
The reader now uses the generated secret authentication key in a strong authentication algorithm (e.g. to generate an OTP or a MAC).

The authentication server is capable of verifying the resulting OTP (or MAC) since it had access to all the data necessary to generate the secret authentication key:
  the reader's secret master key,
  the card's certificate,
  the PIN mailer challenge,
  the card's cryptogram on the PIN mailer challenge.

Using the generated secret authentication key, the authentication server can validate the OTPs or MACs in the same way it would validate OTPs or MACs generated by traditional strong authentication tokens.

Alternatively the authentication server can use either of the procedures shown in FIG. 13 or 14 for a validation operation.

In connection with the procedure of FIG. 13, we assume that the cryptogram produced by the reader is transformed using a sequence of transform A (1306) and transform B (1307). For validation purposes the server subjects the OTP or MAC to the reverse transform B (1327) to produce a modified OTP or MAC and then subjects the reference cryptogram to transform A (1325) to produce the modified reference cryptogram. Finally the server effects a comparison of the modified reference cryptogram and the modified OTP or MAC.

In connection with the procedure of FIG. 14, we assume that the cryptogram produced by the reader is transformed using a sequence of the bit selection (1355), concatenation (1356) and bit string transformation (1357) as shown in FIG. 14 to produce the OTP or MAC. For validation purposes the server subjects the OTP or MAC to the bit stream and expansion processes 1359 and 1360 of FIG. 14 to produce a modified OTP or MAC. The server subjects the reference cryptogram to operation 1364 to produce the modified reference cryptogram. Finally the server effects a comparison (1365) of the modified reference cryptogram and the modified OTP or MAC to effect validation.

FIGS. 15-22 illustrate various aspects of a particular set of embodiments of the invention. The following devices and data elements play a role in these embodiments:

Devices

PKI Device

Figure 15:
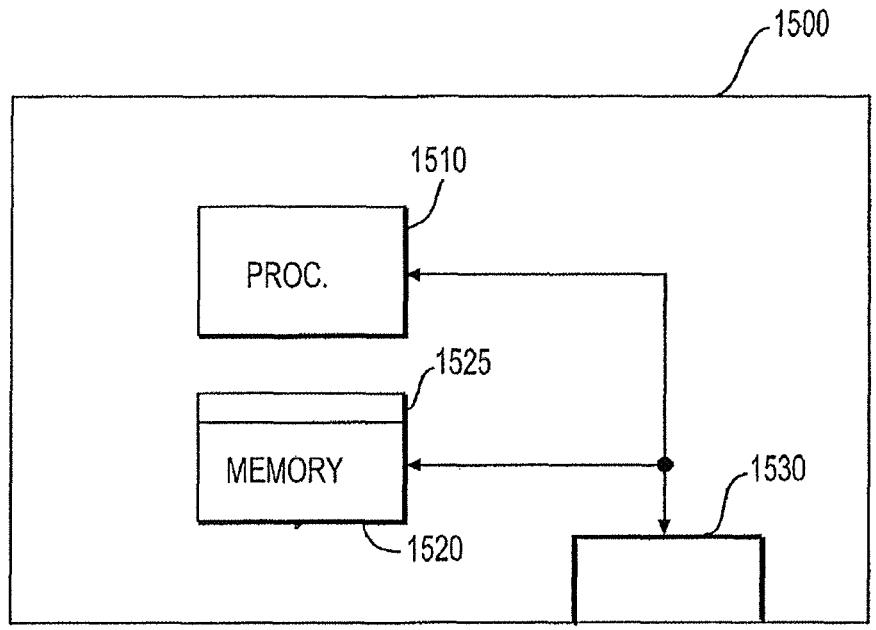
FIG. 15 is a diagram of one embodiment of a PKI device.

In the context of this set of embodiments a PKI device 1500 is an apparatus, illustrated in FIG. 15, comprising a memory 1520 for storing at least one private key of a public-private key pair and data processing means 1510 comprising one or more data processing components (such as an Infineon SLE66CLxxx microcontroller) to perform asymmetric cryptographic operations with this private key. The PKI device 1500 may also comprise a memory 1525 to store additional private keys and/or one or more public keys associated to these one or more private keys and/or one or more certificates associated with these one or more public keys. The asymmetric cryptographic calculations typically include the generation of digital signatures. The PKI device 1500 may furthermore be capable of other types of cryptographic operations. It may also store other types of data including user related data such as a user name or a unique number related to the user. In a typical embodiment the PKI device 1500 furthermore includes a communication interface 1530 to electronically communicate and exchange data with certain reader devices including to receive data from such a reader device, to receive instructions from the reader device to perform an asymmetric cryptographic operation with an asymmetric private key stored on the PKI device on certain data provided by the reader device, and to return a result of this asymmetric cryptographic operation. In a typical embodiment this includes digitally signing with a private key certain data provided by the reader device and returning the resulting signature. In some embodiments the communication interface 1530 may include a USB interface. In other embodiments the communication interface may include a smart card interface. In a typical embodiment the smart card interface is according to the ISO/IEC 7816 set of standards. In some embodiments the PKI device may comprise a USB token. In other embodiments the PKI device may comprise a smart card. In some embodiments the PKI device may be issued by a government agency to at least some citizens. The PKI device may for instance comprise an electronic national identity card. In other embodiments the PKI device may be issued by financial institutions for example to their customers. In still other embodiments the PKI device may be issued by a company offering telecommunication services. In some cases the PKI device may comprise a SIM (subscriber identity module) card. In some embodiments operations involving the usage of the PKI device's private key are protected by a PIN code. In typical embodiments the private keys stored in the PKI device are only known to the PKI device and cannot be read from it. In a particular embodiment the PKI device comprises a PKI smart card containing at least one public-private key pair with associated certificate capable of generating digital signatures with the private key whereby the usage of the private key is protected by a PIN code.

Reader Device

Figure 16:
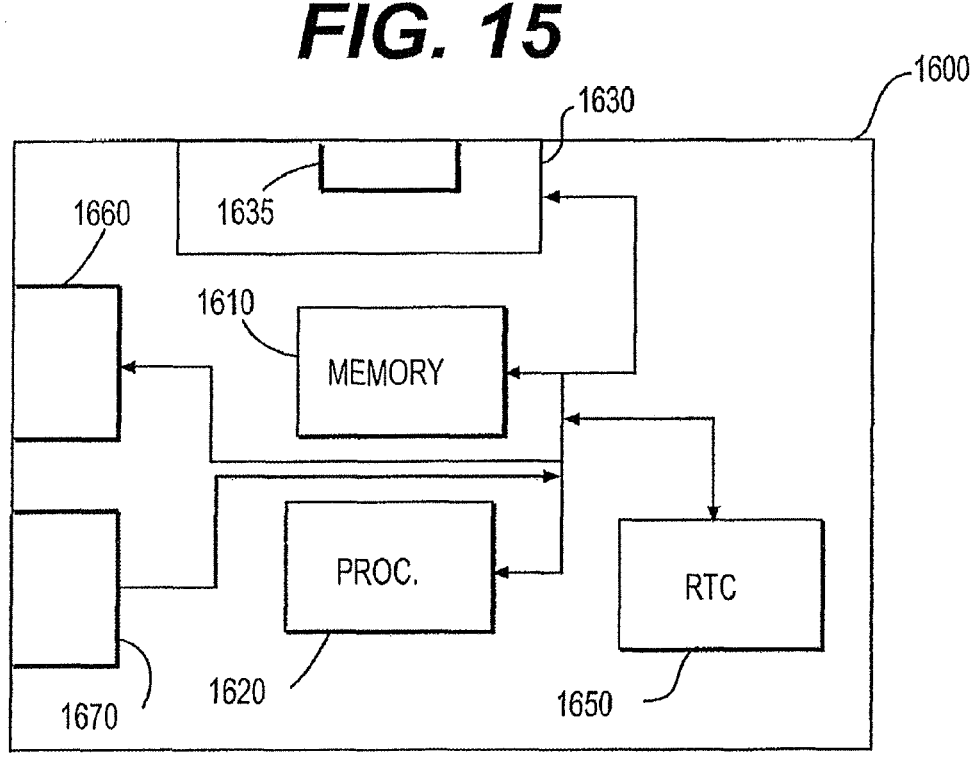
FIG. 16 is a diagram of an embodiment of a reader.
Figure 17:
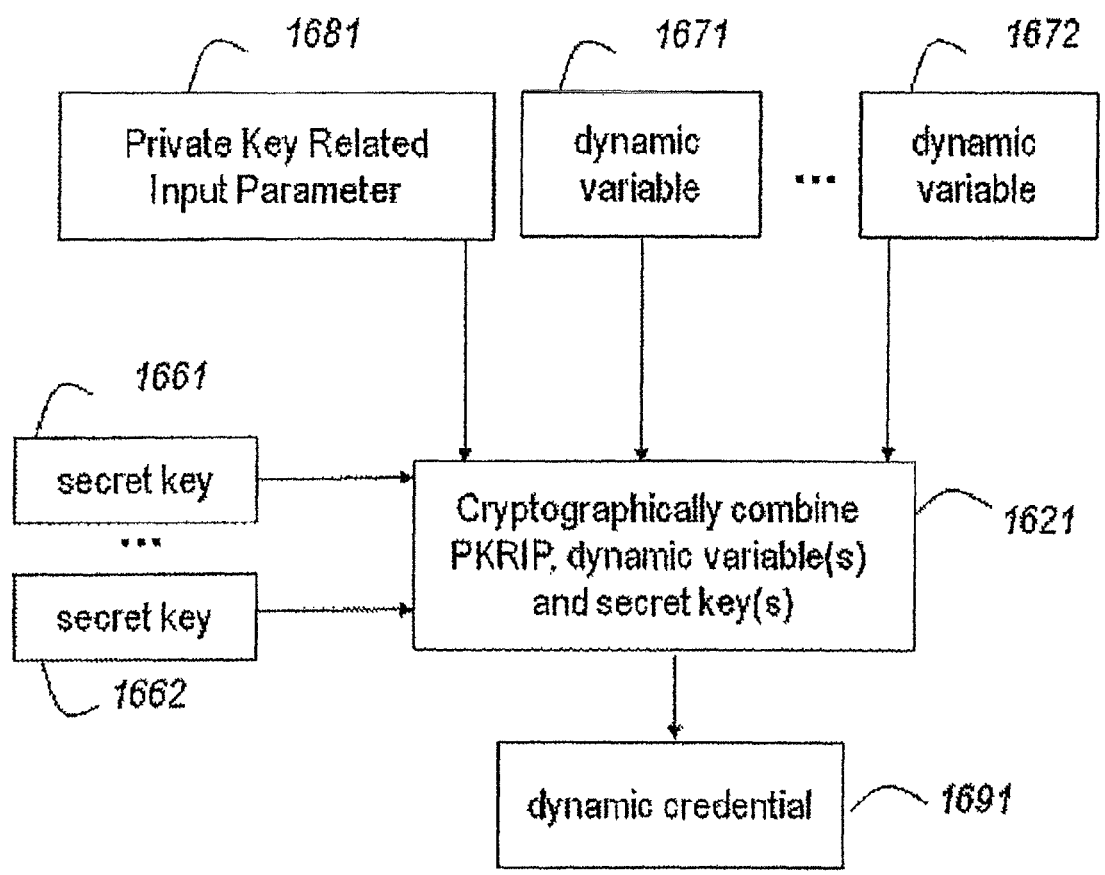
FIG. 17 represents the data employed in a protocol for creating a dynamic authentication credential in accordance with an embodiment of the invention.

In the context of this set of embodiments a reader device 1600 is an apparatus, illustrated in FIG. 16, comprising an electronic communication interface 1630 to electronically communicate and exchange data with certain PKI devices. In a typical embodiment this includes providing certain data to the PKI device and instructing the PKI device to perform an asymmetric cryptographic operation with an asymmetric private key stored on the PKI device on the data provided to the PKI device and receiving from the PKI device a result of this asymmetric cryptographic operation. In a typical embodiment this may comprise instructing the PKI device to digitally sign with a private key stored on the PKI device certain data provided by the reader device and receiving the resulting signature. In some embodiments the reader device's electronic communication interface 1630 may include a smart card reader 1635 to interface with PKI devices comprising a smart card. In a typical embodiment the smart card reader 1635 complies with the ISO/IEC 7816 set of standards. The smart card reader's smart card interface may also comply with the EMV specifications issued by EMVco (see www.emvco.com). In other embodiments the reader device's electronic communication interface 1630 may include a USB interface e.g. to interface with PKI devices comprising a USB token.

The reader device 1600 furthermore comprises processing means 1620 comprising one or more data processing components adapted to perform symmetric cryptographic operations. The data processing components may for example comprise a suitably programmed microprocessor, a microcontroller, an FPGA (Field Programmable Gate Array) or an ASIC (Application Specific Integrated Circuit). The data processing components may for example comprise a Texas Instruments MSP430 microcontroller. These symmetric cryptographic operations include the generation of a dynamic authentication credential, such as OTPs or electronic signatures, whereby the reader device's processing means uses a symmetric cryptographic algorithm to combine at least one or more symmetric secret values with one or more dynamic variables and whereby the dynamic authentication credential is derived from the result of that combination. In a typical embodiment (see FIG. 17) the symmetric cryptographic algorithm 1621 generates dynamic credential(s) (1691) by combining at least one or more secret keys (1661, 1662, etc.) with one or more dynamic variables (1671, 1672, etc.) and also with a data element (Private Key Related Input Parameter (1681): see below) that is a function of a private key stored in a PKI device. In another embodiment the symmetric cryptographic algorithm generates dynamic credential(s) by combining one or more dynamic variables with a symmetric secret value that is or is derived from the Private Key Related Input Parameter. In some embodiments the symmetric cryptographic algorithm generating dynamic credentials may comprise a symmetric encryption or decryption algorithm such as DES or AES. In a typical embodiment the generation of a dynamic authentication credential comprises the encryption or decryption, with a secret symmetric key, using a symmetric encryption or decryption algorithm, of a combination of at least one or more dynamic variables with a Private Key Related Input Parameter. In some other embodiments the symmetric cryptographic algorithm may comprise a keyed-hash algorithm. In a typical embodiment the generation of a dynamic authentication credential comprises hashing a combination of a secret value, a dynamic value and a Private Key Related Input Parameter. The dynamic variable may include a time related value, a counter value, a challenge provided by some application, transaction related data, or a combination of the aforementioned. In a specific embodiment the symmetric cryptographic algorithm comprises a known or standardized symmetric algorithm to generate OTPs or electronic signatures that combines a symmetric secret with a first external dynamic variable and a second internal or external dynamic variable and whereby the reader device assigns the value of a Private Key Related Input Parameter to the first external dynamic variable. The known or standardized symmetric algorithm to generate OTPs or electronic signatures may include an OATH or DIGIPASS challenge-response or transaction data signing algorithm.

The reader device 1600 may comprise a real-time clock 1650 to provide a time-related value. It may also comprise a memory 1610 to store a counter value. It may furthermore comprise a memory 1610 to store one or more secret keys or secret values. It may also comprise one or more other memory components 1610 to store data such as a PKI device specific or private key specific challenge, or data related to a PKI device or a private key on the PKI device that permits the reader device later on to recognize that PKI device or that private key on the PKI device.

The reader device 1600 furthermore comprises one or more output components 1660 to output at least the dynamic authentication credential(s). In a typical embodiment the reader device may also use the output components to output a Private Key Code (see further). In some embodiments the output components 1660 comprise a display. Different types of displays can be used. The display may comprise for example a CRT (Cathode Ray Tube), LED (Light Emitting Diode), or LCD (Liquid Crystal Display) display. The output components may also comprise a display or LCD controller. In other embodiments the output components 1660 generate an output in acoustical form, such as an electromagnetic speaker. In other particular embodiments these output components are adapted to generate and output synthesized voice.

In some embodiments the reader device 1600 may furthermore comprise input components 1670 to receive data such as external dynamic variable values (e.g. a challenge or transaction data), or a PIN value e.g. to be submitted to a PKI device, or an Activation Code. In some embodiments the input components may comprise a keyboard or a keypad. In other embodiments the input components may comprise an optical interface comprising a plurality of light sensors.

In a typical embodiment the reader device has an autonomous power supply such as one or more batteries. In some embodiments these batteries may be replaceable.

Server-Side Components

The reader device described above is typically used by a user in conjunction with a user's PKI device for generating dynamic credentials to secure some computer-hosted application. In a typical embodiment the computer-hosted application interfaces with or comprises one or more authentication components for verifying dynamic credentials received from the application's users. Other server-side components may comprise one or more databases to store data linked to specific users such as a reader device identifying data element of a reader device associated with a specific user or the value of a Private Key Related Input Parameter associated with a specific user, and/or data linked to specific reader devices such a one or more secret keys.

Application Server

The computer-hosted application is typically hosted by an application server which the user can access via a network. In a typical case the application is web-based, the application server is a web server, the network is the internet, and the user can access the application by means of a browser on a web-enabled client device. In other embodiments the application may have an IVR (Interactive Voice Response) interface and the user may access the application via a telephone network. In still other embodiments the application is present on a local computer device that is directly accessed by a user. In all these cases, including the latter case we will refer to the application and its associated components as the server-side and server-side components.

Authentication Software/Server/Appliance

Figure 18:
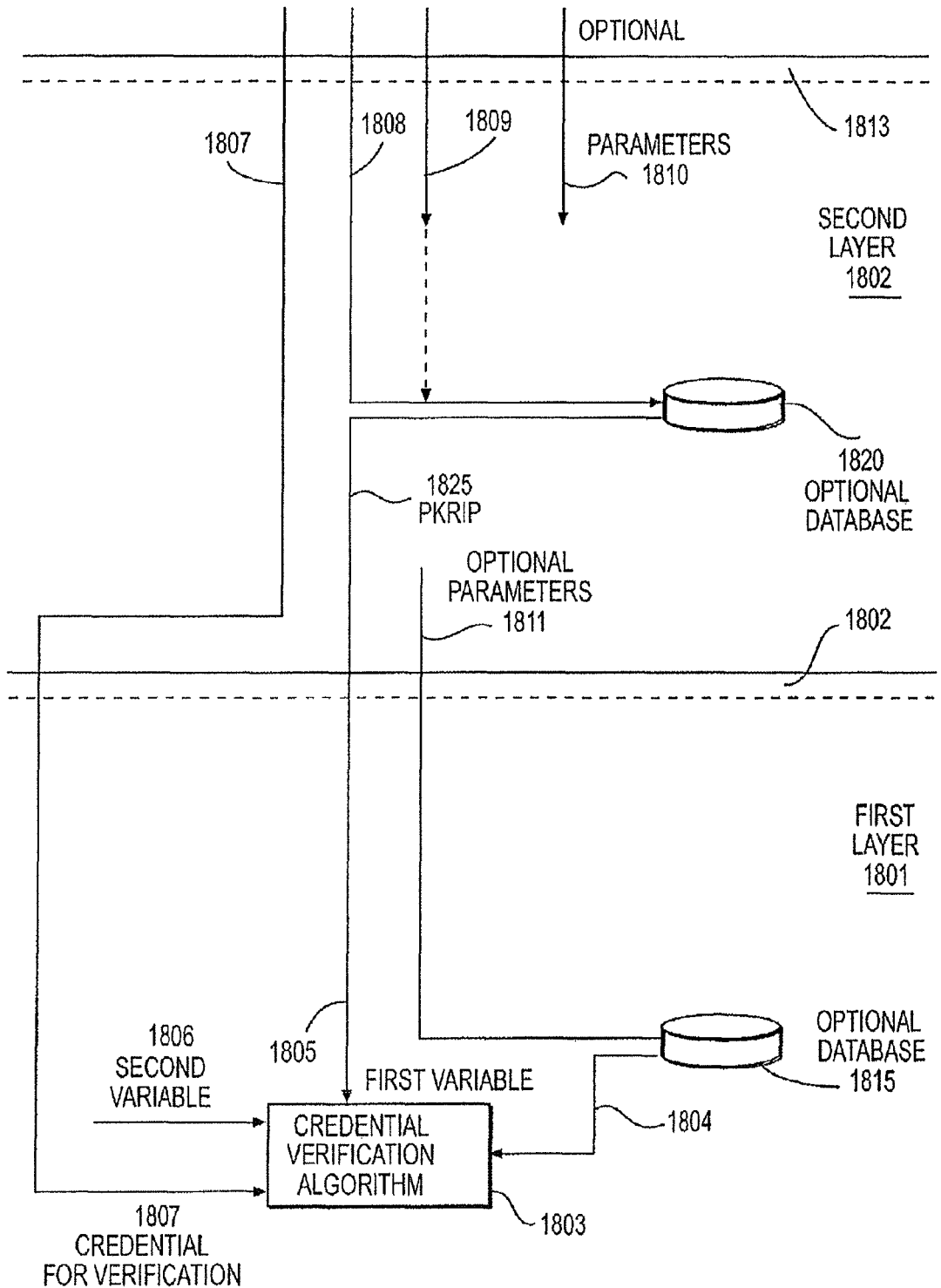
FIG. 18 illustrates the architecture of server side components to verify dynamic credentials according to an embodiment of the invention.

One or more of the authentication components may comprise an authentication software library that is integrated into application software and that offers dynamic credential verification functionality to the application. In other embodiments one or more authentication components may comprise a stand-alone authentication server using some authentication protocol for verifying received dynamic credential(s). In some embodiments one or more authentication components may comprise an authentication appliance. In a typical embodiment, as illustrated in FIG. 18, two levels or layers can be distinguished in the one or more authentication components.

A first (inner or core) layer 1801 comprises one or more components for verifying dynamic credential(s) using an existing or standardized dynamic credential verification algorithm that cryptographically combines at least one symmetric secret key with at least a first external dynamic variable (such as a challenge or transaction related data) and a second internal or external dynamic variable (e.g. a counter or a time dependent variable). In some embodiments additional external or internal dynamic variables may also be used by the verification algorithm. The interface of this inner or core layer contains at least a function or functionality for verifying dynamic credentials whereby the calling component is expected to pass the dynamic credential and at least the value of the first external dynamic variable and, if applicable, also the values of the additional external variables. In some embodiments the symmetric secret key is also passed by the calling component through the interface. In other embodiments the calling component passes a data element related to the user identity or a reader identifier and the inner layer comprises one or more components to determine the value of the symmetric secret key using the received data element related to the user identity or a reader identifier. This determining of the value of the symmetric key may include a database search using the received data element related to the user identity or a reader identifier as a search key.

A second (outer layer) 1802 includes an interface that includes a function or functionality for verifying a dynamic authentication credential that has been generated by a reader device (1600) as described above in connection to the description of a reader device (FIG. 16). The interface of the outer layer allows a calling application to pass a dynamic authentication credential to be verified along with a value that is related to the identity of the user that is supposed to have submitted the dynamic credential or an identifier of the reader that is supposed to have generated the dynamic credential and may optionally also allow to pass one or more external dynamic variables such as a challenge or transaction data. The outer layer comprises one or more components that, using the received user identity related value or reader identifier, determines or retrieves the value of a Private Key Related Input Parameter. Determining or retrieving the value of a Private Key Related Input Parameter may comprise doing a database search using the received user identity related value or reader identifier (or data related to it) as a search key. For the verification of the received dynamic credential the outer layer calls upon the inner layer passing it the received dynamic credential to be verified along with the obtained value of the Private Key Related Input Parameter which is assigned to the first external dynamic variable that the inner layer expects. If applicable the outer layer also passes the values of additional external dynamic variables (e.g. a challenge or transaction data) to the inner layer. In some embodiments, i.e. in cases the inner layer expects that the value of the symmetric secret key is passed through the interface, the outer layer comprises one or more components to determine the value of the symmetric secret key using the data element related to the user identity or a reader identifier that it received from the calling application. This determining of the value of the symmetric key may include a database search using the received data element related to the user identity or a reader identifier as a search key. In other embodiments the outer layer passes to the inner layer a data element related to the user identity or a reader identifier that the inner layer can use to determine the value of the symmetric secret key(s).

In some embodiments the dynamic credentials may have been generated using a User Identity Code (see below for details) in addition to the other data elements (symmetric reader key, PKRIP, dynamic variables). For verification of the received dynamic credentials the authentication components of the server-side also determine a User Identity Code value and then used in the verification calculations. In one embodiment the outer layer determines the User Identity Code and passes it to the inner layer as the value of an external dynamic variable that the inner layer expects (similarly to what is described above with respect to the Private Key Related Input Parameter).

In this way an embodiment of the invention can be produced by using, as the inner core, one or more existing components for verifying a dynamic credential which have not been designed to implement an embodiment of the invention disclosed herein, and adding only the outer layer comprising one or more components in accordance with embodiments of the invention disclosed herein.

Data Elements

User ID

In one set of typical embodiments users interact with an application or computer system and identify themselves to the application or computer system by means of User ID. In a preferred embodiment this User ID comprises a code that uniquely identifies each individual user. In some cases the User ID may comprise a name associated with the user. In other cases the User ID may comprise an account number. In some cases the User ID may comprise a number while in other case it might comprise an alphanumerical string. In some embodiments the User ID may be chosen by the application provider whereas in other embodiments the User ID may be chosen by the user.

Private Key Code and Private Key Related Input Parameter

The Private Key Related Input Parameter (PKRIP) is a data element that is used by the reader device 1600 to generate dynamic authentication credentials and that is used by the server-side to verify authentication credentials generated by the reader device. The Private Key Code is a data element that is originally generated at registration and enablement by the reader device 1600 and transported to the server-side and from which the server-side can calculate the PKRIP. The Private Key Code and the PKRIP are both a mathematical function of the user's private key from the user's PKI device. The reader 1600 mathematically derives the PKRIP from a cryptogram that is generated by the user's PKI device 1500 using the user's private key with an asymmetric cryptographic operation in response to a challenge (further also referred to as the PKRIP challenge) from the reader device. For example the PKRIP may be mathematically derived from the result of an asymmetric cryptographic operation, such as decryption or a signature, by the user's PKI device using the user's private key and an asymmetric cryptographic algorithm in response to a challenge from the reader device 1600. In some embodiments the deriving may include a hashing and/or truncation operation. In other embodiments the deriving may also include cryptographically combining a secret with data mathematically related to the private key or specifically the result of a decryption or a signature by the user's PKI device using the user's private key with an asymmetric cryptographic operation in response to a challenge from the reader device. In still other embodiments the deriving may also include combining other types of data with data mathematically related to the private key or more specifically to the result of a decryption or a signature by the user's PKI device using the user's private key with an asymmetric cryptographic operation in response to a challenge from the reader device. In some embodiments these other types of data may include data specific for the reader device such as a reader device serial number, or data specific for the user such as the user's name or a user identifier which in some embodiments may be provided by the user to the reader device, or data specific to the PKI device such as a serial number, or data specific for the private key such as data from or related to the public key or a certificate associated with the private key, or data specific to an application provider which in some embodiments may be provided by the user to the reader device. The algorithm to derive the PKRIP could make use of the following extra data elements:

1. A fixed value that is the same for all reader devices of a certain batch.
2. A fixed value that is fixed for a given reader device but that has a different value for each reader device.
3. A fixed value that is constant for a given user but that can be different for different users and that is entered at least once in the reader device by the user.
4. Static data stored on the PKI device that can be read by the reader device (e.g. data associated with the private key such as the public key and certificate, or a serial number of the PKI device).
5. A combination of any of the above.

In typical embodiments the PKRIP challenge is a value that is determined or calculated by the reader device in a way that the reader device can re-determine or re-calculate the same value of the PKRIP challenge later on for the same PKI device or the same private key on the PKI device. In a typical embodiment the PKRIP challenge comprises a secret or an unpredictable value. In some embodiments the PKRIP challenge is a constant or is derived from a constant that is stored in the reader device. In a specific embodiment this constant is the same for a plurality of reader devices. In another specific embodiment this constant is specific to an individual reader device. In some typical embodiments this constant is a secret. In other embodiments the PKRIP challenge is or is derived from a random or pseudo-random value. In some embodiments after generation of the PKRIP challenge the reader device stores in persistent memory for later use a value that permits to re-determine or re-calculate the PKRIP challenge. In one embodiment this stored value may be the PKRIP challenge itself. In some embodiments this value is stored together with information that is related to the PKI device or the user's private key on the PKI device that permits the reader device to recognize the PKI device or the private key on the PKI device. This information may comprise a serial number of the PKI device or data from or related to the private key on the PKI device. In some embodiments, the PKRIP challenge could for example comprise or could be derived from any of the following:

1. A fixed value that is the same for all reader devices of a certain batch.
2. A fixed value that is fixed for a given reader device but that has a different value for each reader device.
3. A fixed value that is constant for a given user but that can be different for different users and that is entered at least once in the reader device by the user. In practice it is very likely that this value will be entered either every time the PKI device is used, or only the first time that a given PKI device is used with a certain reader device and will then be remembered by the reader device.
4. Static data stored on the PKI device that can be read by the reader device (e.g. the public key and certificate, or a PKI device serial number).
5. Data specific to a particular application provider which in some embodiments may be provided by the user to the reader device.
6. A combination of any of the above.
7. A value derived from any of the above. The derivation optionally including the use of some reader device secret.

The Private Key Code is generated by the reader device and is mathematically related to the PKRIP. In a typical embodiment the Private Key Code is generated such that the server-side can calculate the value of the PKRIP from the Private Key Code value. In some embodiments the server-side also uses additional data elements that it has access to to calculate the PKRIP from the Private Key Code value. In some embodiments these additional data elements may include secret data also known to the reader device, or data related to the user that are accessible to the server-side such as a user name or a User ID, or data related to the reader device and accessible to the server-side such as a reader device serial number (which in some embodiments may be provided to the server-side by the user at registration), or data related to the PKI device such as a serial number, or data related to the private key stored on the PKI device which is accessible to the server-side (in some embodiments this may include data from or related to the public key or a certificate associated with the private key and which the server-side can access e.g. in a database). In some embodiments the Private Key Code is an intermediate data element that the reader device generates when generating the PKRIP. In other embodiments the reader device mathematically derives the Private Key Code from the PKRIP after it has generated the PKRIP. In a particular embodiment the Private Key Code is the same as the PKRIP. In a typical embodiment the Private Key Code is generated by the reader and transported at registration to the server-side to allow the server-side to calculate or otherwise obtain the value of the PKRIP that the reader device has calculated.

Activation Key and Activation Code

The Activation Key is a symmetric secret key that is used in some embodiments when registering and enabling a user's PKI device or more specifically the private key stored in that PKI device that is used to generate the PKRIP. In a typical embodiment the Activation Key is used at registration for securing the transport to the server side of the Private Key Code generated by the reader device. In one embodiment the Activation Key is known to or calculated by the reader device at registration. In one embodiment the Activation Key is used by the reader device to encrypt the Private Key Code which is then in encrypted form transported from the reader device to the server-side. In one embodiment the Activation Key is also known to or calculated by the server-side at registration. In one embodiment the server-side receives the encrypted Private Key Code and decrypts the encrypted Private Key Code with its copy of the Activation Key.

In some embodiments the Activation Key is derived from a symmetric secret known to both the reader device and the server-side. In one embodiment the Activation Key is a symmetric secret known to both the reader device and the server-side. In another particular embodiment the Activation Key is derived from a cryptographic combination of a dynamic variable such as a time-related variable or a challenge with a symmetric secret.

In some embodiments the Activation Key is derived from a symmetric secret that is already present in the reader device before the reader device is distributed to the user. In one embodiment the Activation Key is a symmetric secret that is already present in the reader device before the reader device is distributed to the user. In a specific embodiment the Activation Key is loaded in the reader device as part of a production step and communicated to the server-side prior to registration of the user's PKI device or more specifically the private key stored in that PKI device that is used to generate the PKRIP.

In some embodiments the Activation Key is derived from a data element which is generated at the server side and after generation provided to the reader device. This data element is further referred to as the Activation Code. In a typical embodiment the Activation Code is provided to the reader device by the user. In some embodiments the user may enter the Activation Code on the keyboard of the reader device. In some embodiments the user receives the Activation Code via a delivery channel that is deemed to provide a sufficiently high level of security. In one embodiment the Activation Code is delivered to the user when the user has logged in using an older authentication technology (e.g. using a static password). In another embodiment the Activation Code is sent by mail (e.g. registered mail) to the user. In yet another embodiment the user can get the Activation Code via an ATM (automatic teller machine) machine e.g. after having inserted a bank card and having entered the PIN associated with that bank card. In still another embodiment the Activation Code is sent via a text message or SMS (short message service) message to a mobile phone that is deemed to be under control of the user. In still another embodiment the Activation Code is sent via e-mail to an e-mail account that is deemed to be under control of the user.

In some embodiments the derivation of the Activation Key uses data elements that are specific for the reader device such as a reader device serial number, or data elements that are specific for the user such as the user's name or a user identifier which in some embodiments may be provided by the user to the reader device.

User Identity Code

In some embodiments the User Identity Code is a data element that the reader device can derive from a data element that is stored on the PKI device and that can be accessed by the reader device and that is representative for or linked to the identity of the legitimate holder of the PKI device, and that is also accessible to the server-side e.g. by accessing a public database if the identity of the legitimate holder of the PKI device is given. Examples of such data elements may include the PKI device holder's name, or PKI device holder's address, or (for example in case the PKI device comprises a national ID card) a PKI device holder's national number which may be unique for each PKI device holder, or (e.g. in case the PKI device has been issued by a financial institution) a PKI device holder's account number. In some embodiments this data element may be comprised in a certificate associated with the PKI device holder's private key on the PKI device. In some other embodiments the server-side may have access to a database containing certificates or public keys associated with private keys of users. The data element from which the User Identity Code is derived may then comprise parts of a certificate or public key associated with a user's private key on the PKI device. The User Identity Code may allow the server to perform a check on whether the identity that the user claims corresponds to the identity of the legitimate holder of the PKI device that the user is using.

In one embodiment the User Identity Code is derived by the reader device during the registration phase from a data element on the PKI device that the user is using, and is then communicated to the server side. To verify that the identity that the user claims corresponds to the identity of the legitimate holder of the PKI device that the user happens to use, the server side may generate a similar value from a data element that corresponds to the data element on the PKI device, that is accessible to the server-side and that the server-side can retrieve on the basis of the identity that the user claims. The server side may then compare the received User Identity Code with the value that it computed itself. If the identity claimed by the user indeed corresponds to the identity of the legitimate holder of the PKI device that the user happens to use, then this comparison should give a positive result.

In another embodiment the User Identity Code is derived by the reader device when it generates dynamic credentials and cryptographically combined with other data elements (symmetric reader secret, PKRIP, dynamic variables) to generate the dynamic credentials. When verifying a dynamic credential the server-side determines the value of the User Identity Code on the basis of the identity that the user claims to have. If the user claims to have an identity that is different than the identity of the legitimate holder of the PKI device that the user is using, then the User Identity Code derived by the reader device and the User Identity Code determined by the server-side will be different and the verification by the server side of the dynamic credential can be expected to produce a negative result. This provides an implicit method for the server side to verify that the identity that the user claims corresponds to the identity of the legitimate holder of the PKI device that the user happens to use.

Methods

Securing an Application

Figure 19:
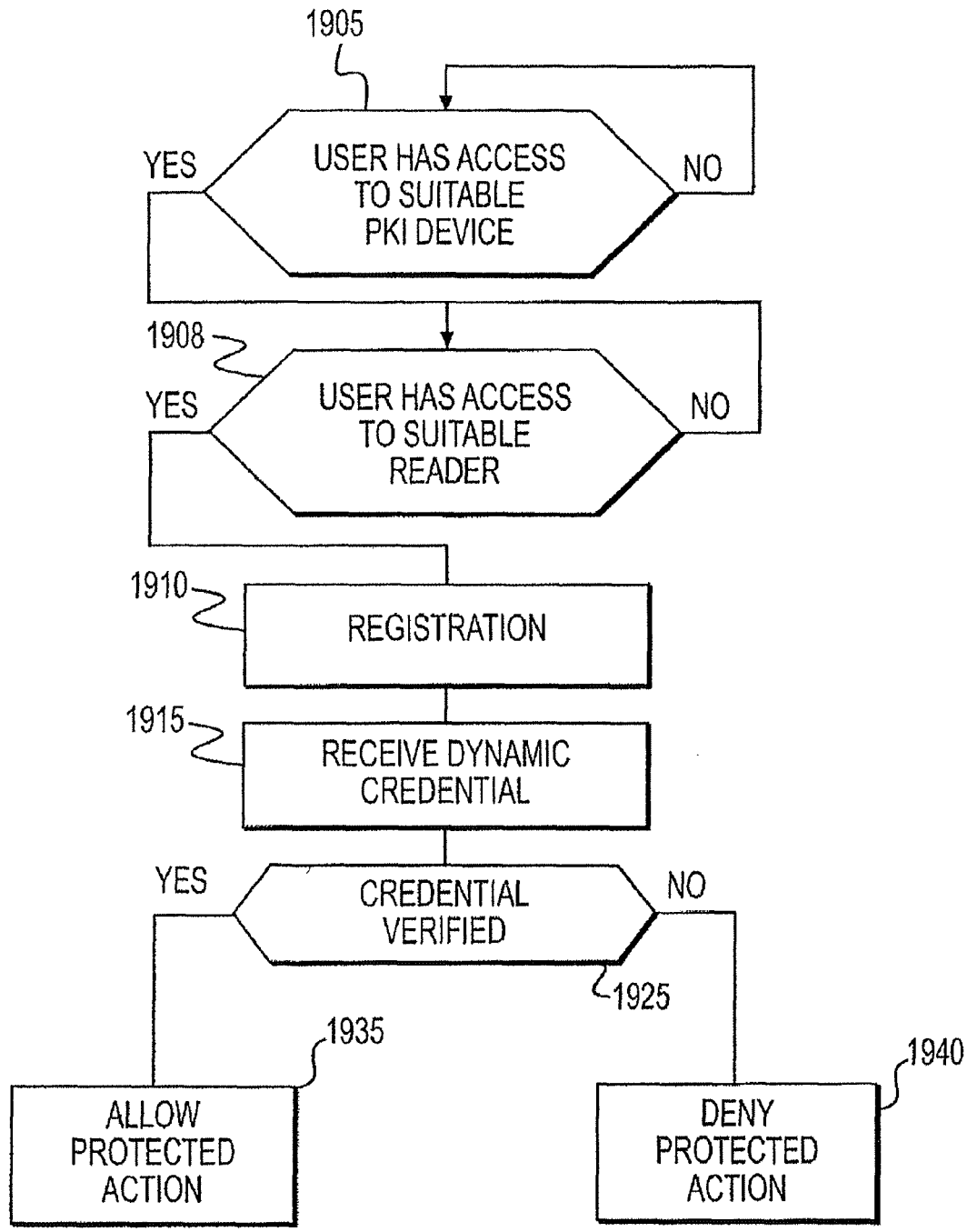
FIG. 19 illustrates a method for securing an application in accordance with an embodiment of the invention.

In some embodiments a method, illustrated in FIG. 19, for securing a user's accessing and/or interacting with a computer-based application may comprise the following steps:

Ensuring for a plurality of users that each user has access to a PKI device linked to that user (1905); said PKI device storing a private key and adapted to perform asymmetric cryptographic operations with that private key and having a communication interface to electronically communicate and exchange data with compatible reader devices including to receive data from such a reader device, to receive instructions from the reader device to perform an asymmetric cryptographic operation with an asymmetric private key stored on the PKI device on certain data provided by the reader device, and to return a result of this asymmetric cryptographic operation. In some embodiments the PKI device may comprise a smart card or a USB token. In some embodiments this step may be optional or implicit e.g. in cases where users can by default be assumed to have a usable PKI device. This may for instance be the case in a country where all citizens receive a national ID card that is PKI enabled. In other embodiments e.g. in the case of a financial institution issuing PKI devices this step may comprise ensuring that for each user a public-private key pair is generated and stored on a PKI device, that the public key of that key pair is certified and linked to the appropriate user, that the PKI device is provided to the appropriate user, and (optionally) that a PIN mailer is sent to the appropriate user.

Ensuring for a plurality of users that each user gets a reader device as described above (1908); said reader device being suitable to handle Activation Keys and Activation Codes and to generate Private Key Codes, Private Key Related Input Parameters and dynamic authentication credentials as described above and below.

Registering (1910) for each of a plurality of users the private key on a PKI device associated with each user (see below for a description of the registration step)

Receiving (1915) from a plurality of users dynamic credentials that have been generated by these users using their PKI device and reader device (see below for a description of the generation of the dynamic credentials)

Verifying (1925) the received dynamic credentials (see below for a description of the verification of the dynamic credentials)

Taking appropriate action depending on the outcome of the verification step. For example in some embodiments users may gain access to an application after successful verification of an OTP (1935) and may be refused access in case the verification of the OTP was unsuccessful (1945). In other embodiments instructions or transactions received by a user may be performed after successful verification of an OTP or an electronic signature on the instruction or transaction data and may be refused in case the verification of the OTP or electronic signature was unsuccessful.

In some embodiments the application to be secured comprises a financial application such as an internet-banking application. In other embodiments the application to be secured comprises an e-government such as electronically submitting a tax-declaration. In still other embodiments the application to be secured comprises a social security or health-care related application such as interacting with a medical insurance. In yet other embodiments the application to be secured comprises a lottery application.

Registration/Enablement of a Private Key

Figure 20A:
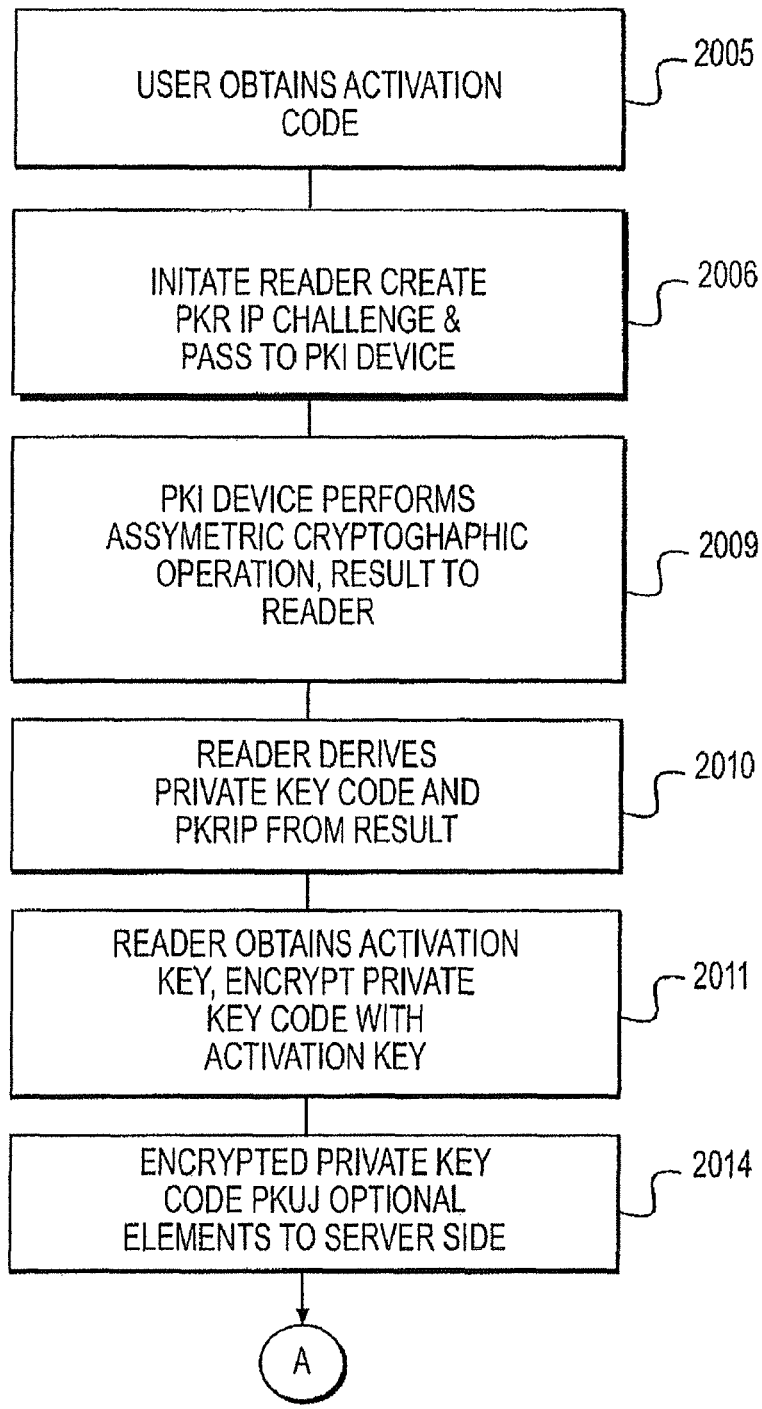
FIGS. 20A and 20B illustrate a method for registering or enabling a user's private key in accordance with an embodiment of the invention.
Figure 20:
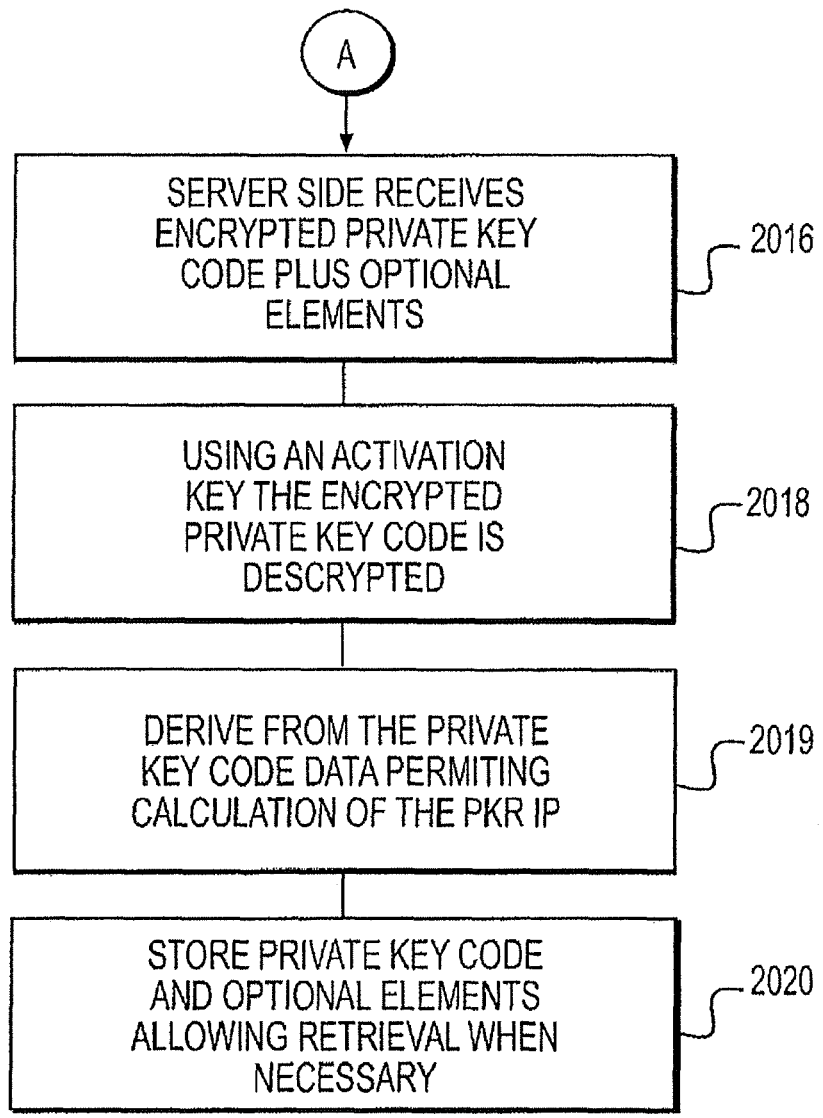

As illustrated in FIGS. 20A and 20B, the step of registering a user's private key on a user's PKI device comprises in a typical embodiment the following steps:

In some embodiments an Activation Code is provided to the user (2005).

The user takes his/her reader device and PKI device and let's them perform the following steps.

The reader device obtains a PKRIP and Private Key Code, which in turn comprises the steps of:
 i. Generating a PKRIP challenge as described above (2006).
 ii. Sending the PKRIP challenge to the PKI device and instructing the PKI device to perform an asymmetric cryptographic operation on that PKRIP challenge with a private key stored in the PKI device and receiving from the PKI device the result of that operation (2009).
 iii. Deriving from the result of that operation a first value called Private Key Code and (optionally) a second value called PKRIP (2010).

The reader device obtains an Activation Key and encrypts the generated Private Key Code with the obtained Activation Key (2011). In some embodiments the reader device first obtains an Activation Code and derives the Activation Key from the obtained Activation Key. In a typical embodiment the user provides the Activation Code to the reader device (e.g. by entering it on the reader device's keypad). In another typical embodiment the Activation Code is a representation of the Activation Key.

In some embodiments the reader device also obtains a data element from the PKI device that is linked to the user's identity and which can also be obtained by the server-side, and generates from that data element a User Identity Code.

In some embodiments the reader device also generates a dynamic credential using the PKRIP.

The encrypted Private Key Code, and if applicable also the User Identity Code and/or the generated dynamic credential, are communicated to the server-side (2014). In some embodiments also a value that allows the server-side to identify the user's reader device (such as a reader device's serial number) is communicated to the server-side. In a typical embodiment communication of these data elements from the reader device to the server-side is done by the user e.g. by reading these data elements from the reader device's display and copying them on a web-page of the server-side.

The server-side receives the encrypted Private Key Code and if applicable the User Identity Code and/or the generated dynamic credential and/or a reader device identifying data element (2016).

The server-side also obtains a copy of the Activation Key. In some embodiments the server-side obtains a copy of an Activation Code that has been provided to the user and derives the Activation Key from that copy of the Activation Code. In some other embodiments the server-side obtains from a database a value from which the Activation Key can be derived. In some embodiments the server-side obtains from a database the value of the Activation Key itself.

The server-side decrypts the received encrypted Private Key Code (2018).

The server-side derives from the Private Key Code a value that permits the server-side to calculate the corresponding PKRIP (2019) and stores that value linked to the user e.g. in a database (2020). In some embodiments this value may be the Private Key Code. In other embodiments this value may be the PKRIP itself.

If applicable the server-side uses the reader device identifying element to retrieve reader device specific data elements (such as a reader device specific configuration parameter or secret key) used in the calculation or verification by the server-side of data elements generated by the reader device. These data elements generated by the reader device that are also calculated or verified by the server-side may include the Activation Key, the PKRIP, the User Identity Code, and/or any dynamic credential (such as an OTP or electronic signature) generated by the reader device. If applicable the server-side may store the reader device identifying element linked to the user for later use. In a typical embodiment the reader device uses one or more reader device specific secrets in the generation of dynamic credentials and the server-side stores the reader device identifying element in a database linked to the user and uses that stored reader device identifying element to retrieve the one or more reader device specific secrets from another database (which stores these one or more reader device specific secrets linked to the reader device identifying element) when verifying dynamic credentials provided by the user.

If applicable the server-side may derive its own copy of the User Identity Code and compare it to the received User Identity Code. In some embodiments the registration fails or is refused if this comparison fails.

If applicable the server-side may verify the received dynamic credential. In some embodiments the registration fails or is refused if this verification fails.

Generation of Dynamic Credentials

Figure 21:
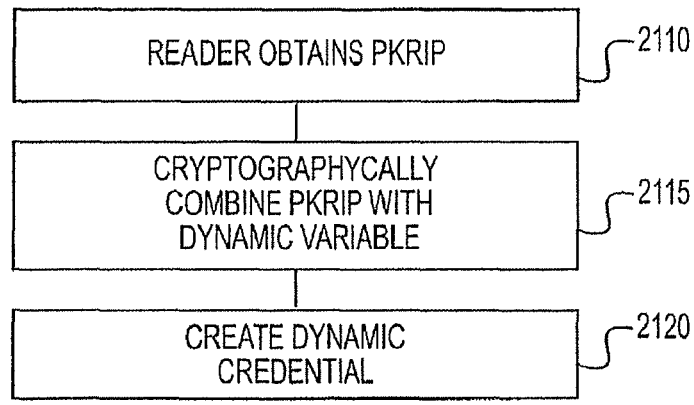
FIG. 21 illustrates a method for generating dynamic credentials in accordance with an embodiment of the invention.

In a typical embodiment a reader device generates dynamic credentials (2120) according to a method, illustrated in FIG. 21, that comprises the following steps:

The reader device obtains a PKRIP (2110).

The reader device cryptographically combines this PKRIP with one or more dynamic variables using a symmetric cryptographic algorithm (2115).

In some embodiments the combining also involves one or more symmetric reader secrets.

In some embodiments the combining also involves a User Identity Code.

In some embodiments obtaining the PKRIP comprises generating a PKRIP challenge, sending this PKRIP challenge to a PKI device, instructing the PKI device to perform an asymmetric cryptographic operation on the PKRIP challenge using a private key stored on the PKI device, receiving from the PKI device the result of that asymmetric operation, and mathematically deriving the PKRIP from the received result of the asymmetric operation. In some embodiments said asymmetric operation comprises the generation of a digital signature with a private key stored on the PKI device and said result of the asymmetric operation comprises the resulting digital signature. In some embodiments deriving the PKRIP from the received result of the asymmetric operation comprises combining the result of the asymmetric operation with data stored in the reader device. In some embodiments these data stored in the reader device may comprise data specific to an individual reader device. In other embodiments these data stored in the reader device may comprise one or more secret values or keys.

In some embodiments cryptographically combining the PKRIP with one or more dynamic variables using a symmetric cryptographic algorithm comprises combining the PKRIP and one or more dynamic variables with one or more secret values stored in the reader device using a symmetric cryptographic algorithm. In some embodiments these one or more secret values comprise a secret value that is common to a plurality of reader devices. In some other embodiments these one or more secret values comprise a secret value that is specific for an individual reader device.

In some embodiments the reader device may derive a User Identity Code as described above and cryptographically combining the PKRIP with one or more dynamic variables using a symmetric cryptographic algorithm comprises combining the PKRIP and one or more dynamic variables and the derived User Identity Code. In some embodiments cryptographically combining the PKRIP with one or more dynamic variables using a symmetric cryptographic algorithm comprises combining the PKRIP and one or more dynamic variables and the derived User Identity Code with one or more secret values stored in the reader device using a symmetric cryptographic algorithm.

In a specific embodiment cryptographically combining the PKRIP with one or more dynamic variables using a symmetric cryptographic algorithm comprises applying to the PKRIP, the one or more dynamic variables and a symmetric secret value stored in the reader device, a known or standardized symmetric algorithm to generate OTPs or electronic signatures that combines a symmetric secret with a first external dynamic variable and at least a second internal or external dynamic variable and whereby the reader device assigns the value of a Private Key Related Input Parameter to the first external dynamic variable and the symmetric secret value stored in the reader device to the symmetric secret and one of the one or more dynamic variables to the at least a second internal or external dynamic variable.

Verification of Dynamic Credentials

Figure 22:
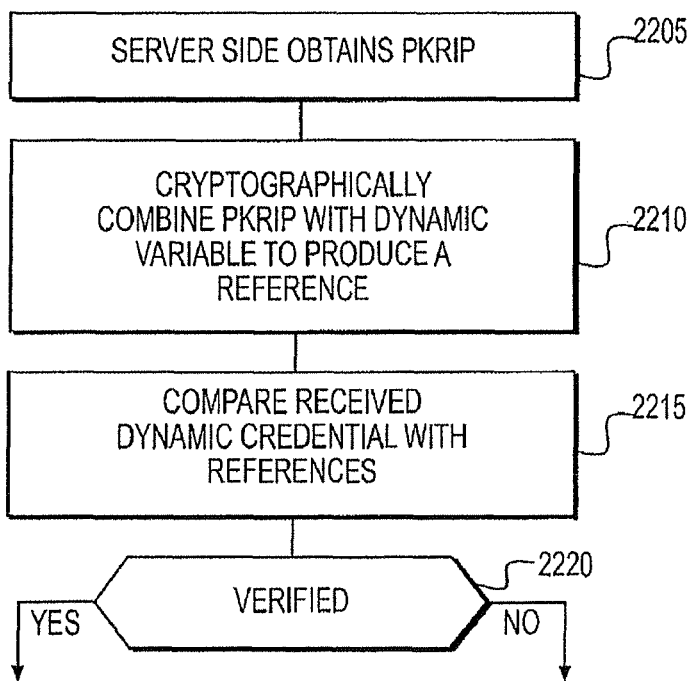
FIG. 22 illustrates a method for verify a dynamic credential in accordance with an embodiment of the invention.

In a typical embodiment a dynamic credential that has been received is verified (2220) at the server-side according to a method, illustrated in FIG. 22, that comprises the following steps:

The server-side obtains a PKRIP (2205).

The server-side cryptographically combines this PKRIP with one or more dynamic variables using a symmetric cryptographic algorithm to obtain a reference value (2210).

The server-side compares this reference value with the received dynamic credential (2215).

In some embodiments obtaining the PKRIP comprises retrieving from a database a data element that is linked to the user and which permits the server-side to calculate the corresponding PKRIP. In some embodiments this value may be the Private Key Code. In other embodiments this value may be the PKRIP itself. In some embodiments the server-side combines this data element with other data elements. In some embodiments these other data elements may comprise data elements that may be linked to the reader or to the user to calculate the PKRIP. In some embodiments these other data elements may comprise one or more secret keys.

In some embodiments cryptographically combining the PKRIP with one or more dynamic variables using a symmetric cryptographic algorithm comprises combining the PKRIP and one or more dynamic variables with server-side copies of one or more secret values stored in a reader device using a symmetric cryptographic algorithm. In some embodiments these one or more secret values comprise a secret value that is common to a plurality of reader devices. In some other embodiments these one or more secret values comprise a secret value that is specific for an individual reader device. In some embodiments the server-side retrieves these one or more secret values from a database that stores these values linked to a user identifying data element or linked to a reader device identifying data element.

In a specific embodiment cryptographically combining the PKRIP with one or more dynamic variables using a symmetric cryptographic algorithm comprises applying to the PKRIP, the one or more dynamic variables and a server-side copy of a symmetric secret value stored in a reader device, a known or standardized symmetric algorithm to generate OTPs or electronic signatures that combines a symmetric secret with a first external dynamic variable and at least a second internal or external dynamic variable and whereby the server-side assigns the value of a Private Key Related Input Parameter to the first external dynamic variable and the symmetric secret value stored in the reader device to the symmetric secret and one of the one or more dynamic variables to the at least a second internal or external dynamic variable.

In a particular embodiment reader devices are being made available to a plurality of users. The reader devices may be distributed by an application provider to some of its users e.g. by mail. The reader devices may also be for sale in e.g. a supermarket or on web shop. The reader devices are adapted to interact with a PKI device e.g. a smart card that is issued by a government agency to citizens to act as electronic id card for those citizens and that contains a private key and associated certificates and that is capable of asymmetric cryptographic operations with the private key e.g. to generate a digital signatures or to decrypt data encrypted with the public key associated with the private key. All readers contain a certain challenge which is the same for all readers. All reader devices also contain a symmetric reader secret which is the same for all reader devices. The application provider provides the users also with a personal Activation Code in a secure way e.g. by sending them using registered mail. The Activation Codes may consist of a sequence of decimal digits. The value of each Activation Code is secret and personalized for each user. The Activation Codes are determined such that it is difficult for an outsider to predict the values. They may for example be random numbers or by derived by cryptographically combining a secret key with a User ID. To detect typographic errors the Activation Code may have a check digit. The application provider keeps track which user has received which Activation Code The application provider invites the users to register themselves. To register, a user logs in and authenticates using an existing authentication mechanism e.g. using a static password in combination with his/her User ID. The user then inserts his or her PKI device (e.g. their electronic ID card) into his or her reader device and enters his or her Activation Code on the reader device. The reader device requests the user to insert his/her PKI device and to enter the PKI devices PIN. The reader device submits the PIN to the PKI device for verification. The reader device then instructs the PKI device to digitally sign the above mentioned challenge with the user's private key stored in the user's PKI device. The reader device receives the resulting digital signature and derives a PKRIP from that digital signature e.g. it may take the first 5 bytes of the asymmetric cryptogram that is present in the digital signature and convert these 5 bytes into its decimal representation. The reader then encrypts the PKRIP by doing a modulo-10 addition of each PKRIP digit with the corresponding digit in the Activation Code that was entered by the user. The reader displays the thus encrypted PKRIP on its display and the user communicates the displayed encrypted PKRIP to the registration application (e.g. by copying the encrypted PKRIP onto a webpage of the registration application in the user's web browser). The application provider retrieves the Activation Code that was provided to that particular user and uses it to decrypt the received encrypted PKRIP using. The application provider then stores the PKRIP (e.g. in a database) linked to the user's User ID.

From now on when the user wants to access the application provider's application, the user is requested to log in by providing his/her User ID and an OTP generated by his/her reader device in conjunction with his/her PKI device. The reader device generates OTPs as follows. The reader device requests the user to insert his/her PKI device and to enter the PKI devices PIN. The reader device submits the PIN to the PKI device for verification. Then the reader device submits the above mentioned challenge to the PKI device and instructs the PKI device to digitally sign the challenge with the user's private key stored on the PKI device. The reader device receives the resulting digital signature and derives the same PKRIP from that digital signature as the PKRIP that was derived for the registration phase. The reader generates an OTP by cryptographically combining the PKRIP with a dynamic variable (such as the value of the reader device's real-time clock or a counter maintained by the reader device) and the above mentioned symmetric reader secret using a symmetric cryptographic algorithm. The reader device may for example concatenate the PKRIP and the dynamic variable and encrypt the concatenation with the AES encryption algorithm using the symmetric reader secret as the AES encryption key, after which the reader may decimalize a part (e.g. the first 3 bytes) of the resulting cryptogram and display the result as the OTP on its display for the user to communicate to the application. In one embodiment, the reader device may feed the PKRIP value to an OTP generation algorithm which takes at least two dynamic variables at least one of which is originally conceived to be an external dynamic variable (such as a challenge) and to which the reader device assigns the PKRIP values. For example the reader device may use an OTP algorithm that uses two dynamic variables: a first internal time-based dynamic variable and a second external dynamic variable that is originally conceived to be assigned a challenge value generated by the application, whereby the reader device assigns the PKRIP value to the second dynamic variable.

The authentication component of the application verifies the received OTP as follows. Using the User ID as a search key it retrieves the PKRIP value associated with the user. It determines the value of the symmetric reader secret. It determines the values of the dynamic variable used in the generation of the received OTP. It then cryptographically combines the retrieved PKRIP value and the determined value for the dynamic variable with the determined symmetric reader secret using a symmetric cryptographic algorithm that is similar to the algorithm used by the reader devices. The result of this cryptographic combining is then compared to the received OTP. The authentication component may for example concatenate the retrieved PKRIP value and the determined value for the dynamic variable and encrypt the concatenation with the AES encryption algorithm using the symmetric reader secret as the AES encryption key, after which it may decimalize a part (e.g. the first 3 bytes) of the resulting cryptogram and check whether the result is the same as the received OTP. In one embodiment the authentication component comprises two layers. A first layer is an inner layer that is capable of verifying an OTP generated using a symmetric secret, a first dynamic variable and a second dynamic variable that is originally conceived to be an external dynamic variable e.g. a challenge. The inner layer has an interface that expects the OTP to be verified, the secret key and the value of the external dynamic variable. The second layer is an outer layer which is called by the application to verify the received OTP. The outer layer contains the symmetric reader secret and determines the user's PKRIP value on the basis of the User ID received from the calling application. To verify the OTP the outer layer calls the inner layer and passes the OTP and the symmetric reader secret and it passes the PKRIP value as the value for the second external dynamic variable. The inner layer verifies the OTP and returns the result to the outer layer which returns the result to the application.

One advantage of this embodiment is that the user can use any reader device and can even change at any moment from one reader device to another.

In another particular embodiment reader devices are being made available to a plurality of users. The reader devices may be distributed by an application provider to some of its users e.g. by mail. The reader devices may also be for sale in e.g. a supermarket or on web shop. The reader devices are adapted to interact with a PKI device e.g. a smart card that is issued by a government agency to citizens to act as electronic id card for those citizens and that contains a private key and associated certificates and that is capable of asymmetric cryptographic operations with the private key e.g. to generate a digital signatures or to decrypt data encrypted with the public key associated with the private key. All reader devices contain a certain challenge which is unique for each reader device. All reader devices also contain a symmetric reader secret which is unique for each reader device. All reader devices have furthermore a secret Activation Key that is unique for each reader device.

The application provider invites the users to register themselves. To register, a user logs in and authenticates using an existing authentication mechanism e.g. using a static password in combination with his/her User ID. The user then inserts his or her PKI device (e.g. their electronic ID card) into his or her reader device and enters his or her Activation Code on the reader device. The reader device requests the user to insert his/her PKI device and to enter the PKI devices PIN. The reader device submits the PIN to the PKI device for verification. The reader device then instructs the PKI device to digitally sign its reader device specific challenge with the user's private key stored in the user's PKI device. The reader device receives the resulting digital signature and derives a PKRIP from that digital signature e.g. it may take the first 5 bytes of the asymmetric cryptogram that is present in the digital signature and convert these 5 bytes into its decimal representation. The reader then encrypts the PKRIP by doing a modulo-10 addition of each PKRIP digit with the corresponding digit in the reader device's Activation Key. The reader displays the thus encrypted PKRIP on its display and the user communicates the displayed encrypted PKRIP to the registration application (e.g. by copying the encrypted PKRIP onto a webpage of the registration application in the user's web browser). The user also communicates the serial number of the reader device he or she is using to the application.

The application provider has a database that lists the reader device specific symmetric reader secrets and Authentication Keys linked to the serial number of the corresponding reader device. The application retrieves the Activation Key of the reader device that the user uses and uses that Activation Key to decrypt the received encrypted PKRIP using. The application provider then stores (e.g. in a database) the PKRIP and the reader device's serial number linked to the user's User ID.

From now on when the user wants to access the application provider's application, the user is requested to log in by providing his/her User ID and an OTP generated by his/her reader device in conjunction with his/her PKI device. The reader device generates OTPs as follows. The reader device requests the user to insert his/her PKI device and to enter the PKI devices PIN. The reader device submits the PIN to the PKI device for verification. Then the reader device submits its reader device specific challenge to the PKI device and instructs the PKI device to digitally sign this challenge with the user's private key stored on the PKI device. The reader device receives the resulting digital signature and derives the same PKRIP from that digital signature as the PKRIP that was derived for the registration phase. The reader generates an OTP by cryptographically combining the PKRIP with a dynamic variable (such as the value of the reader device's real-time clock or a counter maintained by the reader device) and its reader device specific symmetric reader secret using a symmetric cryptographic algorithm. The reader device may for example concatenate the PKRIP and the dynamic variable and encrypt the concatenation with the AES encryption algorithm using the reader device specific symmetric reader secret as the AES encryption key, after which the reader device may decimalize a part (e.g. the first 3 bytes) of the resulting cryptogram and display the result as the OTP on its display for the user to communicate to the application. In one embodiment, the reader device may feed the PKRIP value to an OTP generation algorithm which takes at least two dynamic variables at least one of which is originally conceived to be an external dynamic variable (such as a challenge) and to which the reader device assigns the PKRIP values. For example the reader device may use an OTP algorithm that uses two dynamic variables: a first internal time-based dynamic variable and a second external dynamic variable that is originally conceived to be assigned a challenge value generated by the application, whereby the reader device assigns the PKRIP value to the second dynamic variable.

The authentication component of the application verifies the received OTP as follows. Using the User ID as a search key it retrieves the PKRIP value and the serial number of the reader device associated with the user. Using the serial number of the user's reader device it determines the value of the reader device specific symmetric reader secret. It determines the values of the dynamic variable used in the generation of the received OTP. It then cryptographically combines the retrieved PKRIP value and the determined value for the dynamic variable with the determined symmetric reader secret using a symmetric cryptographic algorithm that is similar to the algorithm used by the reader devices. The result of this cryptographic combining is then compared to the received OTP. The authentication component may for example concatenate the retrieved PKRIP value and the determined value for the dynamic variable and encrypt the concatenation with the AES encryption algorithm using the symmetric reader secret as the AES encryption key, after which it may decimalize a part (e.g. the first 3 bytes) of the resulting cryptogram and check whether the result is the same as the received OTP. In one embodiment the authentication component comprises two layers. A first layer is an inner layer that is capable of verifying an OTP generated using a symmetric secret, a first dynamic variable and a second dynamic variable that is originally conceived to be an external dynamic variable e.g. a challenge. The inner layer has an interface that expects the OTP to be verified, the secret key and the value of the external dynamic variable. The second layer is an outer layer which is called by the application to verify the received OTP. The outer layer contains the symmetric reader secret and determines the user's PKRIP value and the reader device specific symmetric reader secret on the basis of the User ID received from the calling application as described above. To verify the OTP the outer layer calls the inner layer and passes the OTP and the symmetric reader secret and it passes the PKRIP value as the value for the second external dynamic variable. The inner layer verifies the OTP and returns the result to the outer layer which returns the result to the application.

One advantage of this embodiment is the extra security offered by the fact that to generate valid OTPs one needs not only access to the user's PKI device (and the PIN of the user's PKI device) but also the reader device that the user registered in the registration phase.

Other aspects of the invention are described below.

Figure 23:
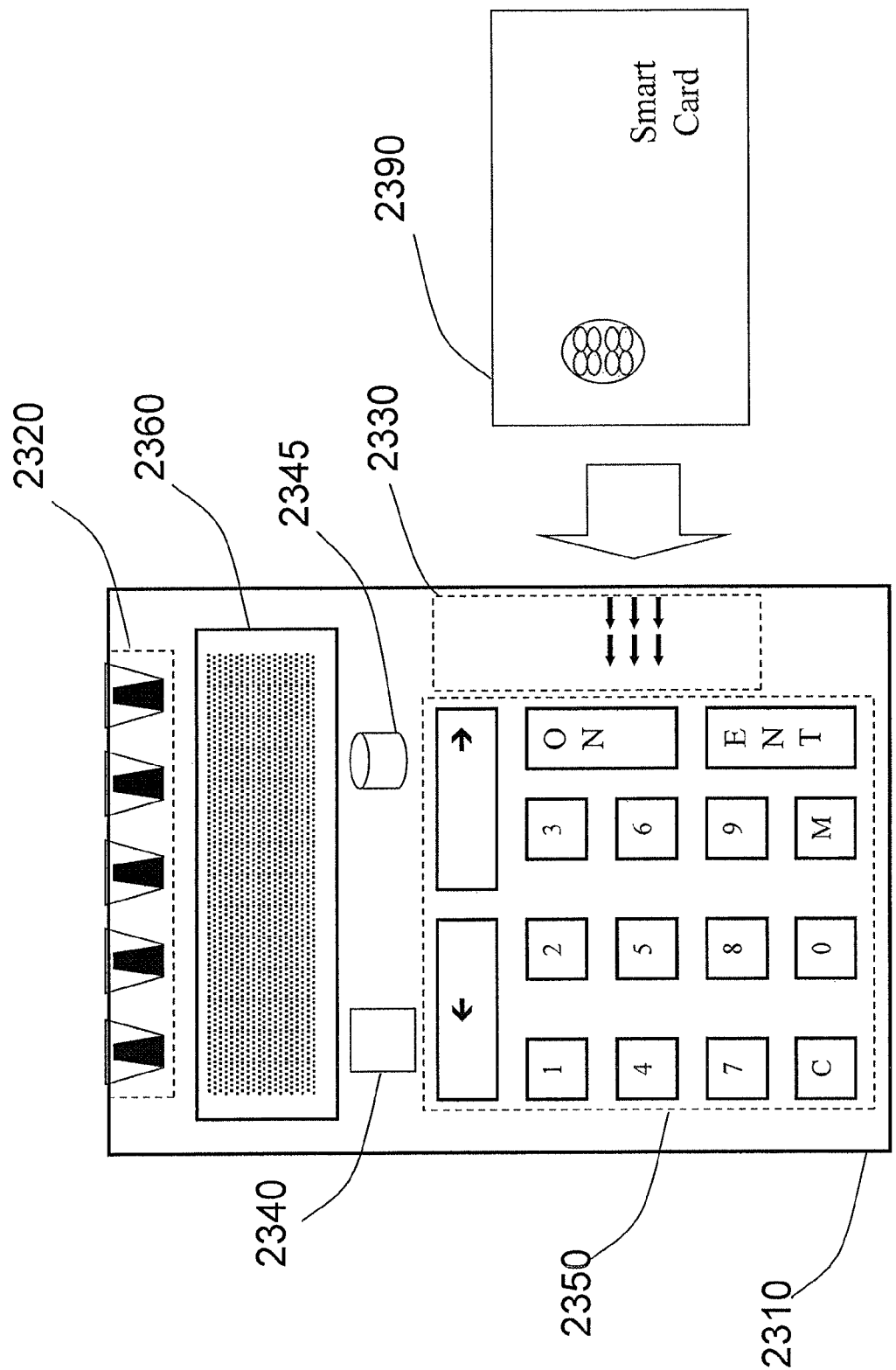
FIG. 23 is an illustration of an authentication device receiving a security device in accordance with aspects of the invention.

In some embodiments of the invention, as illustrated in FIG. 23, an authentication device (2310) comprises a data input interface (2320) for receiving data, a communication interface (2330) to exchange data, commands and responses with a separate removable security device (2390) capable of asymmetric cryptographic calculations (such as for example a PKI-enabled smart card), one or more data processing components (2340), one or more memory components (2345), a user input interface (2350) for receiving data or instructions or other input from a user and a user output interface (2360) for presenting data (in particular OTPs and/or MACs) or messages or other output to a user.

The authentication device may be adapted to generate one-time passwords (OTPs) which may comprise message authentication codes (MACs). Henceforth, the terminology OTP may indicate not only OTPs in a narrow sense but also MACs unless otherwise specified. The authentication device may be adapted to generate the one-time passwords by cryptographically combining a dynamic variable and a secret data element that the authentication device shares with a verifying entity such as an application or authentication server. In some embodiments the authentication device may be adapted to generate the one-time passwords by cryptographically combining a dynamic variable and a secret data element using a symmetric cryptographic algorithm parameterized with the secret data element. In some embodiments the symmetric cryptographic algorithm may comprise a symmetric encryption algorithm such as DES (Data Encryption Standard) or AES (Advanced Encryption Standard). In some embodiments the symmetric cryptographic algorithm may comprise a keyed-hash algorithm such as a HMAC (keyed hash message authentication code) algorithm which may for example be based on the SHA-1 (Secure Hash Algorithm 1) algorithm or the MD5 (Message Digest 5) algorithm. The shared secret data element to generate OTPs (and MACs) will henceforth be referred to as the OTP key. The OTP key may also be referred to as the OTP generation key especially when discussing usage of (the value of) the OTP key for generating OTPs and/or MACs. The OTP key may alternatively be referred to as the OTP verification key especially when discussing usage of (the value of) the OTP key for verifying the validity of an OTP or MAC. The OTPs and/or MACs may also be referred to as dynamic credentials and the OTP key may also be referred to as the dynamic credential generation key. In some embodiments the dynamic variable may comprise or may be generated by the authentication device from a challenge value and/or a counter value and/or a time value and/or transaction data. In some embodiments the authentication device may receive the challenge and/or the transaction data from the user through the user input interface. In some embodiments the authentication device may comprise a real-time clock to provide time values for the generation by the authentication device of time-based OTPs. In some embodiments the authentication device comprises a counter to provide counter values for the generation by the authentication device of counter-based OTPs. In some embodiments the authentication device provides a generated OTP to the user through the user output interface e.g. in the form of a string of numerical or alphanumerical characters that may for example be displayed on a display of the authentication device or that may be provided to the user as synthesized speech.

In some embodiments the user input interface comprises a keyboard. In some embodiments the user output interface comprises a display.

In some embodiments the data input interface comprises an optical interface. In some embodiments the data input interface comprises a camera for taking pictures (e.g. from a computer screen of an access device). In some embodiments the authentication device is adapted to detect in a picture taken with a camera of the authentication device a 2-dimensional image that encodes data in a particular format (for example a QR-code or a 2-dimensional barcode). In some embodiments the data input interface comprises an acoustical interface. In some embodiments the data input interface comprises a USB interface. In some embodiments the authentication device may be a medium sized compact medium weight portable device i.e. a device with a maximal length of 15 cm, a maximum width of 9 cm, a maximum thickness of 2 cm and a weight of less than 200 gram.

In some embodiments the separate removable security device may be a small compact lightweight portable device i.e. a device with a maximal extension in any dimension of 10 centimeter and a weight of less than 100 gram. In some embodiments the separate removable security device may be a smart card. In some embodiments the separate removable security device may be an ISO/IEC 7810 ID-1 sized smart card. In some embodiments the removable security device may be a USB (Universal Serial Bus) key.

In some embodiments the communication interface is adapted to allow the user to easily remove or replace the separate removable security device that the authentication device may be communicating with. In some embodiments the communication interface comprises an externally accessible slot for accepting and communicating with a removable security device. In some embodiments the communication interface requires the user to insert the user's security device in such an externally accessible slot for communicating with the user's security device. In some embodiments the communication interface comprises a smart card interface and the separate removable security device comprises a smart card. In some embodiments the smart card may be PKI-enabled. In some embodiments the communication interface comprises an externally accessible smart card reader. In some embodiments the communication interface may be adapted to accept an ISO/IEC 7810 ID-1 sized smart card. In some embodiments the communication interface may be adapted to accept an ISO/IEC 7810 ID-3 sized smart card. In some embodiments the communication interface may be adapted to communicate with a contactless smart card. In some embodiments communication interface may be adapted to communicate with a contact smart card. In some embodiments the communication interface may be compatible with the ISO/IEC 7816 specifications.

In some embodiments the one or more memory components may be adapted to permanently store data. In some embodiments the one or more memory components may be adapted to (securely) store cryptographic secrets such as for example symmetric or asymmetric decryption keys. In some embodiments the one or more memory components may be adapted to store software and/or firmware. In some embodiments the one or more memory components may be adapted to store configuration data. In some embodiments the one or more memory components may comprise RAM and/or ROM memory.

In some embodiments the one or more data processing components may comprise a processor and/or a controller for controlling the data input interface, the communication interface, the user input interface and/or the user output interface. In some embodiments the one or more data processing components may comprise a processing component adapted to perform cryptographic algorithms such as for example symmetric or asymmetric decryption algorithms. In some embodiments the one or more data processing components may comprise an ASIC or an FPGA.

In some embodiments the authentication device does not (yet) comprise an OTP key that is associated with a particular user when the authentication device is distributed to a user. In order to be able to generate OTPs (which may comprise MACS) that can be verified in order to authenticate the user or to authenticate transaction data submitted by the user, the authentication device needs an OTP key that is also known to the entity that will verify the OTPs and that is associated with the user.

Figure 24:
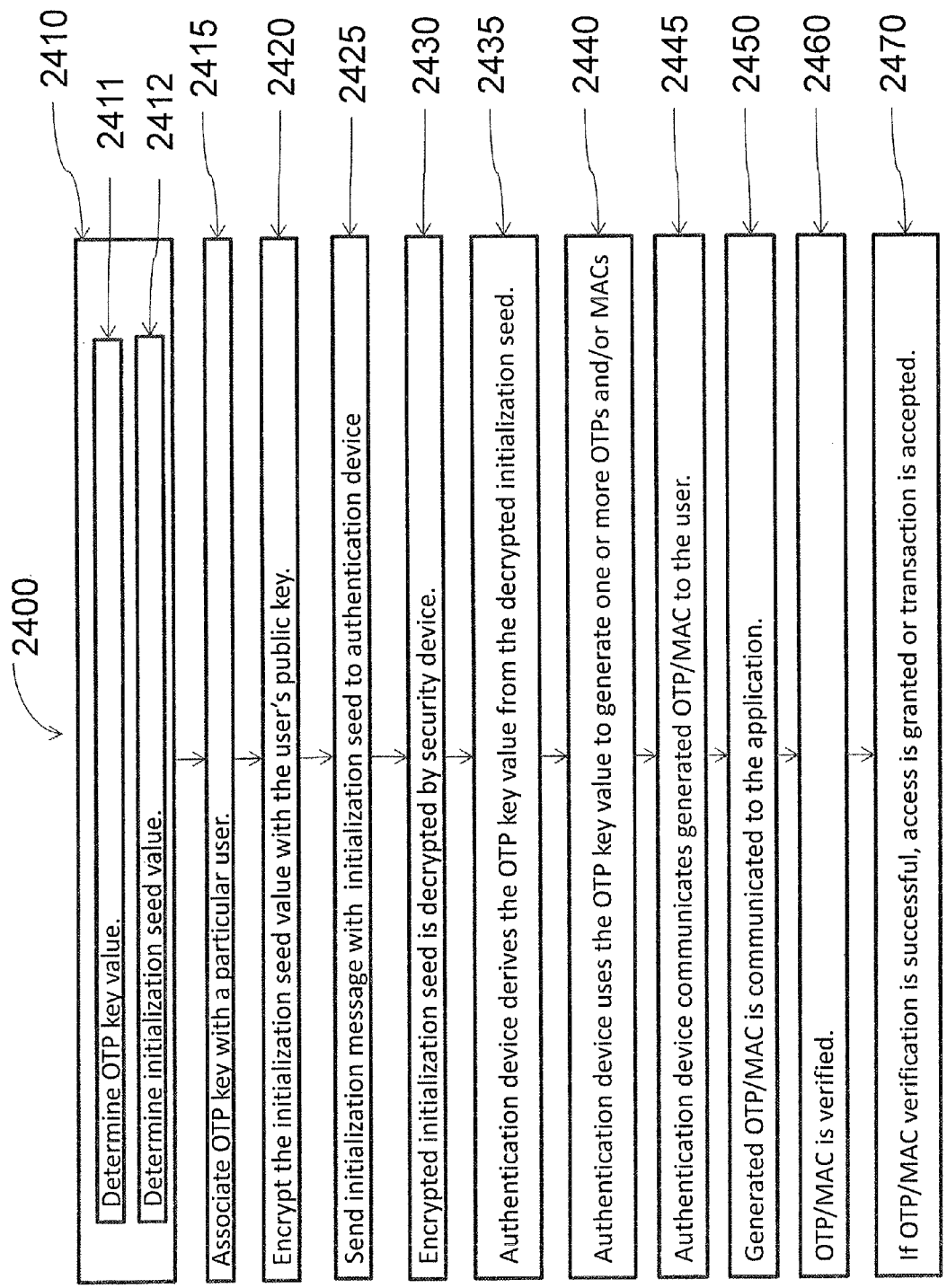
FIG. 24 is a flow diagram of steps for generating OTPs and/or MACs for authenticating users and/or transactions using an authentication device and a security device in accordance with aspects of the invention.

FIG. 24 illustrates a method (2400) according to an aspect of the invention to generate OTPs and/or MACs for authenticating users and/or transactions using an authentication device and a user's security device.

In step 2410 a server component may determine the values of an OTP key (step 2411) and an initialization seed (step 2412) that are mathematically related. The server may associate (2415) the OTP key with a particular user. The initialization seed may be encrypted (2420) with the public key of a public-private key pair the private key of which is stored on the user's security device using an asymmetric encryption algorithm such as for example the RSA (Rivest-Shamir-Adleman) algorithm. The encrypted initialization seed may be transferred (2425) to the user's authentication device for example as part of an initialization message that may be received by the authentication device. The user's authentication device may then submit (2430) the encrypted initialization seed to the user's security device to be decrypted, the security device may decrypt the encrypted initialization seed with the user's private key stored on the security device using an asymmetric decryption algorithm such as for example RSA, and the security device may return the decrypted initialization seed to the authentication device. The user's authentication device may then derive (2435) the value of the OTP key using the decrypted initialization seed. The user's authentication device may then use the OTP key value in the generation (2440) of OTPs and/or MACs as described above. In some embodiments the authentication device communicates (2445) a generated OTP or MAC to the user by means of its user output interface. The generated OTP or MAC may then be communicated (2450) to for example a remote application for authenticating the user or a user transaction to the remote application. The OTP or MAC thus received may then be verified (2460) by a verification server component. The verification server component may have access to the value of the OTP key associated with the user and may use that OTP key value in the verification of the received OTP or MAC. Upon successful verification (2460) of the OTP or MAC the remote application may take appropriate action (2470) such as granting access to the user or accepting a transaction submitted by the user.

Initialization of the OTP Key—Server Side.

In some embodiments the determination of the value of the OTP key and the provisioning of the OTP key value to the authentication device may happen as follows. An initialization server may determine, for a given user, the value of an OTP key and the value of at least one initialization seed that is mathematically related to the OTP key. The server may associate the user with the OTP key that is mathematically related to the initialization seed. Details on how the OTP key and the initialization seed and the user may be interrelated and associated will be discussed further on. The user is assumed to have a security device comprising a private key of a public-private key pair that is adapted to decrypt with an asymmetric cryptographic algorithm parameterized by the aforementioned private key data that have been encrypted with a corresponding asymmetric cryptographic algorithm parameterized with the public key of the aforementioned public-private key pair. The server may obtain the public key of this public-private key pair that is associated with the user. For example the server may retrieve the public key from a database containing the public keys for a plurality of users. This step may require the user to provide a data element identifying the user, for example a user id, or the user's name or the user's national id number or the user's social security number or a serial number of the user's security device. For example in one embodiment a plurality of citizens may have electronic national id cards comprising a public-private key pair and the server may have access to a central registry comprising the public keys associated with the citizens and may retrieve the public key associated with a particular user using the user's name of national id number. The server assembles an initialization message comprising at least the initialization seed. The server encrypts with an asymmetric cryptographic algorithm parameterized with the public key associated with the user at least a part of the initialization message whereby the encrypted part of the initialization message comprises at least a part of the initialization seed.

The initialization message may also comprise other data elements such as for example one or more nonces, or parts of the initialization seed that are not encrypted with the public key associated with the user, or data identifying the user or the user's security device or the public key associated with the user, or data identifying the user's authentication device. In some embodiments parts of the initialization message may be encrypted with an authentication device key that is associated with the user's authentication device. In some embodiments this authentication device key is a public key that corresponds to a private key known to the authentication device. In some embodiments this authentication device key is a secret key that is shared between the server and the authentication device. In some embodiments the authentication device key is shared between all authentication devices of a batch of authentication devices. In some embodiments each individual authentication device may have its own individual value for the authentication device key. In such embodiments the server may require data identifying the authentication device in order to determine the authentication device key to use (for example by using the authentication device identification data as a key derivation seed for generating the correct authentication device key or to search the correct authentication device key in a database). In some embodiments parts of the initialization seed may be encrypted with the authentication device key. In some embodiments parts of the initialization seed may be encrypted both with the authentication device key and the user's public key. In some embodiments parts of the initialization message that are encrypted both with the authentication device key and the user's public key may first have been encrypted with the authentication device key and then the user's public key. In some embodiments parts of the initialization message that are encrypted both with the authentication device key and the user's public key may first have been encrypted with the user's public key and then the authentication device key.

The initialization message may then be made available to the user's authentication device.

In some embodiments the OTP key initialization process may be initiated by the user. For example the user may contact the initialization server using an access device (such as a PC, laptop, tablet computer, smartphone . . . ) e.g. by accessing a web site or by sending an email and in response the server may assemble an initialization message and send the assembled initialization message to the user's access device e.g. embedded in a web page or an email. In other embodiments the initialization server may assemble proactively initialization messages for a plurality of users. In some embodiments the proactively assembled initialization messages may be stored for future use. In other embodiments the proactively assembled initialization messages may be sent proactively to the appropriate users e.g. embedded in an email.

Transfer of the initialization message to the authentication device.

In some embodiments the initialization message is made available to an access device (e.g. a PC, laptop, tablet computer, smartphone . . . ) of the user. For example the initialization message may be sent to the user's access device over the internet, for example embedded in a web page or in an email. In some embodiments the initialization message may be communicated by the user's access device to the suer's authentication device. In some embodiments the initialization message may be communicated, by the access device or by another device, to the authentication device by means of a unidirectional communication channel. The access device may output a representation of the initialization message over a human output interface of the user's access device. The access device may for example output the initialization message on the access device's display e.g. encoded in an image, or encoded in a sequence of images, or encoded as a time-varying optical pattern, or the access device may for example output the initialization message, using an audio output of the access device, encoded as a sequence of audible sounds. The authentication device may capture this representation of the initialization message output by the access device. For example in one embodiment the authentication device may comprise an optical input interface e.g. comprising a camera and may capture one or more images displayed by the user's access device and encoded with the initialization message (the images may for example comprise a QR code) and the authentication message may decode the captured images to obtain the initialization message. In another embodiment the authentication device may comprise an optical input interface e.g. comprising a plurality of optical detectors and may scan a time-varying optical pattern displayed by the access device that is encoded with the initialization message and may decode the time-varying optical pattern to obtain the initialization message. In still another embodiment the authentication device may comprise an acoustical input interface and may capture a sequence of audible sounds emitted by the user's access device that have been encoded with the initialization message and the authentication device may decode these sounds to obtain the initialization message.

In some embodiments the authentication device stores the obtained initialization message for future processing. In other embodiments the authentication device proceeds immediately with processing the initialization message.

Initialization of the OTP Key—Authentication Device Side.

Retrieving the initialization seed from the initialization message

The authentication device obtains the initialization message prepared by the initialization server, for example in one of the ways discussed above. The authentication device may extract the initialization seed from the initialization message as follows. The authentication device may prompt the user to provide his or her security device to the authentication device (for example in some embodiments the authentication device may comprise a smart card reader and the user may be prompted to insert his or her smart card in the authentication device). The authentication device may extract at least some parts of the initialization message that have been encrypted with the user's public key. These parts of the initialization message that have been encrypted with the user's public key and that the authentication device extracts from the initialization message may comprise at least the parts of the initialization seed that have been encrypted with the user's public key. The authentication device may submit these encrypted parts to the user's security device and may request the user's security device to decrypt the encrypted parts with the user's private key. The user's security device may decrypt the encrypted parts using the user's private key and an asymmetric decryption algorithm and return the now decrypted parts of the initialization message to the authentication device. The authentication device may receive the now decrypted parts of the initialization message from the user's security device. The authentication device may also extract the parts of the initialization seed comprised in the initialization message that have not been encrypted with the user's private key. The authentication device may then assemble the initialization seed from the various parts of the initialization seed that have been extracted from the initialization message.

In some embodiments the security device may be protected by a PIN. In some embodiments the security device may require a PIN entry and verify the correctness of the entered PIN prior to performing an asymmetric cryptographic operation involving a private key stored in the security device. In some embodiments the authentication device may be adapted to request the user to enter a PIN, to capture the PIN provided by the user (e.g. by means of the user input interface), and to communicate the PIN provided by the user to the security device for verification.

In some embodiments the initialization message (or parts thereof) may also have been additionally encrypted by the initialization server with another key than the public key associated with the user. In such embodiments the authentication device may decrypt the additionally encrypted initialization message (or the additionally encrypted parts thereof) using a (secret) decryption key known to the authentication device. In some embodiments the additional encryption is done with a symmetric encryption algorithm using a symmetric encryption key that is known to both the initialization server and the authentication device and the authentication device may use this key to decrypt the additionally encrypted initialization message. In other embodiments the encryption is done with an asymmetric cryptographic algorithm using a public key the corresponding private key of which is known to the authentication device and the authentication device decrypts the additionally encrypted initialization message (or the additionally encrypted parts thereof) using this private key.

In some embodiments the decryption key to decrypt this additional encryption is unique for each authentication device and the initialization server retrieves the appropriate encryption key e.g. using an identifier (such as a serial number of the user's authentication device) that the user may for example provide during the initialization process. In some embodiments the decryption key is the same for a group of authentication devices and the initialization server only needs to know the group of authentication devices that the user's authentication device belongs to to determine the correct encryption key. For example in some embodiments all authentication devices may belong to the same group i.e. all authentication devices may share the same decryption key.

Such an additional encryption can ensure that only a valid authentication device or even only a particular authentication device can retrieve the initialization seed from the initialization message. For example in some embodiments each authentication device has its own unique decryption key and certain authentication devices may be blacklisted (e.g. because it is suspected that they have been compromised or have fallen in the hands of malicious parties) and such an additional encryption may ensure that initialization messages will only be assembled for and can only be decrypted by authentication devices that are not blacklisted. In embodiments whereby each authentication device has its own unique decryption key this feature may be used to ensure that an initialization message, even if it has been intercepted, cannot be used with a different authentication device then the authentication device for which the initialization message was intended.

In some embodiments the initialization message may comprise other data elements that may enable the authentication device to verify whether the received initialization message is consistent, whether its integrity has not been compromised and/or whether the received message was indeed intended to be received by this authentication device. The initialization message may for example comprise an identifier if the targeted authentication device, an error detection code, a redundancy code, a message authentication code and/or a signature that may be verified by the targeted authentication device.

In some embodiments the initialization message may comprise a data element that is relates to the user's public key or to a certificate of the user's public key.

The authentication device may process the initialization seed, for example to determine the value of the OTP key, as discussed in more detail below.

Relation between the initialization seed and the OTP key.

In some embodiments the initialization seed comprises the OTP key and both the server and the authentication device may after the initialization process simply store the OTP key for future use in generating or verifying OTPs.

In some embodiments the initialization server determines an initialization seed and the initialization server and the authentication device derive the same corresponding OTP key using corresponding derivation mechanisms. For example the initialization server and the authentication server may use the same derivation mechanism to derive the OTP key from the initialization seed.

In some embodiments the initialization server determines the OTP key and derives the corresponding initialization seed from the OTP key using a first key derivation mechanism and the authentication device is adapted to derive an OTP key value from the initialization mechanism using a second derivation mechanism that is complementary with the first derivation mechanism such that the authentication device derives the same value for the OTP key as the OTP key value from which the initialization server had derived the initialization seed. For example in some embodiments the initialization server may derive the initialization seed from an OTP key value by encrypting the OTP key value and the authentication device may derive the OTP key value from the initialization seed by decrypting the initialization seed. In some embodiments the initialization server and the authentication device share an encryption/decryption key and use a symmetric encryption/decryption algorithm. In some embodiments the initialization server may use the shared encryption/decryption key to encrypt parts of the initialization message with a symmetric encryption algorithm. In some embodiments the authentication device may use the shared encryption/decryption key to decrypt parts of the initialization message that has been encrypted by e.g. the initialization server.

In some embodiments the derivation of the OTP key value from the initialization seed by the authentication device may comprise using a secret data element known to the authentication device. In some embodiments this secret data element is shared with the initialization server. In some embodiments this secret data element has a unique value for each individual authentication device. In some embodiments this secret data element is shared by a group of authentication devices. For example in some embodiments the derivation of the OTP key value from the initialization seed may comprise performing a bitwise exclusive or operation on the initialization seed and a secret data element stored in the authentication device.

In some embodiments the derivation of the OTP key value from the initialization seed by the authentication device may comprise using a data element associated with the user's security device such as a data element related to a private key stored on the user's security device (for example the private key corresponding to the public key that was used to encrypt parts of the initialization message). Such a data element related to a private key stored on the security device may comprise the public key corresponding to that private key or another data element from a public key certificate associated with that private key (such as the certificate serial number or the user's name or the user's email address). This may provide a further link between the OTP key value and the user's security device (and hence the user). In some embodiments the authentication device may obtain this extra data element from the user security device e.g. by reading a data element such as the public key's certificate from the security device.

In some embodiments the derivation of the OTP key value may comprise using an extra data element, which may be referred to henceforth as activation code, that is e.g. determined by the initialization server and provided to the user e.g. by means of an out-of-band channel such as a postal letter or an email or a text message (e.g. sms) to the user's cell phone and that the user then provides to the authentication device by means of the authentication device's human input interface. The activation code may for example comprise a string of characters. In some embodiments the activation code may comprise a PIN value.

In some embodiments, upon retrieving the initialization seed from the initialization message, the authentication device may generate and store a data set that is associated with the OTP key and that comprises data elements that the authentication device may use in subsequent generations and regenerations of the OTP key. In some embodiments the authentication device's generation and regeneration of the OTP key using data elements comprised in this data set may comprise using the user's security device as will be explained in more detail below.

Life time of the OTP key.

In some embodiments the authentication device determines the value of the OTP key once using the initialization seed and the user's security device as described above and stores the obtained OTP key value for an indefinite time so that it can be used for any subsequent OTP generation without a further need for the user's security device.

Usage of the security device to unlock the OTP key for usage in generating an OTP.

In some embodiments the OTP key has an unlimited life time but the authentication device may require the user to present the security device that was used to decrypt the initialization message as a condition for generating an OTP with the OTP key. For example, prior to using the OTP key for generating an OTP, the authentication device may prompt the security device to be presented and when a security device is presented the authentication device may verify it is the correct security device in a way that is similar to the embodiments discussed above in connection to FIGS. 6-9. For example in some embodiments the authentication devices may store a data element that allows the authentication device to identify the correct security device (for example a serial number of a public key certificate stored on the security device) and may authenticate the security device by submitting a challenge to the security device for the security device to sign with a private key stored on the security device. The authentication device may verify the signature by using the corresponding public key and optionally verifying the public key's certificate. In some embodiments the authentication device may store a challenge and a corresponding reference response, submit the challenge to the security device and compare the response received from the security device with the stored reference response.

In some embodiments an obtained OTP key value may only have a limited life time after which the authentication device discards or deletes the OTP key value so that the authentication device must re-generate the OTP key value for subsequent OTP generation. In some embodiments the authentication device regenerates the OTP key value using a dataset that is associated with the OTP key and that is stored by the authentication device and that comprises data elements that the authentication device may use to regenerate the OTP key value (possibly using the user's security device).

In some embodiments the life time of the OTP key may be defined in terms of the real time elapsed after a certain event like the generation of the OTP key value or the first use of the OTP key value in the generation of an OTP. In other embodiments the life time of the OTP key may be defined in terms of the number of times it has been used e.g. to generate OTPs. In still other embodiments the generation of the OTP key value by the authentication device may involve the use of the security device of the user associated with the OTP key and the authentication device may discard the generated OTP value when the user's security device is removed from the authentication device.

Usage of the Security Device in Regenerating the OTP Key.

In some embodiments the (re)generation of the OTP key may require the authentication device using the user's security device. In particular in some embodiments the (re)generation of the OTP key may comprise the authentication device requesting the user's security device to perform an asymmetric cryptographic operation with a user's private key stored on the security device. In some embodiments the same private key may be used for decrypting the initialization message as for regenerating the OTP key. In some embodiments the user's security device stores more than one private key of more than one public/private key pair and a different private key may be used for decrypting the initialization message than for regenerating the OTP key.

In some embodiments the authentication device uses the result of this asymmetric cryptographic operation as input data in the algorithm for regenerating the OTP key. In some embodiments the authentication device may store a data element and for regenerating the OTP key the authentication device may submit this stored data element to the security device and the security device performs an asymmetric cryptographic operation with its private key on this submitted data element and returns the result to the authentication device which uses this returned result in subsequent calculations for regenerating the OTP key. I.e. in some embodiments the regenerated OTP key may be a function of the private key of the security device and a value stored in the authentication device.

In some embodiments if another security device (with another private key) is presented to the authentication device, the authentication device may nevertheless generate an OTP key which however will then have a different value than the correct OTP key (since the private key of that other security device is different) such that when the authentication device thereafter uses this different OTP key to generate an OTP, the generated OTP will also be incorrect and will be rejected in the verification process. In some embodiments the authentication device stores a data element that allows the authentication device to identify or recognize the correct security device and warns the user if an incorrect or unexpected security device is presented.

In some embodiments the authentication device may store a value that is encrypted with the user's public key, and to regenerate the OTP key the authentication device may request the user's security device to decrypt this stored value with the user's private key whereupon the security device can use this decrypted value to regenerate the OTP value.

For example in some embodiments the authentication device may determine a value from which it may regenerate the OTP key, encrypt that value with the user's public key, and store the encrypted value. To regenerate the OTP key the authentication device may request the user's security device to decrypt this stored (encrypted) value with the user's private key whereupon the security device can use this decrypted value to regenerate the OTP value. In some embodiments the authentication device may obtain this public key from the security device, for example during the initialization of the authentication device. In some embodiments the authentication device may store this public key for later use, for example in a data set associated with the OTP key.

In some embodiments the stored value that is encrypted with the public key may comprise the OTP key itself. In other embodiments the stored value that is encrypted with the public key may comprise an intermediate value that may be used by the authentication device to regenerate the OTP key. For example in some embodiments, prior to discarding the OTP key, the authentication device determines an intermediate symmetric encryption key (which may for example be a random number), encrypts the OTP key with a symmetric encryption algorithm using the intermediate symmetric encryption key, encrypts the intermediate symmetric encryption key with an asymmetric encryption algorithm using the private key of the security device, stores the encrypted OTP key and the encrypted intermediate symmetric encryption key, and may then discard the clear values of the OTP key and the intermediate symmetric encryption key. Thereafter, when the authentication device needs to regenerate the OTP key, it submits to the security device the stored encrypted intermediate symmetric encryption key that was encrypted with the public key of the security device. The security device then decrypts this encrypted intermediate symmetric encryption key with its private key and returns the decrypted intermediate symmetric encryption key to the authentication device. The authentication device then uses the intermediate symmetric encryption key to decrypt the encrypted OTP key. In some embodiments rather than encrypting and storing the OTP key itself with such an intermediate symmetric encryption key, the authentication key may encrypt and store some intermediate derivation seed. This may for example be done in the case of embodiments that also use other data elements in the regeneration of the actual OTP key.

In other embodiments the authentication device may for example store a challenge and may request the user's security device to sign that challenge with the user's private key. The authentication device may then derive the OTP key using the signature that the security device produced over that challenge.

For example in some embodiments, prior to discarding the OTP key, the authentication device determines a challenge, submits the challenge to the security device to be signed by the private key of the security device, derives an intermediate encryption key from the signature generated by the security device over this challenge, encrypts the OTP key with this intermediate encryption key, stores the encrypted OTP key and then may discard the clear value of the OTP key. Thereafter, when the authentication device needs to regenerate the OTP key, it submits to the security device the same challenge. The security device signs the submitted challenge and returns the signature to the authentication device. The authentication device may then derive the intermediate encryption key from this signature and use it to decrypt the encrypted OTP key. In some embodiments rather than encrypting and storing the OTP key itself with such an intermediate symmetric encryption key, the authentication key may encrypt and store some intermediate derivation seed. This may for example be done in the case of embodiments that also use other data elements in the regeneration of the actual OTP key. In some embodiments the challenge may be a fixed value that may be hard-coded. In some embodiments the challenge may be a random value and the authentication device stores the challenge. In some embodiments the authentication device may use the same challenge every time it discards the OTP key. In other embodiments the authentication device may, every time or only sometimes, determine a different value for the challenge when it discards the OTP key.

In some embodiments the authentication device always presents the same static value to the user's security device to regenerate the value of a certain OTP key. For example the authentication device determines during the initialization process for a certain OTP key a value (e.g. a challenge or a value encrypted with the user's public key) that it stores and that it subsequently will not change anymore for that particular OTP key and that it presents to the user's security device (e.g. to be signed with the user's private key or to be decrypted by the user's private key) to obtain a second value that it then uses to (re)generate the OTP key.

In some embodiments the authentication device may update this stored value from time to time. In some embodiments this stored value may be updated after a certain number of OTP key regenerations (for example at every regeneration). In some embodiments the authentication device updates the stored value together with some other data elements such that the authentication device can still regenerate the same OTP key using the updated values of the stored value and the other data elements. The authentication device may for example store for each OTP key that it supports the stored value and the other data elements in a data set associated with the OTP key. For example in some embodiments when the authentication device regenerates the OTP key (or more generally when the authentication device updates the stored data elements for regenerating that are used for regenerating the OTP key which henceforth will be referred to as the regeneration data), the authentication device may determine from the stored values of the regeneration data a value, which will be further referred to as the intermediate derivation value, from which the OTP key value can be derived (for example the OTP key value itself or the original initialization seed or some other intermediate value). Then the authentication device may generate a random (or pseudo-random) value.

In some embodiments this random value is stored as the updated value for the challenge and the authentication device submits this updated challenge to the user's security device to be signed. The authentication device may then calculate a value, referred to as a compensation value, from the intermediate derivation value and the generated signature over the updated challenge. The authentication device may store this compensation value along with the updated challenge. This compensation value may be calculated by the authentication device such that the authentication device can regenerate later on the original value of the intermediate derivation value from the user's security device's signature over the stored updated challenge and the stored compensation value. For example the authentication device may calculate the compensation value by performing a bitwise exor on the intermediate derivation value and certain parts of the signature over the updated challenge. Later on the authentication device can then regenerate the intermediate derivation value (and therefrom subsequently also the OTP key) by letting the user's security device sign the stored updated challenge and then perform a bitwise exor of the stored compensation value and the earlier mentioned certain parts of the signature.

In other embodiments the authentication device may calculate a compensation value from the intermediate derivation value and the random value and stores this compensation value. This compensation value may be calculated by the authentication device such that the authentication device can regenerate later on the original value of the intermediate derivation value by combining the random value and the stored compensation value. The authentication device may encrypt the random value with the user's public key and may store this encrypted random value. Later on the authentication device may regenerate the original intermediate derivation value by first requesting the user's security device to decrypt the encrypted random value with the user's private key and then combining the decrypted random value with compensation value. For example in some embodiments the authentication device may calculate the compensation value by performing a bitwise exor of the random value and the original intermediate derivation value and similarly may regenerate later on the original intermediate derivation value by performing a bitwise exor of the decrypted random value and the stored compensation value.

In still some other embodiments the authentication device may be adapted to (re)generate the OTP key from a first value that it stores and a second value that it derives from a data element that is (cryptographically) related to the public key of the security device and that may be stored on the security device. To regenerate the OTP key after it has been discarded, the authentication device may prompt the user to present his or her security device. The authentication device may obtain the public key related data element. The authentication device may authenticate the security device by means of a challenge-response method based on a cryptographic operation by the security device with the private key corresponding to the public key. The authentication device may for example submit a challenge to the security device to be signed by the security device and the authentication device may verify this signature. Upon successful authentication of the security device the authentication device may derive the second value from the data element related to the public key obtained from the security device, and use the derived second value together with the stored first value to regenerate the OTP key. In some embodiments the data element related to the public key may be the public key itself. In some embodiments the data element related to the public key may be a data element from the certificate of the public key that the authentication device receives from the security device along with the public key itself and authenticating the security device may comprise verifying this certificate. In some embodiments the first value that is stored by the authentication device may be the initialization seed extracted from the initialization message.

In some embodiments discarding the OTP key may comprise erasing the value of the OTP key from the memory component(s) of the authentication device.

In other embodiments when the authentication device discards the OTP key, the authentication device does not erase it from its memory component(s) but instead inactivates the OTP key in memory (e.g. by setting a flag associated with the OTP key that indicates its inactive status). Regenerating the OTP key may then comprise reactivating the OTP key in memory (e.g. by resetting the flag associated with the OTP key to indicate that the status of the OTP key is active), rather then re-calculating or re-deriving the value of the OTP key. In some embodiments the authentication device stores along with the OTP key an identification data element that is cryptographically linked to the public key of a public/private key pair on the user's security device (i.e. a data element that is linked to a public key that corresponds to a private key that is stored on the same security device that was used to decrypt the initialization value that was used by the authentication device to derive or determine the value of the OTP key; this data element may be linked to such a public key by means of the public key's certificate; this data element may for example comprise the user's name or a certificate serial number or that public key itself). In some embodiments, as a necessary condition to re-activate the OTP key, the authentication device may require the user's security device that is associated with the OTP key and may read the public key and/or certificate of that public key that the identification data element is linked to and may authenticate the security device by performing a challenge-response authentication using that public key (e.g. sending a challenge to the security device to be submitted to an asymmetric cryptographic operation by the security device using the private key corresponding to the public key, such as a signing operation, and using the public key to verify the result i.e. the response of this challenge-response authentication). In some embodiments the authentication device may also verify the certificate of this public key. In some embodiments this public key is the same public key that corresponds to the private key that was used to decrypt the initialization seed.

Support for Multiple Users and Multiple Applications.

In some embodiments the authentication device only supports one OTP key and the authentication device can only be used with one user and the same OTP key is used for all applications that the user accesses by using OTPs generated by the authentication device.

In other embodiments the authentication device can support multiple OTP keys. For example the authentication device may store multiple data sets whereby each data set is associated with a different OTP key and whereby each data set comprises data that the authentication device may use to obtain the OTP key that the data set is associated with.

Support for Multiple Applications.

In some embodiments the authentication device can support more than one OTP key and different OTP keys for the same user can be associated with different applications. For example the authentication device may store multiple data sets whereby each data set is associated with a different OTP key and whereby each data set comprises data that the authentication device may use to obtain the OTP key that the data set is associated with and whereby each data set also comprises an application identifier. The authentication device may use these application identifiers to assist the user in selecting the appropriate OTP key when generating an OTP for a specific application. For example the application identifier may comprise an application name and the authentication device may use the application names in a menu that it presents to the user so that the user can select for which application the authentication device should generate an OTP. In some embodiments the initialization message comprising the initialization seed for the OTP key associated with a certain application may also comprise such an application identifier.

In some embodiments a single initialization message may comprise the initialization data (such as the initialization seed and an application identifier) for more than one application.

In some embodiments application web servers may point out to users how they can initiate the initiation process to personalize their authentication devices with an OTP key suitable for that application. For example the login page of an application's web server may comprise a link to an initialization server. If the user follows that link the initialization server will start the initialization process with that user.

Support for Multiple Users.

In some embodiments the authentication device can support more than one OTP key and different OTP keys can be associated with different users. For example the authentication device may store multiple data sets whereby each data set is associated with a different OTP key whereby each data set comprises data that the authentication device may use to obtain the OTP key that the data set is associated with and whereby each data set also comprises a data element associated with the user. This data element associated with the user may for example comprise a user identifier (e.g. the user's national id number or the user's social security number), or it may comprise an identifier of the user's security device or it may comprise an identifier associated with the user's private key on the user's security device such as for example a serial number of a certificate associated with the user's private key. In some embodiments, when the user presents his or her security device to the authentication device, the authentication device may retrieve and compare data stored on the security device (such as the user's national id or a serial number of a certificate) with the corresponding user associated data elements in the various data sets stored in the authentication device that are associated with the various OTP keys that the authentication device supports. In this way the authentication device may determine and select the data sets that can be used with the given security device that a current user of the authentication device presents to the authentication device and may thus distinguish these data sets from data sets that are associated with security devices of other users that may at times use the same authentication device.

In some embodiments when a user presents his or her security device to the authentication device the authentication device may verify whether it already has a data set associated with that security device. If that is not the case the authentication device may suggest the user to start an initialization process to obtain an initialization message so that the authentication device may construct a data set for the given security device.

Support for Extra Authentication Devices.

In some embodiments the initialization server can assemble more than one initialization message for different authentication devices such that they will generate the same OTP key. In that way a user can initialize more than one authentication device and can use any one of them at will with his or her security device to generate valid OTPs.

One aspect of the invention provides an apparatus comprising an authentication device for generating dynamic credentials that comprises a processing component adapted to generate a dynamical credential comprising a one-time password and/or a message authentication code using a symmetric cryptographic algorithm that cryptographically combines a secret credential generation key with the value of a dynamic variable, a memory component for storing permanently or temporarily the secret credential generation key, a user input interface for receiving inputs from a user, a communication interface for communicating with a security device of said user that comprises a memory for securely storing the first private key of a first public/private key pair associated with said user and that is adapted to perform asymmetric cryptographic calculations with said first private key wherein said asymmetric cryptographic calculations comprise at least an asymmetric cryptographic decryption operation, a data input interface for receiving an initialization message comprising at least an initialization seed at least a first part of which is encrypted with the first public key of said first public/private key pair; whereby the authentication device is adapted to extract at least said first encrypted part of the initialization seed from the initialization message, to submit (using the communication interface) the first encrypted part of the initialization seed to the security device of said user for the security device to decrypt said first encrypted part of the initialization seed using said private key and said asymmetric cryptographic decryption operation, to receive (using the communication interface) from the security device the first part of the initialization seed decrypted by the security device, and to derive the value of said secret credential generation key from at least said decrypted first part of the initialization seed and to store said derived value of said secret credential generation key at least temporarily in said memory component.

In some embodiments the first encrypted part of the initialization seed may comprise the entire initialization seed. In some embodiments the initialization seed may comprise or may be the secret credential generation key.

In some embodiments the authentication device may be further adapted to limit the life-time of the secret credential generation key. In some embodiments the authentication device is adapted to determine whether according to certain criteria the life-time of the secret credential generation key has been exceeded. In some embodiments the authentication device may be further adapted to discard the secret credential generation key after it has been determined that the life-time of the secret credential generation key has been exceeded. In some embodiments the authentication device discarding the secret credential generation key may comprise the authentication device erasing the value of the secret credential generation key from the memory component. In some embodiments the life-time of the secret credential generation key is defined in terms of the time elapsed since a particular event and the authentication device may discard the secret credential generation key after that time has elapsed. For example the authentication device may discard the secret credential generation key a fixed time (e.g. an hour) after its value has been obtained by the authentication device. In some embodiments the life-time of the secret credential generation key is defined in terms of the number of times its value has already been used for generating dynamical credentials since that value has been obtained by the authentication device. For example the authentication device may be adapted to count the number of times it has used the secret credential generation key after it has obtained its value and to discard that value when that number exceeds a certain fixed threshold. In some embodiments the secret credential generation key is discarded after it has been used once. In some embodiments the life-time of the secret credential generation key is defined in terms of certain events. For example in some embodiments the authentication device may require the presence of said security device for the generation of dynamic credentials and may discard the secret credential generation key upon removal of the security device.

In some embodiments the authentication device may be further adapted to regenerate the value of the secret credential generation key after it has been discarded. In some embodiments the authentication device is adapted to store in the memory component a data set associated with the secret credential generation key that comprises a first regeneration value, and the authentication device regenerating the value of the secret credential generation key comprises the authentication device submitting to said user's security device said first regeneration value for said user's security device to process said first regeneration value with an asymmetric cryptographic algorithm using the second private key of a second public/private key pair stored in the user's security device, receiving from the user's security device the resulting value of said processing by the user's security device of the first regeneration value using said second private key, and deriving the value of the secret credential generation key from said first resulting value. In some embodiments said second public/private key pair may be the same as said first public/private key pair.

In some embodiments said first regeneration value comprises said first encrypted part of the initialization seed. In some embodiments said first regeneration value comprises the secret credential generation key encrypted with the second public key corresponding to said second private key and regenerating the value of the secret credential generation key comprises the authentication device submitting to said user's security device the encrypted secret credential generation key for said user's security device to decrypt the encrypted secret credential generation key using said second private key of said second public/private key pair stored in the user's security device. In some embodiments said first encrypted part of the initialization seed comprises the secret credential generation key. In some embodiments the authentication device regenerating the value of the secret credential generation key comprises the authentication device submitting to said user's security device the first encrypted part of the initialization seed for said user's security device to decrypt the first encrypted part of the initialization seed using said first private key of said first public/private key pair stored in the user's security device.

In some embodiments the authentication device is adapted to determine the first regeneration value prior to discarding the secret credential generation key. In some embodiments the authentication device determines the first regeneration value by encrypting with the public key corresponding to said second private key a value that the authentication device can use to regenerate the secret credential generation key. In some embodiments this value may comprise the secret credential generation key.

In some embodiments said data set associated with the secret credential generation key also comprises a second regeneration value and the authentication device is further adapted to regenerate the secret credential generation value using said second regeneration value and said first resulting value. In some embodiments the second regeneration value comprises a regeneration seed encrypted with a regeneration encryption key using a symmetric encryption algorithm. In some embodiments the authentication device regenerating the secret credential generation key comprises the authentication device submitting the first regeneration value to the security device for the security device to sign using an asymmetric signature algorithm and said second private key, receiving the resulting signature, deriving the regeneration encryption key from said resulting signature, using the derived regeneration encryption key to decrypt with a symmetric decryption algorithm the second regeneration value to obtain said regeneration seed, and deriving the secret credential generation value from the decrypted regeneration seed. In some embodiments the regeneration seed may comprise the initialization seed. In some embodiments the regeneration seed may comprise the secret credential generation key.

In some embodiments the authentication device is adapted to determine the first regeneration value and the second regeneration value prior to discarding the secret credential generation key. In some embodiments the authentication device determines the first regeneration value by choosing a challenge and determines the second regeneration value by determining a regeneration seed and a regeneration encryption key and encrypting said regeneration seed with said regeneration encryption key to obtain the second regeneration value, whereby the authentication device determines the regeneration encryption key by submitting the first regeneration value to the security device for the security device to sign using an asymmetric signature algorithm and said second private key, receiving the resulting signature, deriving the regeneration encryption key from said resulting signature and whereby the regeneration seed is determined to be a value that is related to the secret credential generation key such that the authentication device can derive the secret credential generation key from said regeneration seed. In some embodiments the regeneration seed comprises the initialization seed. In some embodiments the regeneration seed comprises the secrete credential generation key.

In some embodiments the authentication device may be further adapted to capture a signal that is output or emitted by the human output interface of an access device of the user and that encodes a representation of the initialization message, and the authentication device may be further adapted to extract and decode the initialization message from the captured signal. In some embodiments the authentication device comprises a camera and the authentication device is adapted to take a picture with that camera of an image encoding the initialization message and being displayed on the display of the access device and the authentication device is adapted to extract the image from the picture taken with the camera and to decode the image to obtain the initialization message encoded in the image. In some embodiments the authentication device comprises a microphone and the authentication device is adapted to record with that microphone an acoustic signal encoding the initialization message and being emitted by a loudspeaker of the access device and the authentication device is adapted to extract and decode the initialization message from the acoustic signal.

In some embodiments the symmetric cryptographic algorithm for generating the dynamic credential may comprise a hashing algorithm. For example in some embodiments the symmetric cryptographic algorithm may comprise a keyed hashing algorithm that is parameterized with the secret credential generation key and that takes the value of the dynamic variable as input. For example in some embodiments the symmetric cryptographic algorithm may comprise a symmetric encryption algorithm that is parameterized with the secret credential generation key and that encrypts a value derived from the dynamic variable.

In some embodiments the dynamic variable may be derived from a time value. In some embodiments the authentication device may comprise a clock to provide a time value that may be used by the authentication device to determine the value of the dynamic variable. In some embodiments the dynamic variable may be derived from a counter value. In some embodiments the authentication device may store and maintain this counter and update the counter upon specific events. In some embodiments the authentication device may update the counter value each time that the authentication device generates a dynamic credential. For example in some embodiments the authentication value may increment the counter before or after each credential generation. In some embodiments the dynamic value may be derived from a value that is stored and maintained by the authentication device and that is updated by the authentication device at certain events. For example the authentication device may update this event related value by submitting the current value to a hash algorithm and replacing the current value by the result of this hash algorithm. In some embodiments the dynamic variable may be derived from challenge that is generated externally to the authentication device and that is provided to authentication device. In some embodiments the user input interface may be adapted to receive the challenge provided to the authentication device by the user. In some embodiments the dynamic variable may be derived from transaction data that may represent a transaction that the user wants to submit to an application and that are provided to the authentication device. In some embodiments the user input interface may be adapted to receive the transaction data provided to the authentication device by the user In some embodiments the authentication device may comprise a user output interface. In some embodiments the authentication device may be adapted to use the user output interface to communicate the generated dynamic credential to the user. In some embodiments the user output interface may comprise a display and the authentication device may present the generated dynamic credential to the user formatted as a string of characters. In some embodiments the string of characters comprises only decimal digits. In some embodiments the string of characters comprises alphanumerical digits.

Another aspect of the invention provides a method to initialize an authentication device of a particular user with a secret credential generation key for generating dynamic credentials, the method comprising the steps of: determining at a server a secret credential generation key and an initialization seed whereby the secret credential generation key and the initialization seed are mathematically linked by an algorithm that allows to derive the secret credential generation key from the initialization seed, associating at the server the secret credential generation key with said particular user, encrypting at the server at least a first part of the initialization seed with an asymmetric encryption algorithm using the public key of a public/private key pair of which the private key is stored on a security device of said user, assembling at the server an initialization message comprising said encrypted first part of the initialization seed and any other part of the initialization seed, sending said initialization message to the authentication device of the user, receiving at said authentication device the initialization message, extracting at the authentication device the encrypted first part of the initialization seed and any other part of the initialization seed from the received initialization message, communicating at the authentication device with a security device of the user presented to the authentication device by the uses, submitting by the authentication device the encrypted first part of the initialization seed to said security device, decrypting at said security device the encrypted first part of the initialization seed with said private key and returning the decrypted first part of the initialization seed to the authentication device, receiving at the authentication device the decrypted first part of the initialization seed, and deriving at the authentication device the secret credential generation key from the initialization seed.

In some embodiments determining at the server the secret credential generation key and the initialization seed comprises choosing a value for the initialization seed and calculating the secret credential generation key from the chosen value of the initialization seed. For example the secret credential generation key may have the same value as the chosen value of the initialization seed, or may be calculated as a one-way hash function of the chosen value of the initialization seed. In some embodiments determining at the server the secret credential generation key and the initialization seed comprises choosing a value for the secret credential generation key and calculating the initialization seed from the chosen value of the secret credential generation key. For example the initialization seed may be calculated by encrypting the chosen value of the secret credential generation key with an encryption key the corresponding decryption key of which is known to the authentication device.

In some embodiments the method comprises the additional step of storing at least temporarily the derived secret credential generation key in a memory component of the authentication device.

In some embodiments the method comprises the additional steps of: encrypting at the server at least a second part of the initialization seed using an encryption key that matches a decryption key known to the authentication device and decrypting at the authentication device said second part of the initialization seed with said decryption key. In some embodiments the value of said decryption key is particular to said particular authentication device. In some embodiments the authentication device shares the value of said decryption key with other authentication devices.

In some embodiments the step of sending said initialization message to an authentication device of the user comprises the server sending the initialization message to an access device of the user and the access device emitting over a human output interface of the access device a signal encoded with a representation of the initialization message, and the step of receiving at said authentication device the initialization message comprises the authentication device capturing said signal and decoding said signal to obtain the representation of said initialization message. In some embodiments the authentication device comprises a camera and the access device comprises a display and the representation of the initialization message comprises a two-dimensional image and the method comprises the additional steps of the access device displaying said two-dimensional image on the display of the access device and the authentication device making a picture of said image, extracting said two-dimensional image from said picture and decoding the image to obtain the initialization message.

In some embodiments the authentication device may comprise any of the authentication devices for generating dynamic credentials that have been described above.

Yet another aspect of the invention provides a method for generating a first dynamic credential by an authentication device and a security device of a particular user, the method comprising the steps of: initializing said authentication device of said particular user according to any of the methods method to initialize an authentication device of a particular user with a secret credential generation key for generating dynamic credentials described above, obtaining a value of a dynamic variable, and determining said first dynamic credential as the result of cryptographically combining said value of said dynamic variable with said secret credential generation key using a symmetric cryptographic algorithm.

In some embodiments the method for generating a first dynamic credential comprises the additional step of deriving said value of said dynamic variable from a time-related value. In some embodiments the method for generating a first dynamic credential comprises the additional step of deriving said value of said dynamic variable from a counter that is maintained and updated by the authentication device. In some embodiments the method for generating a first dynamic credential comprises the additional step of deriving said value of said dynamic variable from a challenge that may be generated externally to the authentication device and that may be provided to the authentication device. In some embodiments the authentication device receives the challenge from the user by means of a user input interface of the authentication device. In some embodiments the method for generating a first dynamic credential comprises the additional step of deriving said value of said dynamic variable from transaction data representing a transaction that the user wants to be performed by an application that may for example be hosted by a remote application server. In some embodiments the authentication device receives said transaction data from the user by means of a user input interface of the authentication device. In some embodiments the authentication device receives the transaction data via a data input interface of the authentication device and presents the transaction data to the user for review by means of a human output interface of the authentication device and captures an approval of the user for the presented transaction data by means of a human input interface of the authentication device.

In some embodiments the method for generating a first dynamic credential comprises the additional steps of: the authentication device generating a representation of said generated dynamic credential that can be presented to the user, and the authentication device presenting said representation to the user by means of a human output interface of the authentication device.

In some embodiments the method for generating a first dynamic credential comprises the additional steps of: the authentication device verifying against a set of criteria whether the life-time of said secret credential generation key has expired, and the authentication device, if said life-time has expired, discarding, possibly after said generation of said first dynamic credential, said secret credential generation key. In some embodiments said discarding may comprise the authentication device erasing the secret credential generation key from a memory component of the authentication device. In some embodiments said discarding may comprise the authentication device inactivating the secret credential generation key stored in a memory component of the authentication device.

In some embodiments the method for generating a first dynamic credential comprises the additional steps of: the authentication device, prior to generating a second dynamic credential using said the secret credential generation key, regenerating the secret credential generation key. In some embodiments regenerating the secret credential generation key comprises: the authentication device requiring the presence of the security device of the user and communicating with the security device, the authentication device submitting a first regeneration value to the security device, the security device receiving said first regeneration value and using the received first regeneration value as input for an asymmetric cryptographic operation parameterized with a second private key stored on the security device of a second public/private key pair associated with the user, the security device returning to the authentication device the result of said asymmetric cryptographic operation by the security device, and the authentication device using said result.

In some embodiments said using by the authentication device of said result comprises the authentication device verifying said result. In some embodiments said asymmetric cryptographic operation by the security device comprises the generation of a signature over the received first regeneration value with an asymmetric cryptographic signature algorithm parameterized with said second private key, said result comprises said signature, and verification of said result by said authentication device comprises verifying said signature comprised in said result. In some embodiments the first regeneration value comprises a random challenge generated by the authentication device. In some embodiments said discarding of the secret credential generation key by the authentication device may comprise the authentication device inactivating the secret credential generation key stored in a memory component of the authentication device and the usage by the authentication device of said result of said asymmetric cryptographic operation by the security device may comprise reactivating the secret credential generation key stored in a memory component of the authentication device if said verification of the result was successful.

In some embodiments the authentication device determines, possibly prior to said discarding of the secret credential generation key, an intermediate value, and said first regeneration value comprises said intermediate value encrypted with an asymmetric encryption algorithm parameterizes with a second public key that corresponds to said second private key of said public/private key pair. In some embodiments said asymmetric cryptographic operation by the security device comprises the decryption of the received first regeneration value with an asymmetric decryption algorithm parameterized with said second private key, said result comprises the decrypted intermediate value, and usage by the authentication device of said result comprises the authentication device using the decrypted intermediate value to obtain the value of the secret credential generation key. In some embodiments the intermediate value comprises the secret credential generation key. In some embodiments the intermediate value comprises the initialization key.

In some embodiments the authentication device determines, possibly prior to said discarding of the secret credential generation key, a second regeneration value, and the usage by the authentication device of said result of said asymmetric cryptographic operation by the security device comprises the authentication device mathematically or cryptographically combining said second regeneration value with said result to determine the value of the secret credential generation key. In some embodiments said determination of the second regeneration value comprises determining an intermediate regeneration seed and encrypting the intermediate regeneration seed with an intermediate encryption key, and the second regeneration value comprises the intermediate regeneration seed encrypted with the intermediate encryption key, and the usage by the authentication device of said result of said asymmetric cryptographic operation by the security device comprises deriving from said result an intermediate decryption key that matches said intermediate encryption key and decrypting said encrypted intermediate regeneration seed and deriving the value of the secret credential generation key from the decrypted intermediate regeneration seed. In some embodiments the intermediate regeneration seed comprises the secrete credential generation key. In some embodiments the intermediate regeneration seed comprises the initialization seed. In some embodiments the authentication device determines the value of the intermediate decryption key (for example as a random number) and determines said first regeneration value by encrypting the intermediate decryption key with said second public key and the authentication device recovers the intermediate decryption key by submitting the first regeneration value to the security device to be decrypted by the second private key. In some embodiments the authentication device determines the first regeneration value (e.g. as a random number), and determines the value of the intermediate encryption key a first time by submitting the first regeneration value to the security device to be signed by the second private key and deriving the intermediate encryption key from the resulting signature, uses the intermediate encryption key to determine the second regeneration value by encrypting the intermediate regeneration seed with the intermediate encryption key as described above, stores the first regeneration value and the second regeneration value, and regenerates the secret credential generation key as described above by regenerating the intermediate encryption key by re-submitting the first regeneration value to the security device to be signed by the second private key and re-deriving the intermediate encryption key from the resulting signature and using the regenerated intermediate encryption key to decrypt the second regeneration value to obtain the value of the intermediate regeneration seed, and derives the secret credential generation key from the obtained value of the intermediate regeneration seed.

Still another aspect of the invention provides a method of using an authentication device such as the authentication devices described above for securing an interaction between a user and a remote application server, the method comprising the steps of: receiving at the application server a request of the user, generating at the authentication device at the request of the user a dynamic credential according to any of the methods for generating dynamic credentials described above, making available to a verification server the secret dynamic credential generation key associated with the user, receiving the generated dynamic credential at the verification server, verifying at the verification server the validity of the received dynamic credential using said secret dynamic credential generation key, and granting at the remote application server said request if the received dynamic credential is verified to be valid.

Advantages of Aspects of the Invention

The advantage of certain embodiments of the invention is that the server never needs to have access to the user's security device (the server only needs to be able to obtain the user's public key) and the server doesn't need to keep track of which authentication device is being used by which user. In particular the server has no need to obtain the result of an asymmetric cryptographic operation performed by the user's security device using the user's private key stored on that device. This means that the authentication device may not need a digital connection capable of transferring to the server side (directly or indirectly) digital information e.g. provided by the user's security device such as data cryptographically generated by the user's security device with the user's private key (such as for example a signature or a response to a challenge). In some embodiments it may be sufficient for the authentication device to have a unidirectional data input interface for receiving the initialization message (such as for example a camera for capturing images displayed on a computer screen). In some embodiments the initialization message is encoded in a signal that can be output by the human output interface of the user's access device and the authentication device has a data input interface adapted to capture this signal. In such embodiments the authentication device can be remotely initialized using an access device that doesn't need any specific hardware or software interface to communicate with the user's security device. For initializing the authentication device the access device also doesn't need any other interface, other than a standard human output interface, to send digital data to the authentication device and doesn't need any interface to receive data from the authentication device. In some embodiments an authentication device may (for a particular user's security device) have to receive an initialization message only infrequently. In some embodiments an authentication device may (for a particular user's security device) have to receive an initialization message only once. In some embodiments the authentication device's data input interface for receiving an initialization message may have a high data rate for ensuring rapid transfer of any initialization message which enhances the user convenience. In some embodiments, for example in cases where authentication devices need to receive an initialization message only infrequently, the authentication device's data input interface for receiving an initialization message may have a low data rate which may allow for cheap implementations and may be acceptable for users in cases whereby receiving the initialization message only needs to happen infrequently.

Advantages of encrypting parts of the initialization message with an authentication device related key.

By encrypting parts of the initialization message with an authentication device related key, one can ensure that only an authentication device that has access to the matching decryption key can decrypt and use these parts. By thus encrypting parts of the initialization seed with an authentication device related key whereby only one particular authentication device or the authentication devices of a particular group have access to the corresponding decryption key, one can ensure that only these targeted authentication devices can obtain the initialization seed. That means that an attacker who manages to surreptitiously intercept the initialization message and who may have access at some point in time to the user's security device, may still not be able to obtain the initialization seed (e.g. for deriving the OTP generation key to fraudulently generate valid OTPs). This may in particular be true if each authentication device has been personalized with its own unique value for the decryption key. In that case any initialization message is only usable with the particular authentication device at which it was targeted. Anyone requesting an initialization message would have to identify his/her authentication device. If an attacker were requesting multiple initialization messages with the aim of using them with their own authentication device, then the attacker would have to identify their authentication device. This could be used e.g. by fraud detection mechanisms to discover potential fraud attempts (for example if an abnormal number of initialization messages are requested for the same authentication device or if an initialization message is requested for a blacklisted authentication device).

The invention allows for remote applications to be secured (by means of OTPs and dynamic MACs over transaction data) whereby the security is based on high security cryptographic protocols and more particular taking advantage of the user's public-private key pair on the user's security device, without however requiring that the access device used by the user to access the application is adapted to communicate with the user's security device that holds the user's public-private key pair. Applications can be secured that don't offer any digital connection to the user's security device or even the user's authentication device.

The foregoing has described several aspects or embodiments comprising methods or devices. In another aspect the invention comprises a sequence of instructions recorded on a computer readable medium which, when executed by a processor perform methods as already described. Software delivery can also be effected over digital networks such as the Internet. Accordingly in still a further aspect the invention comprehends an information bearing signal which comprises a sequence of instructions which, when executed by a processor perform methods as already described.

It should be emphasized that the term "comprises/comprising" when used in this specification is taken to specify the presence of stated features, steps, or components but does not preclude the presence or addition of one or more other features, steps, components or groups thereof.

While several embodiments of the invention have been described with some particularity it should be understood that this description is exemplary and not limiting; the scope of the invention is to be determined by the claims appended hereto.

The invention claimed is:

1. An authentication device for generating dynamic credentials comprising:
    a memory component for storing a secret credential generation key;
    a user input interface for receiving inputs from a user;
    a communication interface for communicating with a security device of said user that stores a first private key of a first public/private key pair associated with said user and that is adapted to perform asymmetric cryptographic calculations with said first private key wherein said asymmetric cryptographic calculations comprise at least an asymmetric cryptographic decryption operation;
    a data input interface for receiving an initialization message comprising an initialization seed at least a first part of which is encrypted with said first public key of said first public/private key pair;
    a hardware processing component adapted to generate a dynamical credential using a symmetric cryptographic algorithm that cryptographically combines said secret credential generation key with a dynamic variable;
    whereby the authentication device is adapted to:
        extract at least said first encrypted part of the initialization seed from the initialization message,
        submit, using the communication interface, to the security device of said user the first encrypted part of the initialization seed for the security device to decrypt said first encrypted part of the initialization seed using said private key and said asymmetric cryptographic decryption operation,
        receive, using the communication interface, from the security device the first part of the initialization seed decrypted by the security device,
        derive the value of said secret credential generation key from at least said decrypted first part of the initialization seed;
        limit the life-time of the secret credential generation key;
        determine whether the life-time of the secret credential generation key has been exceeded;
        discard the secret credential generation key after it has been determined that the life-time of the secret credential generation key has been exceeded;
        store in the memory component a data set associated with the secret credential generation key that comprises a first regeneration value;
        regenerate the value of the secret credential generation key after it has been discarded, whereby the authentication device regenerating the value of the secret credential generation key comprises;
        the authentication device submitting to said user's security device said first regeneration value for said user's security device to process said first regeneration value with an asymmetric cryptographic algorithm using a second private key of a second public/private key pair stored in the user's security device;
        receiving from the user's security device the resulting value of said processing by the user's security device of the first regeneration value using said second private key; and
        deriving the value of the secret credential generation key from said resulting value.

2. The authentication device of claim 1 whereby the first encrypted part of the initialization seed comprises the entire initialization seed.

3. The authentication device of claim 2 whereby the initialization seed comprises the secret credential generation key.

4. The authentication device of claim 1 whereby the lifetime of the secret credential generation key is based on the time elapsed since a particular event and the authentication device is further adapted to discard the secret credential generation key after a predetermined period of time has elapsed.

5. The authentication device of claim 4 whereby the particular event is when the secret credential generation key was derived by the authentication device.

6. The authentication device of claim 1 whereby the lifetime of the secret credential generation key is based on the number of times its current value has already been used for generating dynamical credentials since that value was derived by the authentication device.

7. The authentication device of claim 6 further adapted to count the number of times it has used the secret credential generation key after it has obtained its current value and to discard that value when that number exceeds a certain fixed threshold.

8. The authentication device of claim 7 further adapted to discard the secret credential generation key after it has been used once for generating a dynamic credential.

9. The authentication device of claim 1 whereby the lifetime of the secret credential generation key is defined in terms of certain events.

10. The authentication device of claim 9 further adapted to require the presence of said security device for the generation of dynamic credentials and to discard the secret credential generation key upon removal of the security device.

11. The authentication device of claim 1 whereby discarding the secret credential generation key comprises erasing the value of the secret credential generation key from the memory component.

12. The authentication device of claim 1 whereby said second public/private key pair is the same as said first public/private key pair.

13. The authentication device of claim 1 whereby said first regeneration value comprises said first encrypted part of the initialization seed.

14. The authentication device of claim 1, whereby said first regeneration value comprises the secret credential generation key encrypted with the second public key corresponding to said second private key and regenerating the value of the secret credential generation key comprises the authentication device submitting to said user's security device the encrypted secret credential generation key for said user's security device to decrypt the encrypted secret credential generation key using said second private key of said second public/private key pair stored in the user's security device.

15. The authentication device of claim 1 whereby the authentication device regenerating the value of the secret credential generation key comprises the authentication device submitting to said user's security device the first encrypted part of the initialization seed for said user's security device to decrypt the first encrypted part of the initialization seed using said first private key of said first public/private key pair stored in the user's security device.

16. The authentication device of claim 1 further adapted to determine the first regeneration value prior to discarding the secret credential generation key.

17. The authentication device of claim 16 whereby determining the first regeneration value comprises:
    determining a regeneration seed,
    encrypting said regeneration seed with the second public key corresponding to said second private key, and
    including said encrypted regeneration seed in the first regeneration value; and
    whereby regenerating the value of the secret credential generation key comprises:
    the authentication device submitting to said user's security device said first regeneration value for said user's security device to decrypt said first regeneration value with an asymmetric decryption algorithm using said second private key, and
    deriving the secret dynamic credential generation key from the decrypted first regeneration value.

18. The authentication device of claim 1 whereby said data set associated with the secret credential generation key also comprises a second regeneration value and the authentication device is further adapted to regenerate the secret credential generation value using said second regeneration value and said resulting value of said processing by the user's security device of the first regeneration value.

19. The authentication device of claim 18 whereby the second regeneration value comprises a regeneration seed encrypted with a regeneration encryption key using a symmetric encryption algorithm.

20. The authentication device of claim 19 whereby the regeneration seed comprises the initialization seed.

21. The authentication device of claim 19 whereby the regeneration seed comprises the secret credential generation key.

22. The authentication device of claim 19 whereby regenerating the secret credential generation key comprises:
    the authentication device submitting the first regeneration value to the security device for the security device to sign using an asymmetric signature algorithm and said second private key,
    receiving the resulting signature,
    deriving the regeneration encryption key from said resulting signature,
    using the derived regeneration encryption key to decrypt with a symmetric decryption algorithm the second regeneration value to obtain said regeneration seed, and
    deriving the secret credential generation value from the decrypted regeneration seed.

23. The authentication device of claim 19 further adapted to determine the first regeneration value and the second regeneration value prior to discarding the secret credential generation key.

24. The authentication device of claim 23 whereby the authentication device determines the first regeneration value by choosing a challenge and determines the second regeneration value by determining a regeneration seed and a regeneration encryption key and encrypting said regeneration seed with said regeneration encryption key to obtain the second regeneration value, whereby the authentication device determines the regeneration encryption key by submitting the first regeneration value to the security device for the security device to sign using an asymmetric signature algorithm and said second private key, receiving the resulting signature, deriving the regeneration encryption key from said resulting signature and whereby the regeneration seed is determined to be a value that is related to the secret credential generation key such that the authentication device can derive the secret credential generation key from said regeneration seed.

25. The authentication device of claim 1 further adapted to capture a signal that is output or emitted by an output interface of an access device of the user and that encodes a representation of the initialization message, and the authentication device may be further adapted to extract and decode the initialization message from the captured signal.

26. The authentication device of claim 1, further comprising:
a camera; and
further adapted to take a picture with said camera of an image that encodes the initialization message and that is displayed on the display of said access device; and
further adapted to extract the image from the picture taken with the camera and to decode the image to obtain the initialization message encoded in the image.

27. The authentication device of claim 1 further comprising a clock to provide a time value, and further adapted to use said time value to determine the value of the dynamic variable.

28. The authentication device of claim 1 whereby the dynamic value is derived from a value that is stored and maintained by the authentication device and that is updated by the authentication device at certain events.

29. The authentication device of claim 1 further adapted to derive the dynamic variable from a challenge that is generated externally to the authentication device and that is received by the authentication device.

30. The authentication device of claim 1 further adapted to derive the dynamic variable from transaction data that represent a transaction that the user wants to submit to an application and that are received by the authentication device.

31. The authentication device of claim 1 further comprising a user output interface and further adapted to use said user output interface to communicate the generated dynamic credential to the user.

32. A method for generating a first dynamic credential by the authentication device of claim 1 and a security device of a particular user, the method comprising the steps of:
initializing said authentication device of said particular user with a secret credential generation key for generating dynamic credentials by:
receiving from a server at said authentication device an initialization message, the initialization message comprising at least an encrypted first part of an initialization seed and any other part of the initialization seed, whereby said first part of said initialization seed has been encrypted with a first asymmetric encryption algorithm using a first public key of a first public/private key pair;
extracting at the authentication device the encrypted first part of the initialization seed and any other part of the initialization seed from the received initialization message;
communicating at the authentication device with said security device of said user presented to the authentication device by the user;
submitting by the authentication device the encrypted first part of the initialization seed to said security device;
decrypting at said security device the encrypted first part of the initialization seed with a first private key of said first public/private key pair, the first private key stored on the security device, and returning the decrypted first part of the initialization seed to the authentication device;
receiving at the authentication device the decrypted first part of the initialization seed;
deriving at the authentication device the secret credential generation key from the initialization seed;
the authentication device obtaining a value of a dynamic variable;
the authentication device determining said first dynamic credential as the result of cryptographically combining said value of said dynamic variable with said secret credential generation key using a symmetric cryptographic dynamic credential generation algorithm;
the authentication device verifying against a set of criteria whether the life-time of said secret credential generation key has expired,
the authentication device, if said life-time has expired, discarding said secret credential generation key; and
the authentication device, prior to generating a second dynamic credential using said secret credential generation key, regenerating the secret credential generation key, the secret credential generation key regenerated by:
the authentication device requiring the presence of the security device of the user and communicating with the security device,
the authentication device submitting a first regeneration value to the security device,
the security device receiving said first regeneration value and using the received first regeneration value as input for a second asymmetric cryptographic operation parameterized with a second private key stored on the security device of a second public/private key pair associated with the user,
the security device returning to the authentication device the result of said second asymmetric cryptographic operation by the security device, and
the authentication device using said result.

33. The method of claim 32, further comprising:
determining at the server the secret credential generation key is a function of the initialization seed;
associating at the server the secret credential generation key with said particular user;
encrypting at the server at least the first part of the initialization seed with said first asymmetric encryption algorithm using said first public key of the first public/private key pair;
assembling at the server the initialization message comprising said encrypted first part of the initialization seed and any other part of the initialization seed; and
sending said initialization message to said authentication device of said user.

34. The method of claim 33 comprising the additional steps of: encrypting at the server at least a second part of the initialization seed using an encryption key that matches a decryption key known to the authentication device and decrypting at the authentication device said second part of the initialization seed with said decryption key.

35. The method of claim 34 whereby the value of said decryption key is unique to said particular authentication device.

36. The method of claim 34 whereby said particular authentication device shares the value of said decryption key with at least one other authentication device.

37. The method of claim 33 whereby:
the step of sending said initialization message to said authentication device of said user comprises the server sending the initialization message to an access device of said user; and the access device emitting over an output interface of the access device a signal encoded with a representation of the initialization message, and
the step of receiving at said authentication device the initialization message comprises the authentication device capturing said signal and decoding said signal to obtain the representation of said initialization message.

38. The method of claim 37 whereby the authentication device comprises a camera and the access device comprises a display and the representation of the initialization message comprises a two-dimensional image and the method comprises the additional steps of the access device displaying said two-dimensional image on the display of the access device and the authentication device making a picture of said image, extracting said two-dimensional image from said picture and decoding the image to obtain the initialization message.

39. The method of claim 32 comprising the additional step of storing at least temporarily the derived secret credential generation key in a memory component of the authentication device.

40. The method of claim 32 comprising the additional steps of:
the authentication device generating a representation of said generated dynamic credential that can be presented to the user, and
the authentication device presenting said representation to the user by means of an output interface of the authentication device.

41. The method of claim 32 wherein said secret credential generation key is discarded after said generation of said first dynamic credential.

42. The method of claim 32 wherein said discarding comprises the authentication device erasing the secret credential generation key from a memory component of the authentication device.

43. The method of claim 32 wherein said discarding comprises the authentication device inactivating the secret credential generation key stored in a memory component of the authentication device.

44. The method of claim 32 wherein said using by the authentication device of said result comprises the authentication device verifying said result.

45. The method of claim 44 wherein:
said second asymmetric cryptographic operation by the security device comprises the generation of a signature over the received first regeneration value with an asymmetric cryptographic signature algorithm parameterized with said second private key,
said result comprises said signature,
and said verification of said result by said authentication device comprises verifying said signature comprised in said result.

46. The method of claim 45 wherein the first regeneration value comprises a random challenge generated by the authentication device.

47. The method of claim 44 wherein discarding the secret credential generation key by the authentication device may comprise the authentication device inactivating the secret credential generation key stored in a memory component of the authentication device and the usage by the authentication device of said result of said asymmetric cryptographic operation by the security device may comprise reactivating the secret credential generation key stored in a memory component of the authentication device if said verification of the result was successful.

48. The method of claim 32 wherein the authentication device determines, prior to said discarding of the secret credential generation key, an intermediate value, and said first regeneration value comprises said intermediate value encrypted with a second asymmetric encryption algorithm parameterized with a second public key that corresponds to said second private key of said second public/private key pair.

49. The method of claim 48 wherein said second asymmetric cryptographic operation by the security device comprises the decryption of the received first regeneration value with a second asymmetric decryption algorithm parameterized with said second private key, said result comprises the decrypted intermediate value, and the usage by the authentication device of said result comprises the authentication device using the decrypted intermediate value to obtain the value of the secret credential generation key.

50. The method of claim 49 wherein the intermediate value comprises the secret credential generation key.

51. The method of claim 49 wherein the intermediate value comprises the initialization key.

52. The method of claim 32 wherein the authentication device determines, prior to said discarding of the secret credential generation key, a second regeneration value, and the usage by the authentication device of said result of said second asymmetric cryptographic operation by the security device comprises the authentication device mathematically or cryptographically combining said second regeneration value with said result to determine the value of the secret credential generation key.

53. The method of claim 52 wherein said determination of the second regeneration value comprises determining an intermediate regeneration seed and encrypting the intermediate regeneration seed with an intermediate encryption key, and the second regeneration value comprises the intermediate regeneration seed encrypted with the intermediate encryption key, and the usage by the authentication device of said result of said second asymmetric cryptographic operation by the security device comprises deriving from said result an intermediate decryption key that matches said intermediate encryption key and decrypting said encrypted intermediate regeneration seed and deriving the value of the secret credential generation key from the decrypted intermediate regeneration seed.

54. The method of claim 53 wherein the intermediate regeneration seed comprises the secrete credential generation key.

55. The method of claim 53 wherein the intermediate regeneration seed comprises the initialization seed.

56. The method of claim 53 wherein the authentication device determines the value of the intermediate decryption key and determines said first regeneration value by encrypting the intermediate decryption key with said second public key and the authentication device recovers the intermediate decryption key by submitting the first regeneration value to the security device to be decrypted by the second private key.

57. The method of claim 53 wherein the authentication device determines the first regeneration value, and determines the value of the intermediate encryption key a first time by submitting the first regeneration value to the security device to be signed by the second private key and deriving the intermediate encryption key from the resulting signature, uses the intermediate encryption key to determine the second regeneration value by encrypting the intermediate regeneration seed with the intermediate encryption key as described above, stores the first regeneration value and the second regeneration value, and regenerates the secret credential generation key as described above by regenerating the intermediate encryption key by re-submitting the first regeneration value to the security device to be signed by the second private key and re-deriving the intermediate encryption key from the resulting signature and using the regenerated intermediate encryption key to decrypt the second regeneration value to obtain the value of the intermediate regeneration seed, and derives the secret credential generation key from the obtained value of the intermediate regeneration seed.

58. A method for securing an interaction between a user and a remote application server using an authentication device of the user, the method comprising the steps of:
- receiving at the application server a request of the user;
- generating at the authentication device at the request of the user a dynamic credential according to the method of claim 32;
- making available to a verification server the secret dynamic credential generation key associated with the user;
- receiving the generated dynamic credential at the verification server;
- verifying at the verification server the validity of the received dynamic credential using said secret dynamic credential generation key;
- and, if the received dynamic credential is verified to be valid, granting at the remote application server said request.

* * * * *